(12) United States Patent
Takahashi

(10) Patent No.: US 7,783,179 B2
(45) Date of Patent: Aug. 24, 2010

(54) IMAGE BLUR CORRECTION APPARATUS, LENS BARREL, AND IMAGE CAPTURE APPARATUS

(75) Inventor: Tatsuyuki Takahashi, Kanagawa (JP)

(73) Assignee: Sony Corporation, Tokyo (JP)

( * ) Notice: Subject to any disclaimer, the term of this patent is extended or adjusted under 35 U.S.C. 154(b) by 321 days.

(21) Appl. No.: 11/967,665

(22) Filed: Dec. 31, 2007

(65) Prior Publication Data
US 2008/0187301 A1  Aug. 7, 2008

(30) Foreign Application Priority Data
Feb. 1, 2007  (JP) .............................. 2007-023474

(51) Int. Cl.
G03B 17/00  (2006.01)
H04N 5/228  (2006.01)
(52) U.S. Cl. ..................................... 396/55; 348/208.7
(58) Field of Classification Search .................. 396/55; 348/208.99, 208.4, 208.7, 208.11
See application file for complete search history.

(56) References Cited

U.S. PATENT DOCUMENTS

| 6,064,827 | A |   | 5/2000 | Toyoda |             |
|-----------|---|---|--------|--------|-------------|
| 6,415,105 | B1| * | 7/2002 | Sasaki et al. | 396/55 |
| 6,456,790 | B2| * | 9/2002 | Sasaki et al. | 396/55 |
| 7,409,150 | B2| * | 8/2008 | Makii  | 396/55      |
| 7,477,291 | B2| * | 1/2009 | Seo    | 348/208.7   |
| 2005/0185057 | A1 | * | 8/2005 | Seo | 348/208.4 |
| 2005/0232617 | A1 | * | 10/2005 | Uenaka et al. | 396/55 |
| 2007/0133967 | A1 |   | 6/2007 | Takahashi et al. |  |

FOREIGN PATENT DOCUMENTS

| JP | 10-319464   | 12/1998 |
| JP | 10-319465   | 12/1998 |
| JP | 11-305277   | 11/1999 |
| JP | 2000-267148 | 9/2000  |
| JP | 2000-330154 | 11/2000 |
| JP | 2000-330155 | 11/2000 |
| JP | 2001-290184 | 10/2001 |

* cited by examiner

Primary Examiner—Rodney E Fuller
(74) Attorney, Agent, or Firm—Oblon, Spivak, McClelland, Maier & Neustadt, L.L.P.

(57) ABSTRACT

An image blur correction apparatus includes a correction lens for correcting image blurs in a lens system, a moving frame for holding the correction lens, a support frame for movably supporting the moving frame through a move guide on a plane orthogonal to an optical axis of the correction lens, a first electric actuator for generating a first force to move the moving frame in a first direction orthogonal to the optical axis of the correction lens, a second electric actuator for generating a second force to move the moving frame in a second direction which is a direction orthogonal to the optical axis of the correction lens and is also orthogonal to the first direction, and an operation limit mechanism for limiting the moving frame from moving in the first direction and the second direction, and preventing the moving frame from rotating in the limit position.

14 Claims, 35 Drawing Sheets

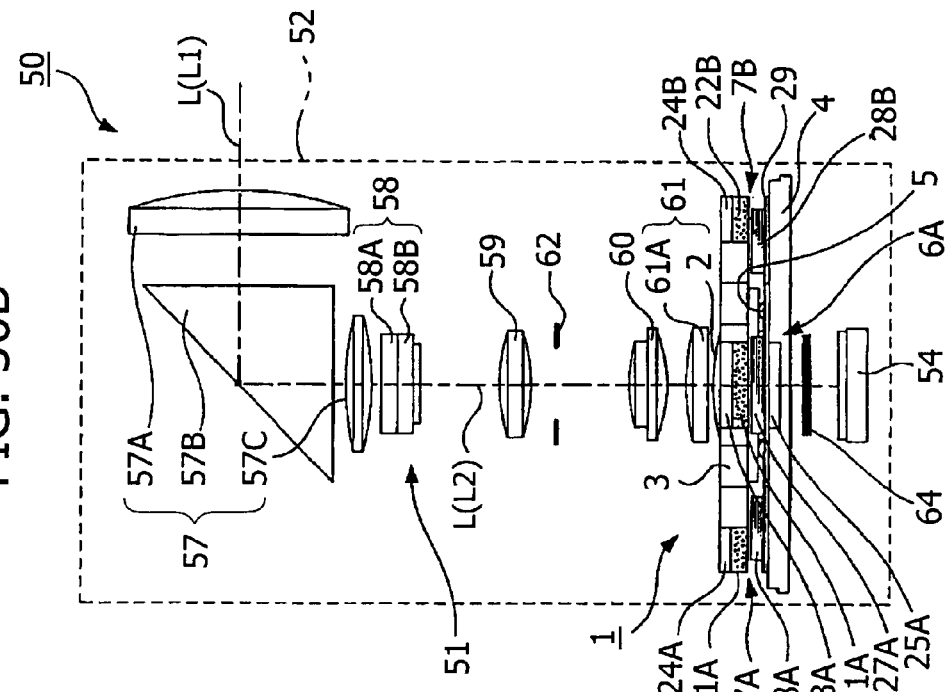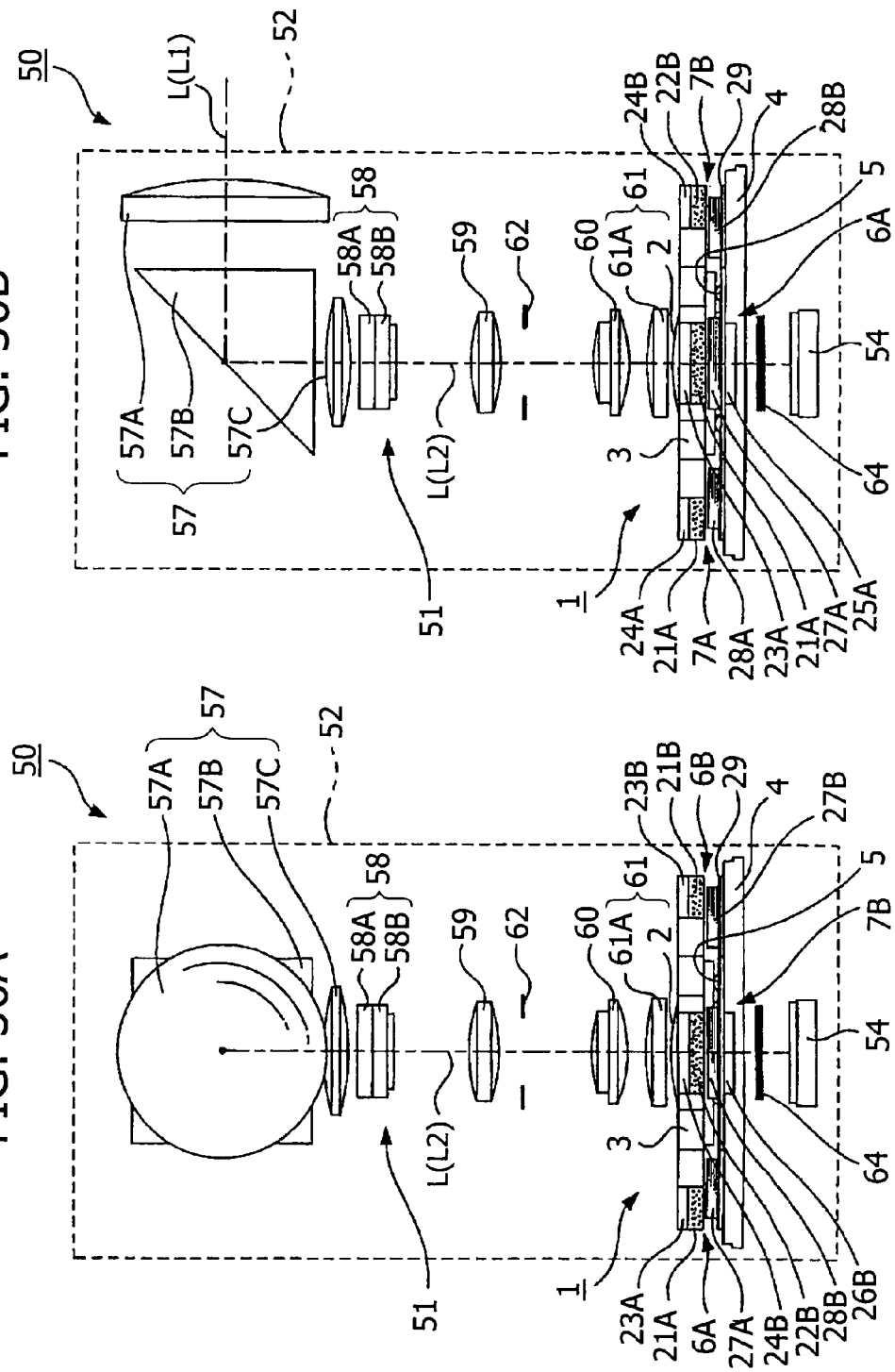

IMAGE BLUR CORRECTION APPARATUS, LENS BARREL, AND IMAGE CAPTURE APPARATUS

BACKGROUND OF THE INVENTION

1. Field of the Invention

The present invention relates to an image blur correction apparatus for correcting image blurs generated by vibration etc. when capturing an image, a lens barrel having the image blur correction apparatus, an image capture apparatus provided with the lens barrel, such as a digital still camera, a video camera, etc.

2. Description of the Related Art

In recent years, there is a remarkable improvement in performance of image capture apparatuses, such as a digital still camera and a video camera, whereby anyone can easily capture a still image and a moving image of high definition and a high performance. Such an improvement in the performance of the image capture apparatus considerably relies on high performances of a lens, imaging devices (CCD, CMOS, etc.), and an image processing circuit.

However, even if the performances of the lens, the imaging device, etc. are improved, when a tremble or a shake arises to the hand supporting the camera (image capture apparatus), blurs may occur on a screen of high resolution, and an image with the blurs state may be captured. Therefore, in some relatively expensive cameras, an image blur correction apparatus which corrects the image blurs generated by camera shake at the time of capturing the image etc. is installed. However, originally, the camera correcting image blur is required rather for a popular model used by majority of people having little shooting experience, but not for a high class model used by a professional photographer.

Further, in general, there is a strong demand for a camera (image capture apparatus) to be reduced in size and weight, and a camera which is light and easy to carry is preferred. However, an image blur correction apparatus has been comparatively large in size. Therefore, if the related art image blur correction apparatus is installed in a camera body, size of camera as whole becomes large, and thus demand of the reduction in size and weight can not be met. Further, there has been an issue that a lot of components are needed for the related art image blur correction apparatus, and the cost increases as number of components increase.

As a related art image blur correction apparatus of this type, there are type of apparatus disclosed in Japanese Patent Application Publication No. JP H10-319465 (Patent Document 1), for example. Patent Document 1 discloses one that relates to a lens shifting apparatus for shifting a lens which causes an optical axis of a lens group etc. to be eccentric. The lens shifting apparatus disclosed in Patent Document 1 is characterized by including "a lens for causing an optical axis to be eccentric, a fixed member which has a reference plane perpendicular to the optical axis, a movable member having a plane which is parallel to and faces the reference plane, holding the lens, and shifting the lens within a plane perpendicular to the optical axis, at least three rotatable balls sandwiched between the two planes, a hold member for holding the balls, and an elastic member for generating a force to sandwich the balls between the two planes and preventing the movable member from rotating around the optical axis".

According to the invention as described in Patent Document 1, the effect of "being able to shift the lens in a manner lenses are kept perpendicular to the optical axis without backlash while reducing drive resistance as much as possible with simple structure" (see paragraph [0060]) is expected.

The lens shifting apparatus as described in Patent Document 1 is provided with the movable member for holding the lens (hereafter referred to as "correction lens", since it is equivalent to the correction lens in an embodiment of the present invention) for causing the optical axis to be eccentric, the fixed member for supporting the movable member in a movable manner, the rotatable balls interposed between the movable member and the fixed member. By detecting a position of the movable member (correction lens) by a position detector, the correction lens is driven and controlled to carry out the image blur correction. In order to detect the position of this movable member, it is necessary to set up the reference position of the movable member. Therefore, in the lens shifting apparatus as described above, the reference position of the movable member is typically set up by using a chart for adjustment.

Now, the setup of the reference position of the movable member using the chart will be described. In order to set up the reference position of the movable member, the lens shifting apparatus is first installed in a lens barrel provided with a lens group and an imaging device. Next, the chart for adjustment is arranged at front side of an object lens of the lens barrel whereto the lens shifting apparatus is installed, and an image of the chart is formed on the image capture side of the imaging device. By viewing the formed image of the chart, the movable member of the lens shifting apparatus is driven such that the optical axis of the correction lens are in alignment with the optical axis of the lens group of the lens barrel. Then, a position where both of the optical axes are aligned is set as the reference position of the movable member.

However, in the setup of the reference position of the movable member using the chart as described above, the lens shifting apparatus needs to be installed in the lens barrel, and there has been an issue that the reference position of the movable member can not be set up solely by the lens shifting apparatus. Further, it is necessary to prepare a device for displaying the image of the chart and large space for installing the chart. Furthermore, manpower for installing the chart increases, and thus there arise an issue that the costs are increased considerably.

Then, it is conceivable that the movable member is moved to the position in which the movement of the movable member is limited, or a so-called mechanism end (which means "end of mechanical chassis"), and based on output of the position detector at this time, the reference position of the movable member is set up. Now, the setup of the reference position of the movable member using the mechanism end will be described with reference to FIGS. 39 and 40.

FIG. 39 is a plan view of the image blur correction apparatus using a sphere as a guide of the movable member with respect to the fixed member. This image blur correction apparatus 300 includes a moving frame (movable member) 303 having a correction lens 304 in the central part, a support frame (fixed member) 302 which movably supports the moving frame 303 through a sphere 305 in a movable manner, a first electric actuator 306A which moves the correction lens 304 in the first direction X, a second electric actuator 306B which moves the correction lens 304 in the second direction Y, a first Hall device 307a which detects a position of the moving frame 303 (correction lens) with respect to the first direction X, a second Hall device 307b which similarly detects a position with respect to the second direction Y, etc.

The first electric actuator 306A is arranged on "−" side which is one side of the first direction X of the correction lens 304 disposed in the center of the image blur correction apparatus 300. The second electric actuator 306B is arranged on "−" side which is the other side of the second direction Y orthogonal to the first direction X of the correction lens 304 of the image blur correction apparatus 300. The first electric actuator 306A has a magnet 309a, a coil 310a, and an opposing yoke (not shown). Further, the second electric actuator 306B has a magnet 309b, a coil 310b, and an opposing yoke (not shown).

The magnet 309a of the first electric actuator 306A is fixed to "+" side of the first direction X of the moving frame 303, and the magnet 309b of the second electric actuator 306B is fixed to the other side (−) of the second direction Y of the moving frame 303. The coil 310a of the first electric actuator 306A is adapted to face the magnet 309a, the coil 310b of the second electric actuator 306B is adapted to face the magnet 309b, and these coils 310a and 310b are fixed to the support frame 302 via a flexible wiring board 311. Further, the opposing yokes of the first and second electric actuators 306A and 306B are attracted by magnetic force of the magnets 309a and 309b, and the moving frame 303 is urged towards side of the support frame 302 through the sphere 305.

The first Hall device 307a out of the two Hall devices which detect the position of the correction lens is arranged in the opening of the coil 310a, and adapted to face a boundary line (polar boundary) between N pole and S pole of the magnet 309a. Further, the second Hall device 307b is arranged in the opening of the coil 310b, and adapted to face a polar boundary of the magnet 309b. These first and second Hall devices 307a and 307b detect the magnetic force of N pole and S pole of two magnets 309a and 309b, and output the detection signals in response to strength of the magnetic force, respectively.

The moving frame 303 is provided with a limit hole 303a in an opposing position across the correction lens 304. This limit hole 303a is formed to be quadrangular, and has two sides extended in the first direction X and two sides extended in the second direction Y. Further, the support frame 302 is provided with a limit projection 302a to be inserted through the limit hole 303a of the moving frame 303. This limit projection 302a is in the shape of a square pole whose four side surfaces respectively face four sides of the limit hole 303a in a state where it is inserted into the limit hole 303a. A move limit mechanism for limiting a moving range of the moving frame 303 is configured by the limit projection 302a and limit hole 303a.

Next, the setup of the reference position of the moving frame 303 using the mechanism end in the image blur correction apparatus 300 having such a structure as described above will be explained. The setup of the reference position of the moving frame 303 using the mechanism end is performed by setting up a reference position with respect to the first direction X of the moving frame 303, and a reference position with respect to the second direction Y.

First, the setup of the reference position with respect to the first direction X of the moving frame 303 will be described. In order to set up the reference position with respect to the first direction X of the moving frame 303, the moving frame 303 is adapted to move to "+" side of the first direction X, and the limit projection 302a is brought into abutment with the limit hole 303a, as shown in FIG. 40A. Output (hereafter referred to as "X-direction mechanism end "+" output") of the first Hall device 307a at this time is detected.

Next, the moving frame 303 is moved to "−" side of the first direction X, and the limit projection 302a is brought into abutment with the limit hole 303a, as shown in FIG. 40B. Output (hereafter referred to as "X-direction mechanism end—output") of the first Hall device 307a at this time is detected. Then, an output value which is intermediate of the X-direction mechanism end "+" output and the X-direction mechanism end "−" output is calculated, so that a position where the output is detected is set as the reference position with respect to the first direction X of the moving frame 303. Similarly, the setup of the reference position of the moving frame 303 is completed by setting up the reference position with respect to the second direction Y of the moving frame 303.

However, in the image blur correction apparatus 300, when the moving frame 303 is moved to the mechanism end on "+" side of the first direction X as shown in FIG. 41A, the moving frame 303 rotates around a fulcrum, which is one corner of the limit projection 302a. Similarly, when the moving frame 303 is adapted to move to the extent of the mechanism end on "−" side of the first direction X as shown in FIG. 41B, the moving frame 303 rotates around a fulcrum, which is one corner of the limit projection 302a.

If the moving frame 303 rotates, a relative position of the first Hall device 307a and the magnet 309a is shifted to cause an error in the X-direction mechanism end "+" output and the X-direction mechanism end "−" output. Thus, an error arises also in a middle value obtained by computing both the X-direction mechanism end "+" output and the X-direction mechanism end "−" output, and the reference position of the moving frame 303 is set at an inappropriate position. As a result, an issue arises in that the moving frame 303 (correction lens 304) may not be driven or controlled exactly.

It should be noted that if either one of the error in the X-direction mechanism end "+" output or the error of the X-direction mechanism end "−" output is plus and the other is minus, and when absolute values are the same, no shift is caused in the reference position. However, even in such a case, an error arises in the X-direction mechanism end "+" output and the X-direction mechanism end "−" output to cause a difference between the position of the moving frame 303 detected from the output of the first Hall device 307a and the actual position of the moving frame 303. Therefore, it has not been possible to perform accurate drive and control of the moving frame 303 (correction lens 304).

SUMMARY OF THE INVENTION

The issue to be solved is that devices required for setting up the reference position of the moving frame becomes enormous and the costs increase considerably, when the image blur correction apparatus is mounted in the lens barrel and the reference position of the moving frame is set up by using the chart.

For a solution of the issue, the moving frame may be moved in the first direction and the second direction until the movement is limited to set up the reference position of the moving frame based on the output of the position detector at that time. However, in the image blur correction apparatus in which the moving frame can move on the plane orthogonal to the optical axis of the correction lens, even if the moving frame is limited from moving in the direction in which the force acts, the moving frame rotates. Therefore, there is an issue that an error arises in the output of the position detector and it becomes impossible to perform the accurate drive and control of the moving frame (correction lens).

An image blur correction apparatus according to an embodiment of the present invention includes a correction lens, a moving frame for holding the correction lens, a support frame for supporting the moving frame through a move guide in a manner the frame may move on a plane orthogonal to an optical axis of the correction lens, a first electric actuator for generating a force to move the moving frame to a first direction orthogonal to the optical axis of the correction lens, a second electric actuator for generating a force to move the moving frame in the second direction which is a direction orthogonal to the optical axis of the correction lens and is also orthogonal to the first direction, and an operation limit mechanism for limiting the moving frame from moving in the first direction and the second direction, and preventing the moving frame from rotating in the limit position.

The lens barrel of in an embodiment of the present invention includes a cylinder body in which a lens system is accommodated and an image blur correction apparatus having a correction lens for correcting image blurs in the lens system. The image blur correction apparatus for the lens barrel includes a moving frame for holding the correction lens, a support frame for supporting the moving frame through a move guide in a movable manner on a plane orthogonal to an optical axis of the correction lens, a first electric actuator for generating a force to move the moving frame in a first direction orthogonal to the optical axis of the correction lens, a second electric actuator for generating a force to move the moving frame in a second direction which is a direction orthogonal to the optical axis of the correction lens and is also orthogonal to the first direction, and an operation limit mechanism for limiting the moving frame from moving in the first direction and the second direction, and preventing the moving frame from rotating in the limit position.

Further, the image capture apparatus in an embodiment of the present invention includes the lens barrel having the cylinder body in which the lens system is accommodated, and the image blur correction apparatus having the correction lens for correcting the image blurs in the lens system, and an apparatus body to which the lens barrel is mounted. The image blur correction apparatus in accordance with this image capture apparatus includes a moving frame for holding the correction lens, a support frame for supporting the moving frame through a move guide in a manner movable on a plane orthogonal to an optical axis of the correction lens, a first electric actuator for generating a force to move the moving frame in a first direction orthogonal to the optical axis of the correction lens, a second electric actuator for generating a force to move the moving frame in a second direction which is a direction orthogonal to the optical axis of the correction lens and is also orthogonal to the first direction, and an operation limit mechanism for limiting the moving frame from moving in the first direction and the second direction, and preventing the moving frame from rotating in the limit position.

BRIEF DESCRIPTION OF THE DRAWINGS

FIG. 10 shows a relation between a position of a Hall device with respect to a magnet in accordance with the image blur correction apparatus of the present invention and a magnetic flux density, in which

FIG. 11 shows a move guide in accordance with the image blur correction apparatus of the present invention and a holding part thereof, in which FIG. 11A is an illustrative diagram of a sphere which is a first embodiment of the move guide, and the holding part includes a circular recess unit having a diameter sufficiently larger than a diameter of the sphere.

FIG. 13 shows a state where the moving frame moves to "+" side of the first direction from the state in FIG. 12, in which

FIG. 14 shows a state where the moving frame moves to side of the first direction from the state of FIG. 12, in which

FIG. 15 shows a state where the moving frame moves to "+" side of the second direction from the state of FIG. 12, in which

FIG. 16 shows a state where the moving frame moves to side of the second direction from the state of FIG. 12, in which

21A is a plan view of the image blur correction apparatus.

FIG. 22 shows a fifth embodiment of the image blur correction apparatus of the present invention, in which

FIG. 23 is a sixth embodiment of the image blur correction apparatus of the present invention, in which

FIG. 24 is a seventh embodiment of the image blur correction apparatus of the present invention, in which

FIG. 25 is an eighth embodiment of the image blur correction apparatus of the present invention, in which

FIG. 26 is a ninth embodiment of the image blur correction apparatus of the present invention, in which

FIG. 27 is a tenth embodiment of the image blur correction apparatus of the present invention, in which

FIG. 28 is an eleventh embodiment of the image blur correction apparatus of the present invention, in which

FIG. 30 shows the first embodiment of the lens barrel of the present invention, in which FIG. 30A shows a front view and FIG. 30B shows a left side view.

DETAILED DESCRIPTION OF THE EMBODIMENT

An image blur correction apparatus in which a reference position of a moving frame movable on a plane orthogonal to an optical axis of a correction lens can be set correctly and easily by the single apparatus, and a lens barrel and an image capture apparatus having the image blur correction apparatus are realized with simple structures.

Figure 1:
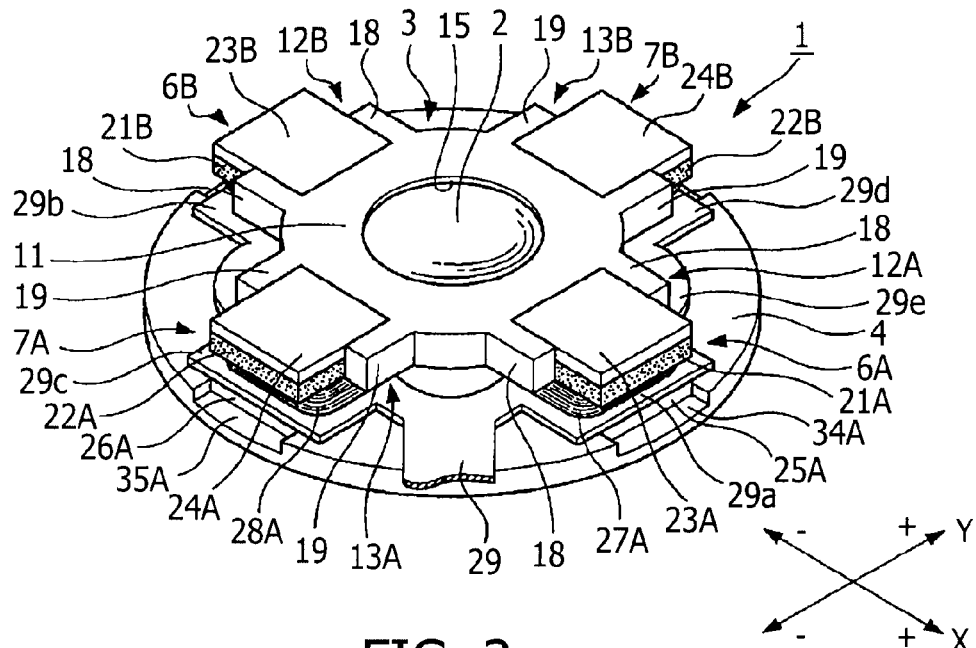
FIG. 1 shows a first embodiment of an image blur correction apparatus of the present invention, and is a perspective view of the image blur correction apparatus having an electric actuator of a moving magnet type.
Figure 2:
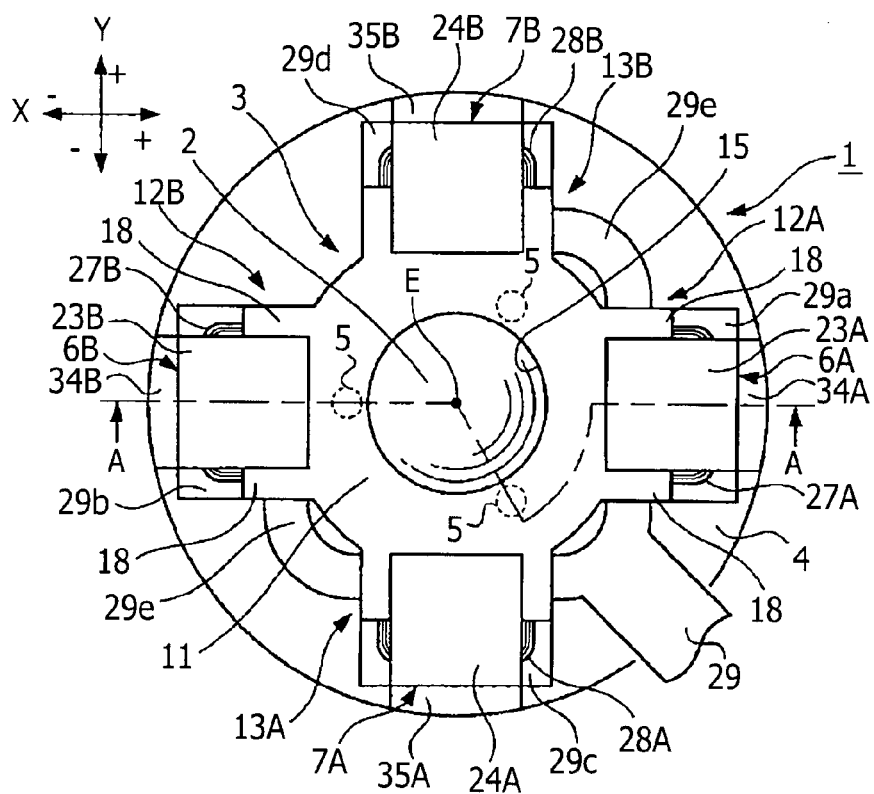
FIG. 2 is a plan view showing the first embodiment of the image blur correction apparatus of the present invention.
Figure 3:
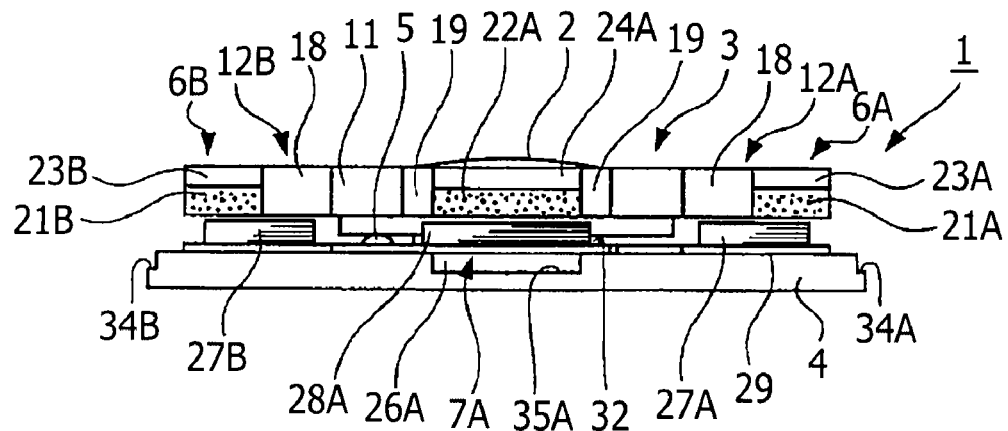
FIG. 3 is a front view showing the first embodiment of the image blur correction apparatus of the present invention.
Figure 4:
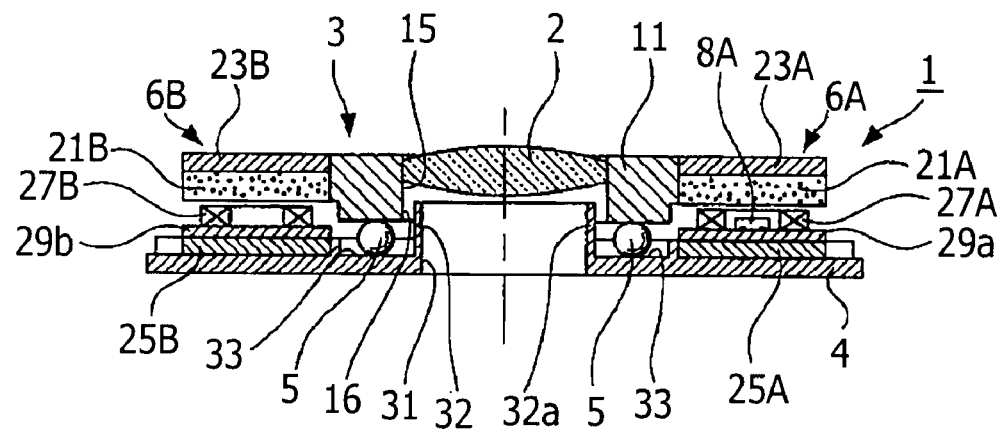
FIG. 4 is a cross sectional view taken along A-A line in the image blur correction apparatus as shown in FIG. 2.
Figure 5:
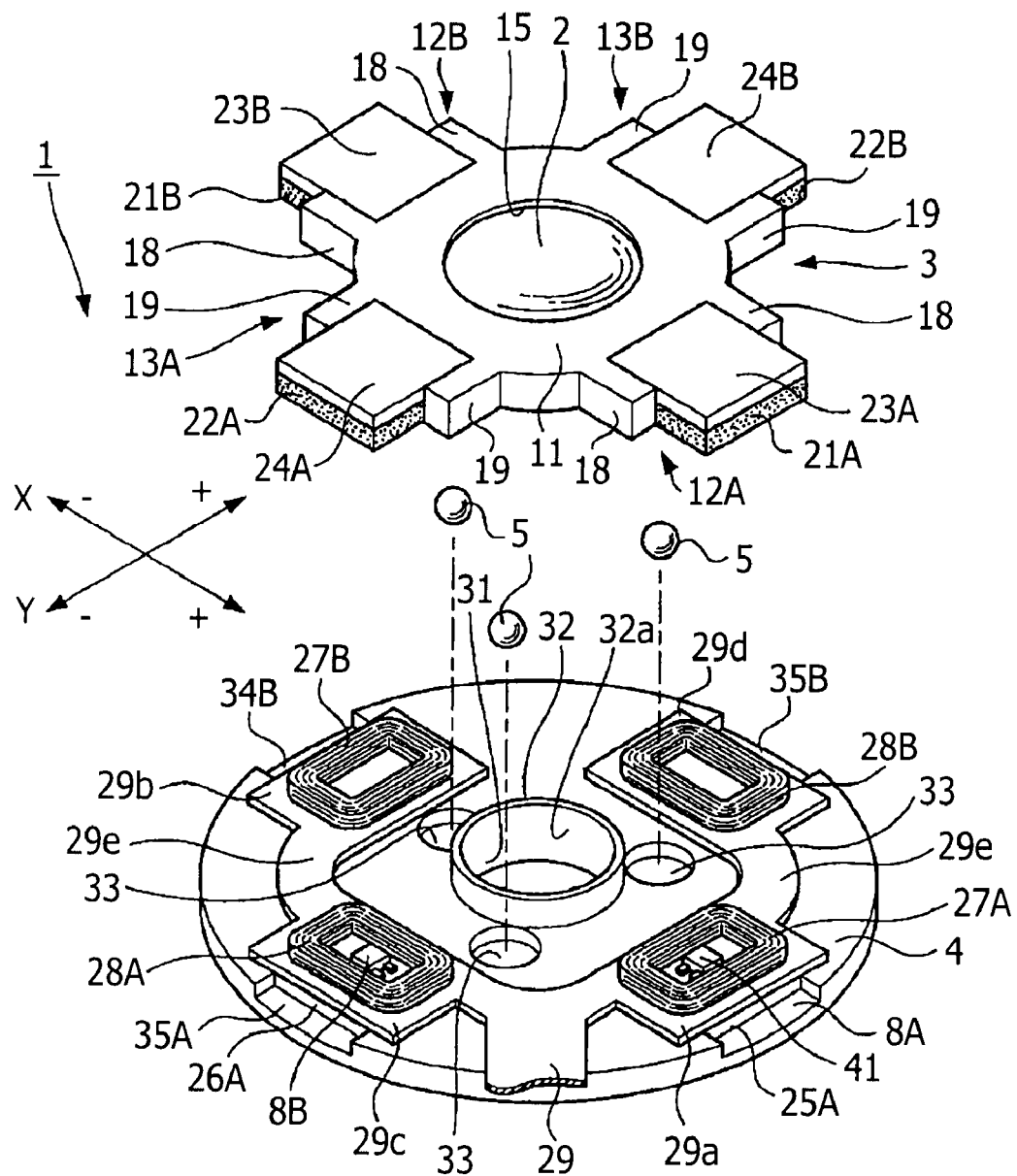
FIG. 5 is an exploded perspective view showing by exploding the first embodiment of the image blur correction apparatus in the present invention.
Figure 6:
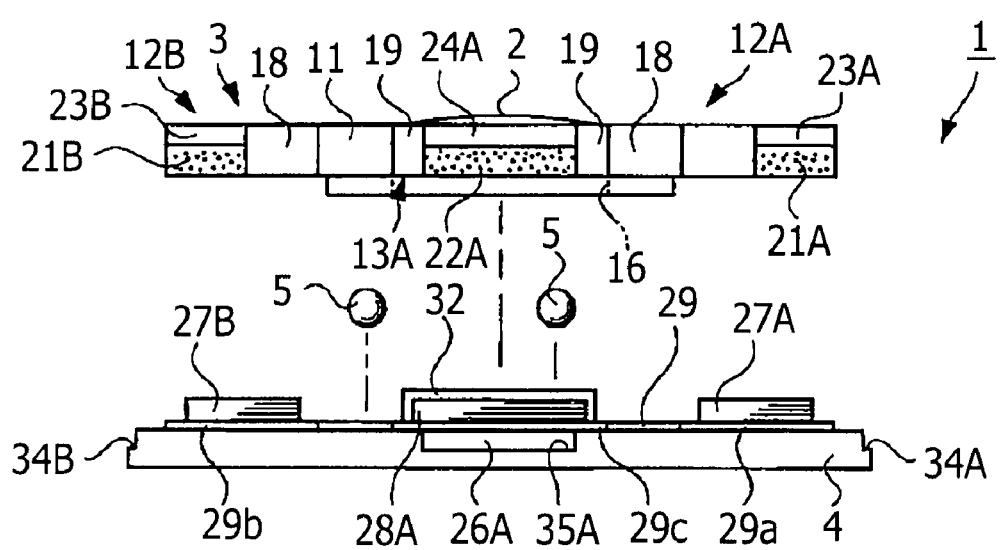
FIG. 6 is a illustrative diagram of an exploded state of the first embodiment of the image blur correction apparatus in the present invention, as viewed from the front.
Figure 7:
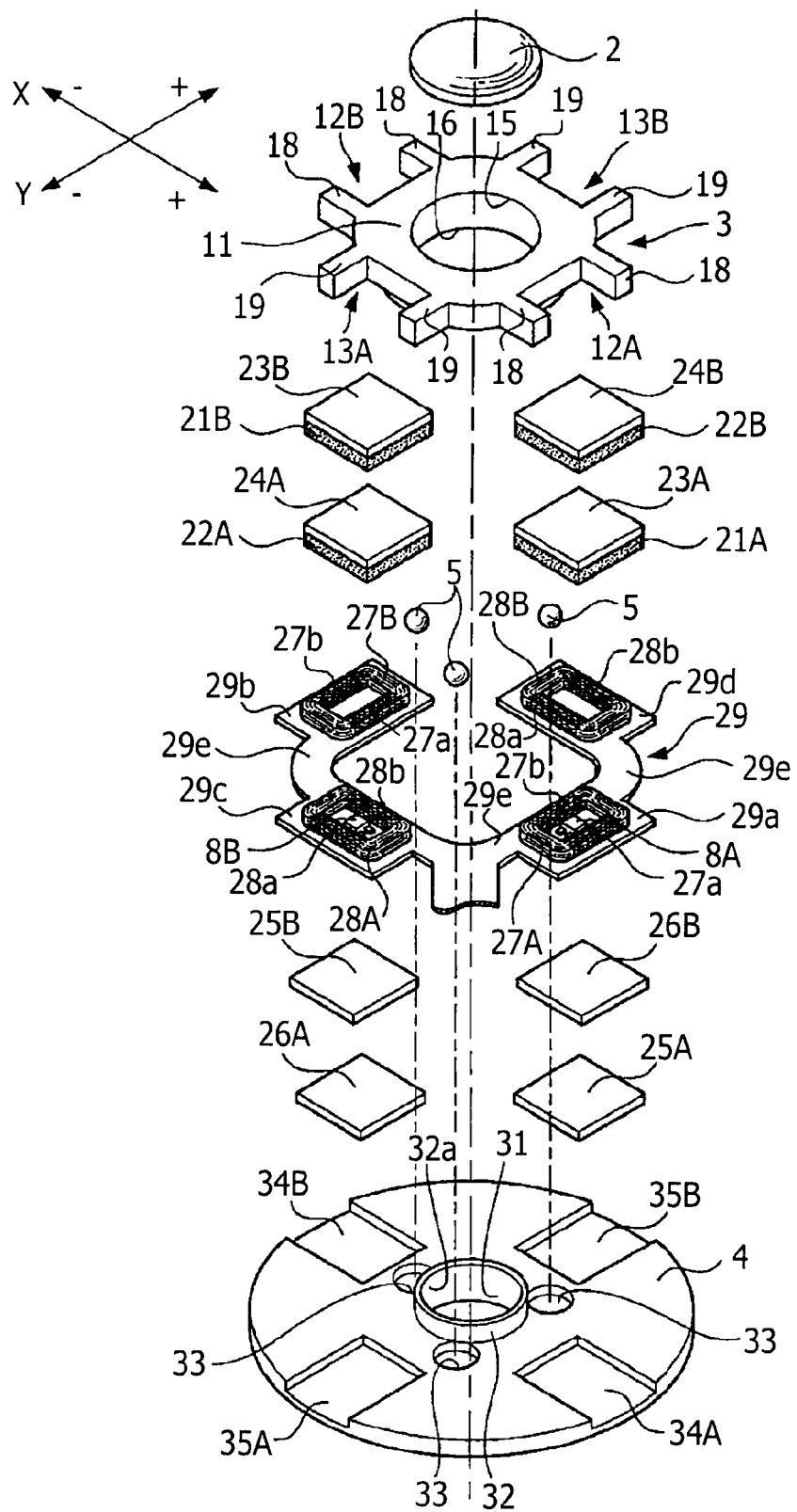
FIG. 7 is an exploded perspective view in which the first embodiment of the image blur correction apparatus of the present invention is exploded on a component basis.
Figure 8:
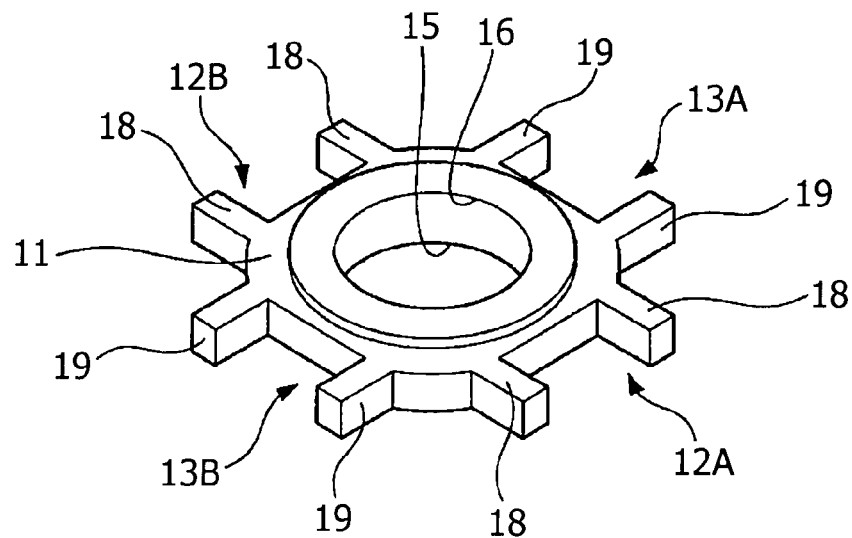
FIG. 8 is a perspective view showing a state where an undersurface of the moving frame shown in FIG. 7 is turned up.
Figure 9:
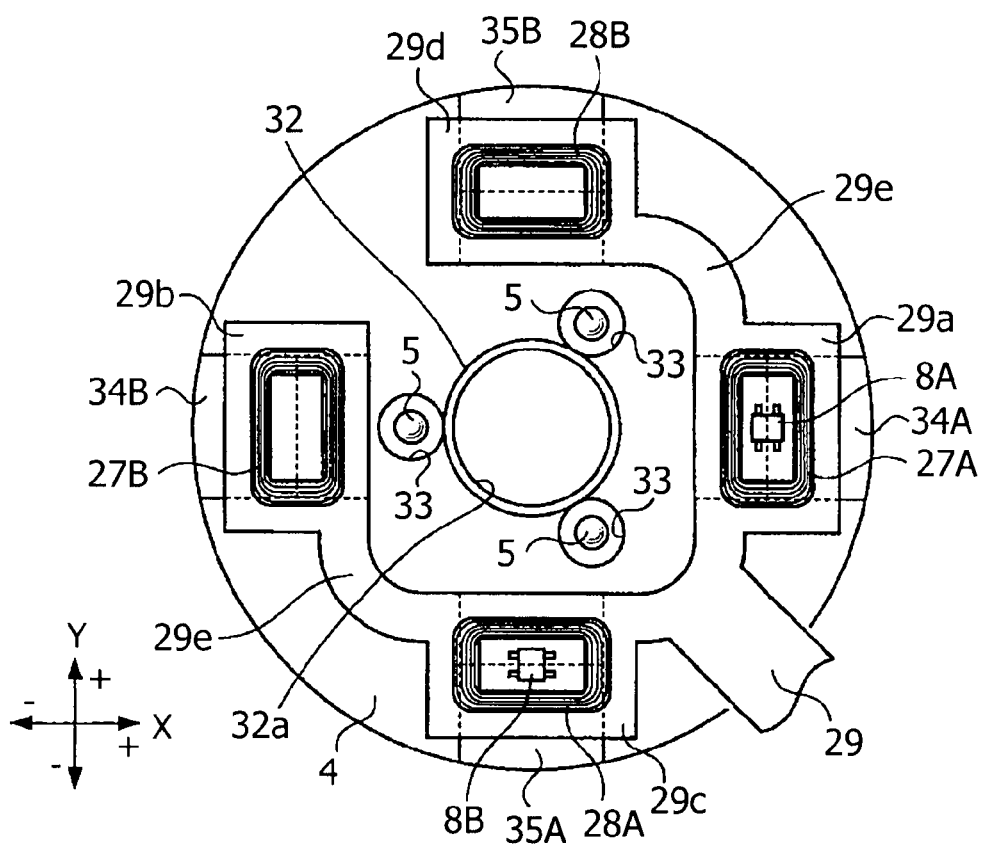
FIG. 9 is a illustrative diagram showing an arrangement of two position detectors in accordance with the first embodiment of the image blur correction apparatus in the present invention.
Figure 10A:
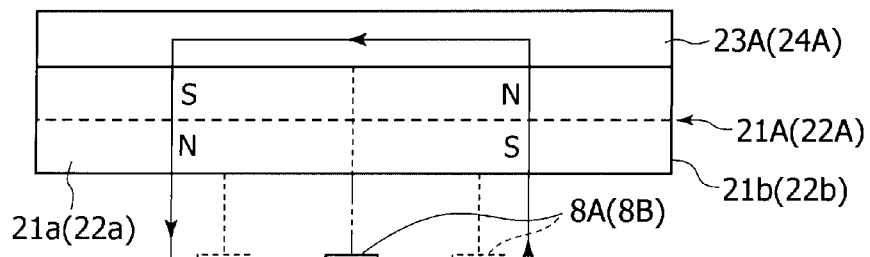
Figure 10B:
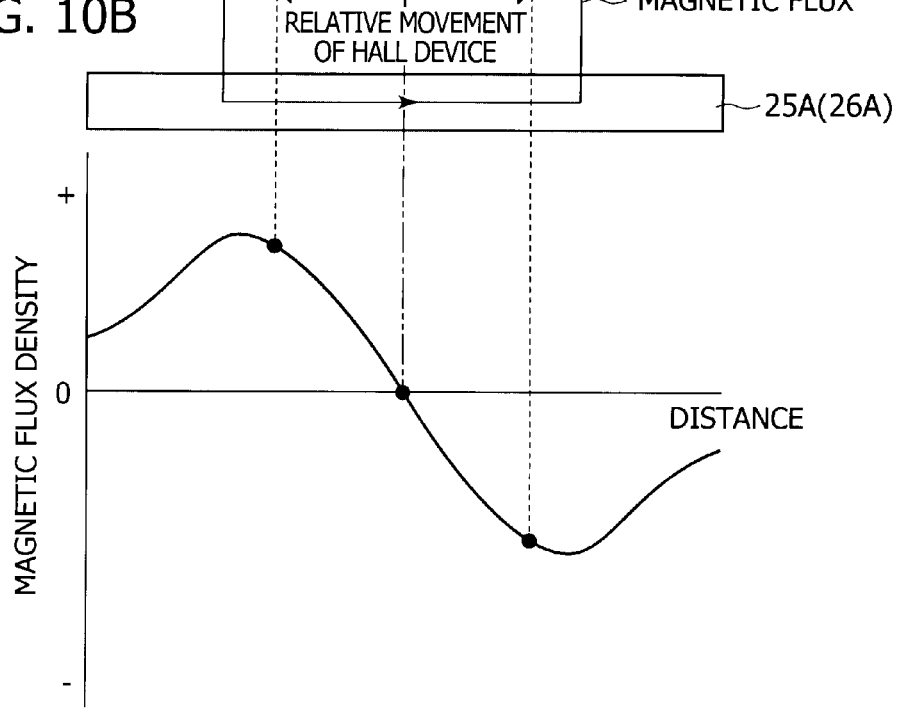
FIG. 10B is a graph showing a relation of the magnetic flux density with a distance moved between the Hall device and the magnet.
Figure 12A:
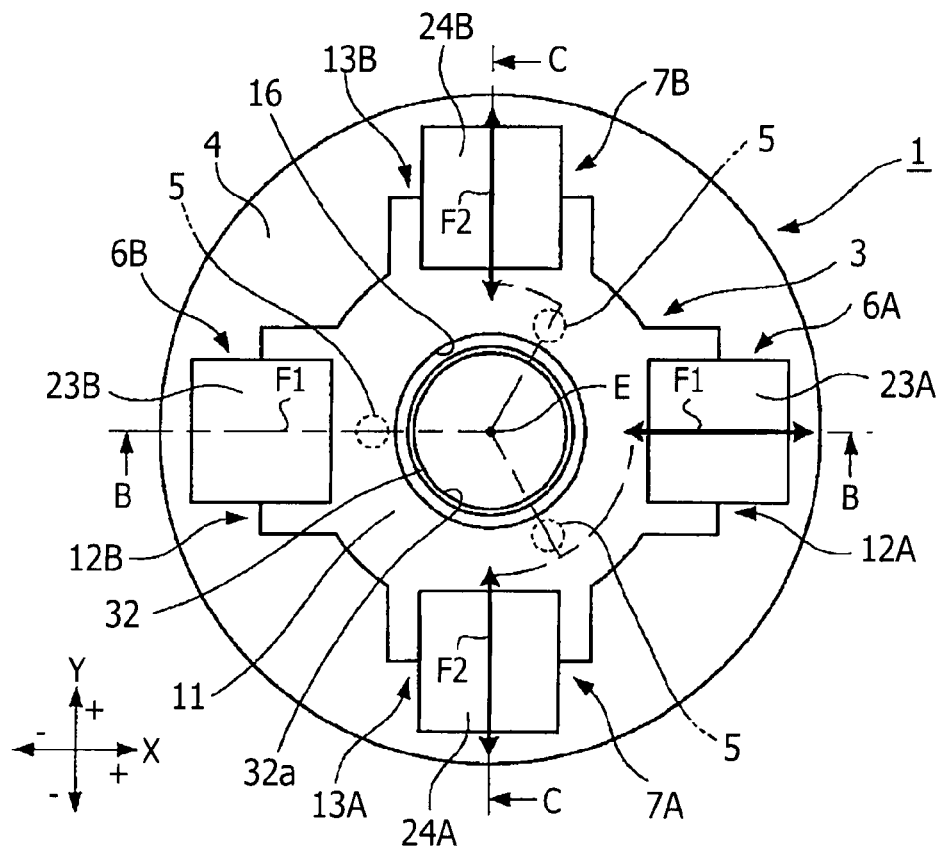
FIG. 12A is a plan view showing a state where the moving frame is at a reference position.
Figure 12B:
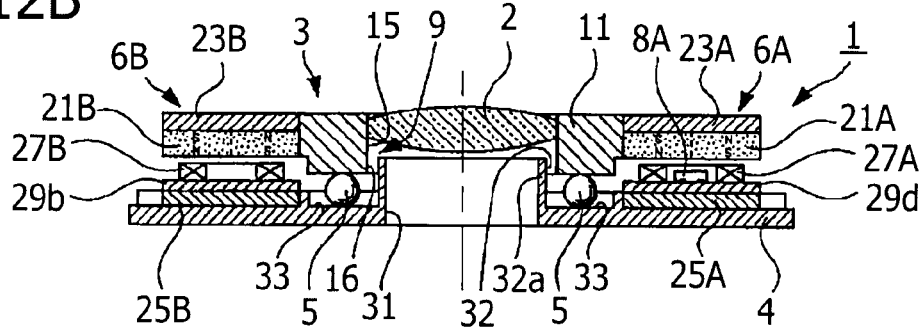
FIG. 12B is a cross sectional view taken along B-B line as shown in FIG. 12A.
Figure 12C:
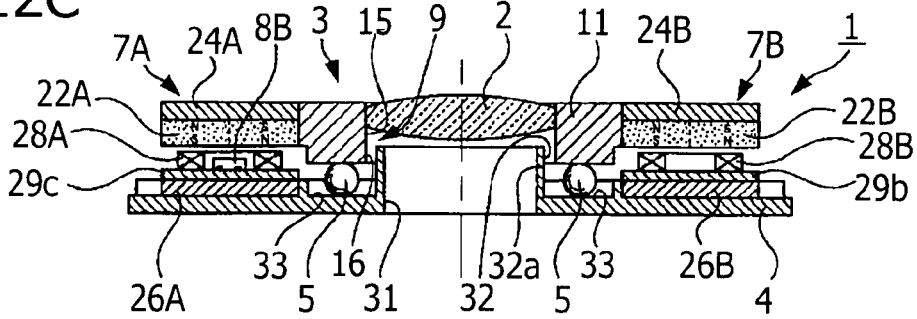
FIG. 12C is a cross sectional view taken along C-C line as shown in FIG. 12A.
Figure 13A:
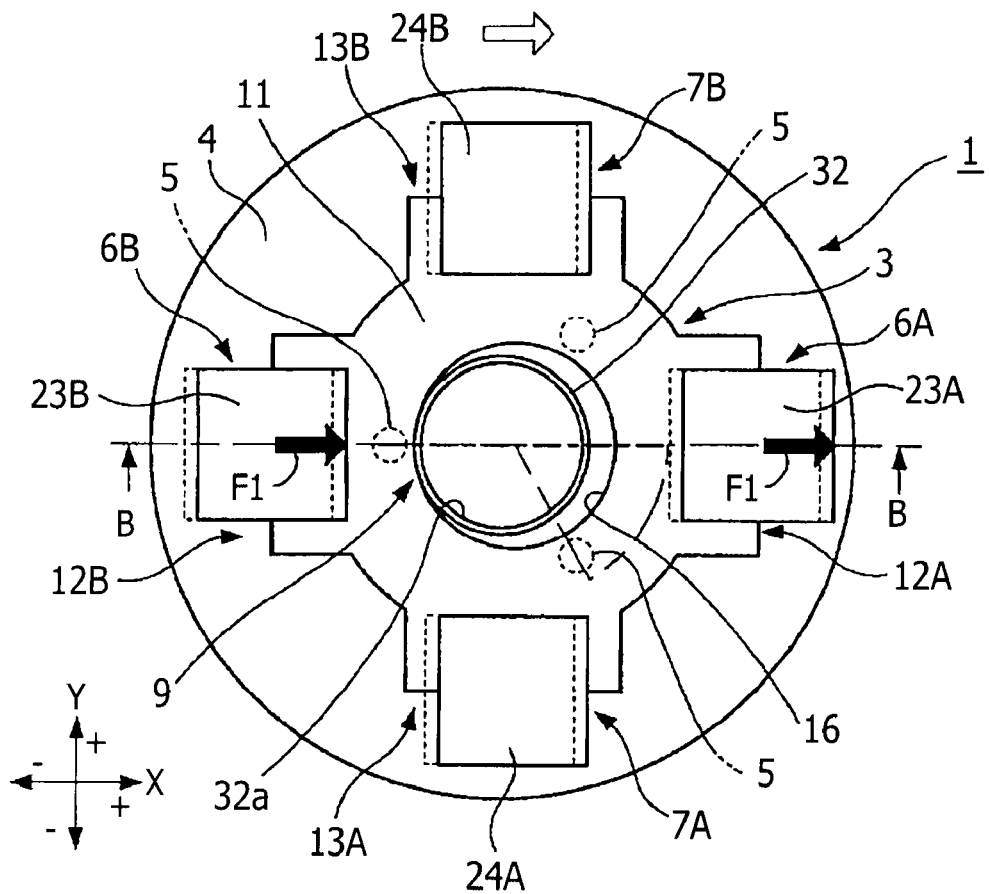
FIG. 13A is a plan view and FIG. 13B is a cross sectional view taken along B-B line.
Figure 13B:
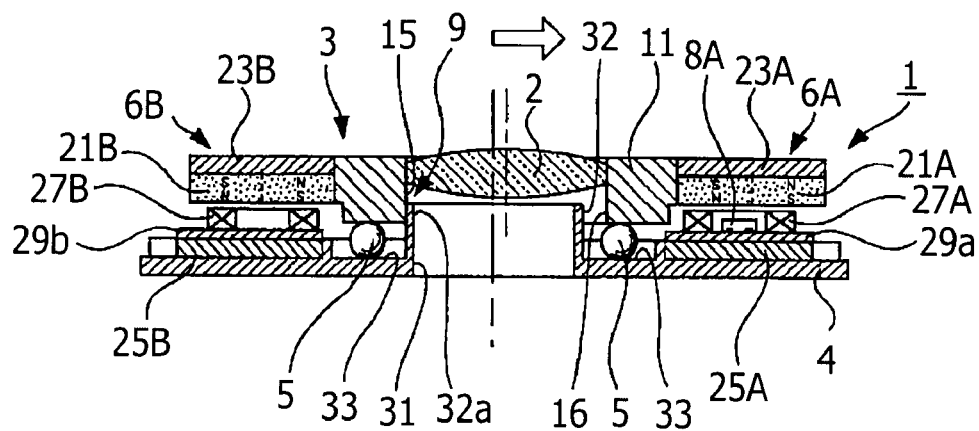
Figure 14A:
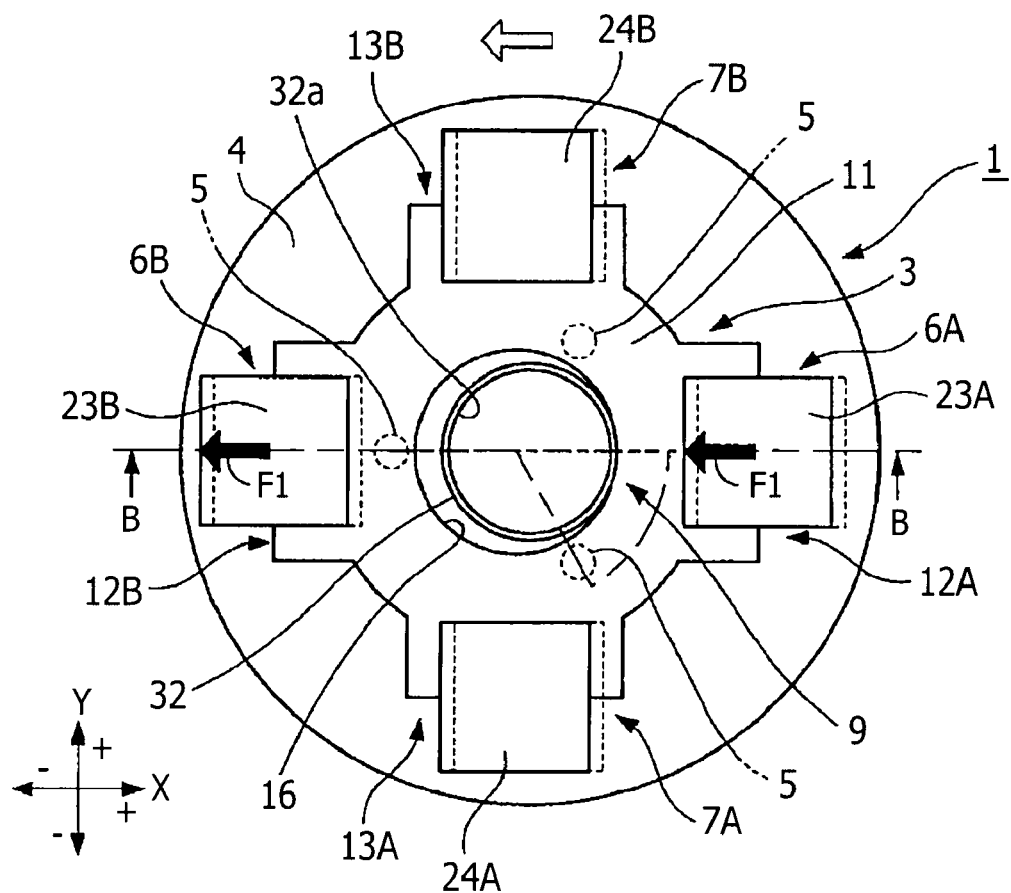
FIG. 14A is a plan view and FIG. 14B is a cross sectional view taken along B-B line.
Figure 14B:
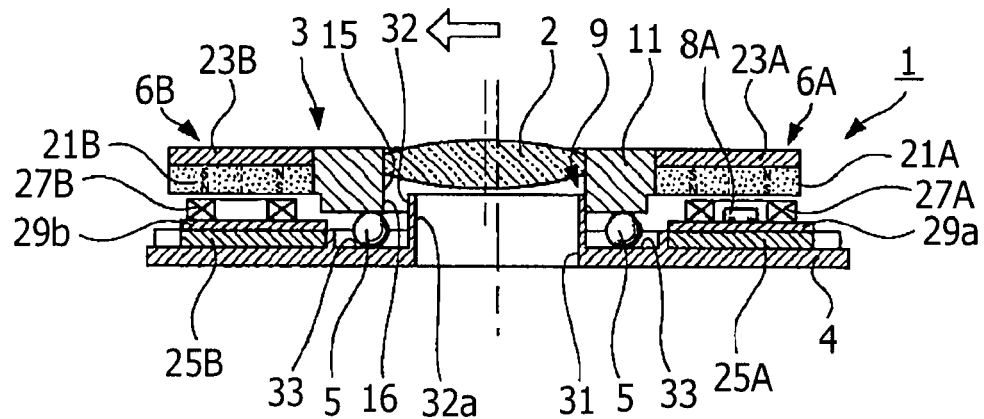
Figure 15A:
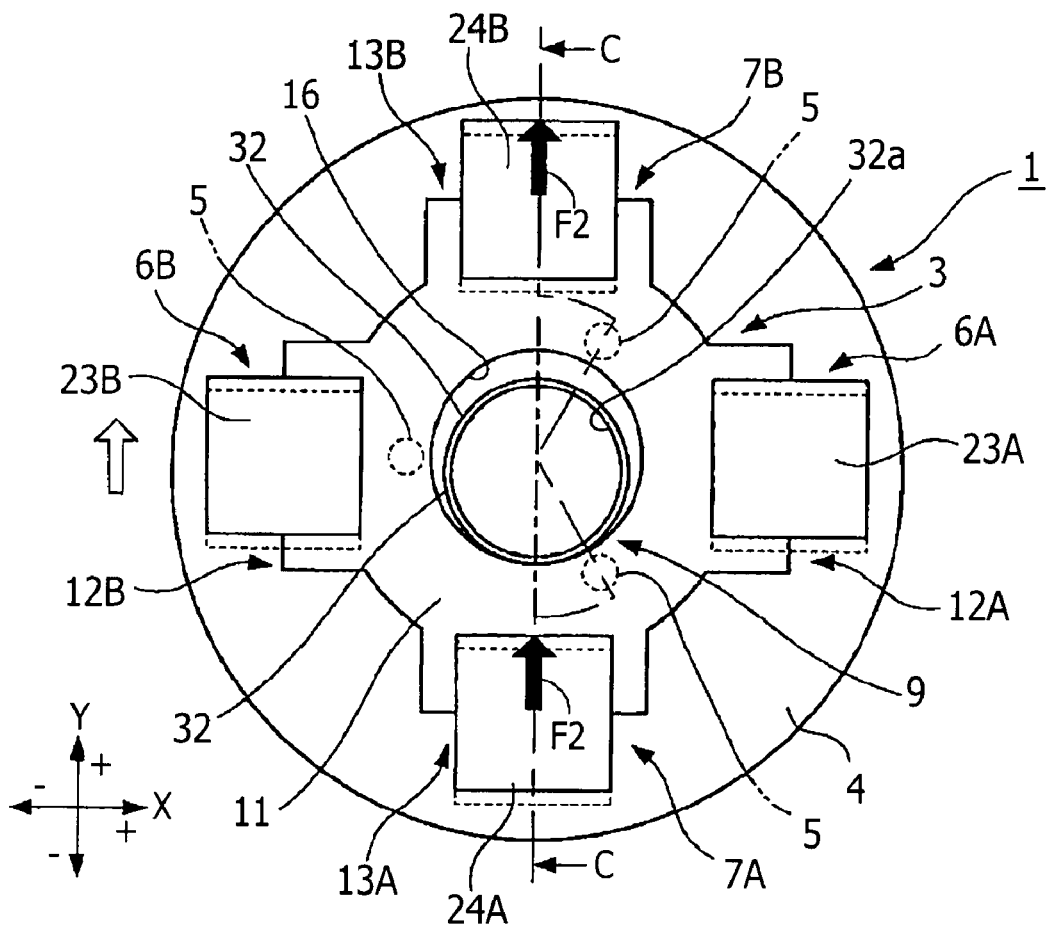
FIG. 15A is a plan view and FIG. 15B is a cross sectional view taken along C-C line.
Figure 15B:
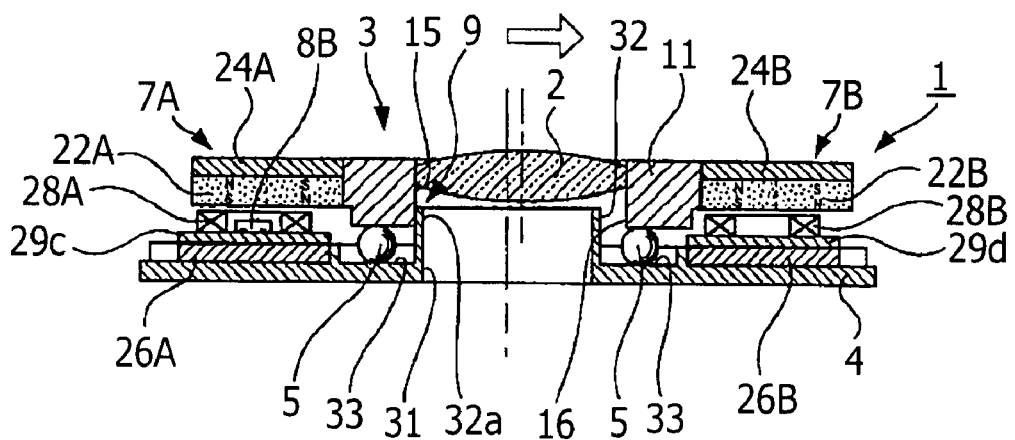
Figure 16A:
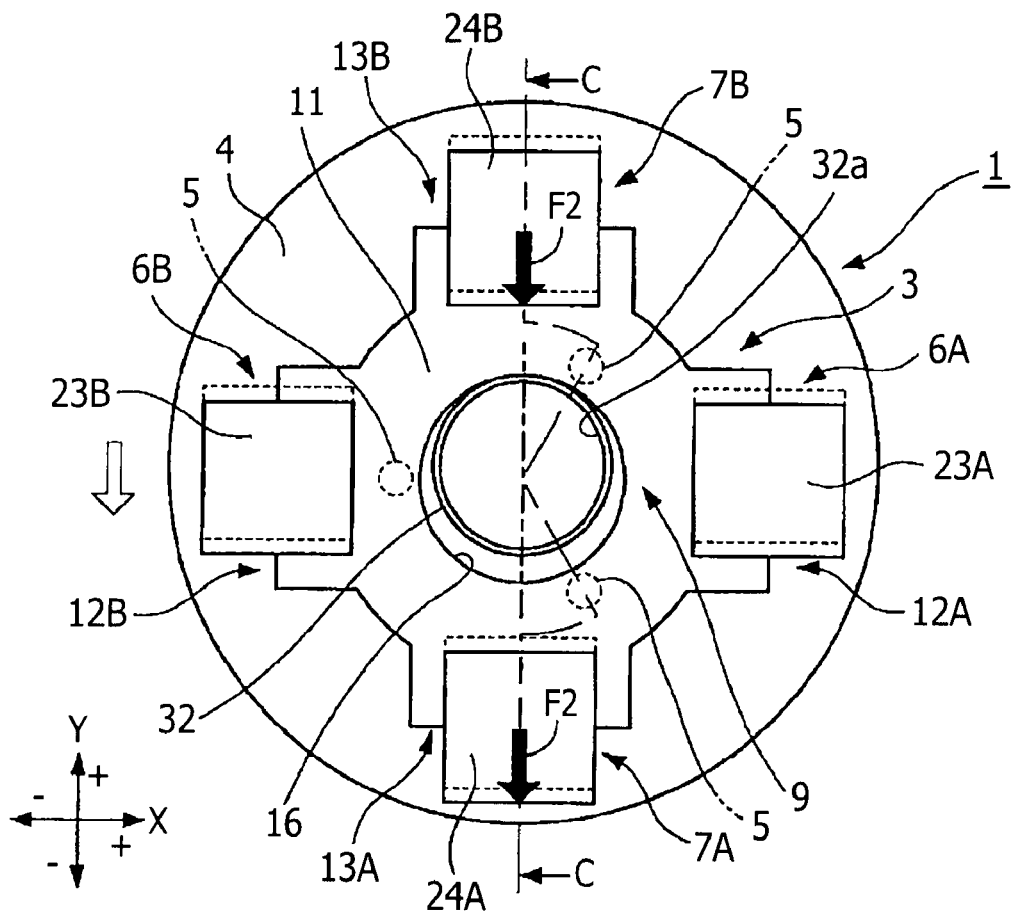
FIG. 16A is a plan view and FIG. 16B is a cross sectional view taken along C-C line.
Figure 16B:
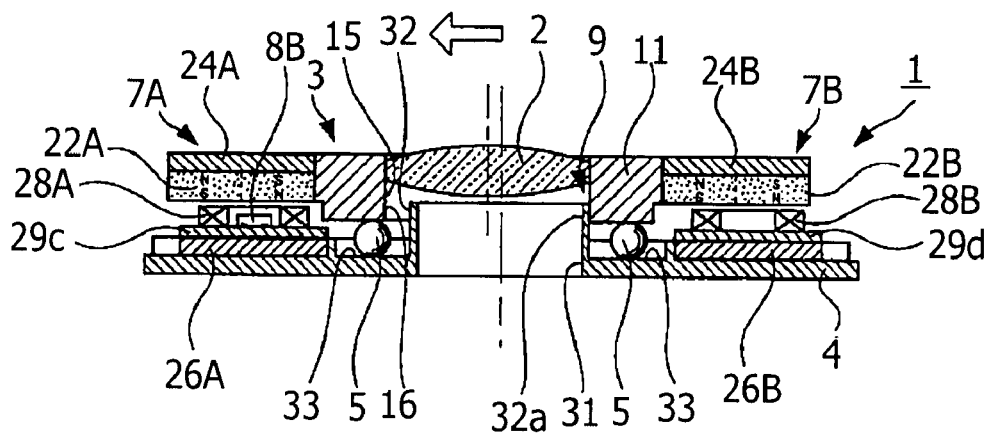

Hereafter, embodiments of the present invention will be described with reference to the accompanying drawings. FIGS. 1-38 illustrate the embodiments of the present invention. FIG. 1 is a perspective view showing a first embodiment of an image blur correction apparatus of the present invention, FIG. 2 is a plan view, FIG. 3 is a front view, FIG. 4 is a sectional view taken along A-A line shown in FIG. 1, FIG. 5 is an exploded perspective view, and FIG. 6 is an illustrative diagram where a state shown in FIG. 5 is viewed from the front side. FIG. 7 is a perspective view illustrating components, FIG. 8 is a perspective view in a state where an under-surface of the moving frame shown in FIG. 7 is turned up, FIG. 9 is a diagram illustrating an arrangement of position detectors in accordance with the image blur correction apparatus of the present invention, FIG. 10 illustrates a position detection mechanism, in which FIG. 10A is a diagram illustrating a schematic structure, and FIG. 10B is a graph showing a relationship between a position of a Hall device with respect to a magnet and a magnetic flux density, FIGS. 11A-11D are illustrative diagram showing examples of move guides, FIGS. 12A-12C are diagram illustrating a state where the moving frame is in a reference position, FIGS. 13A and 13B are diagrams illustrating a state where the moving frame moves to "+" side of the first direction, FIGS. 14A and 14B are diagram illustrating a state where the moving frame moves to "−" side of the first direction, FIGS. 15A and 15B are diagram illustrating a state where the moving frame moves to "+" side of the second direction, and FIGS. 16A and 16B are diagrams illustrating a state where the moving frame moves to "−" side of the second direction.

Figure 17:
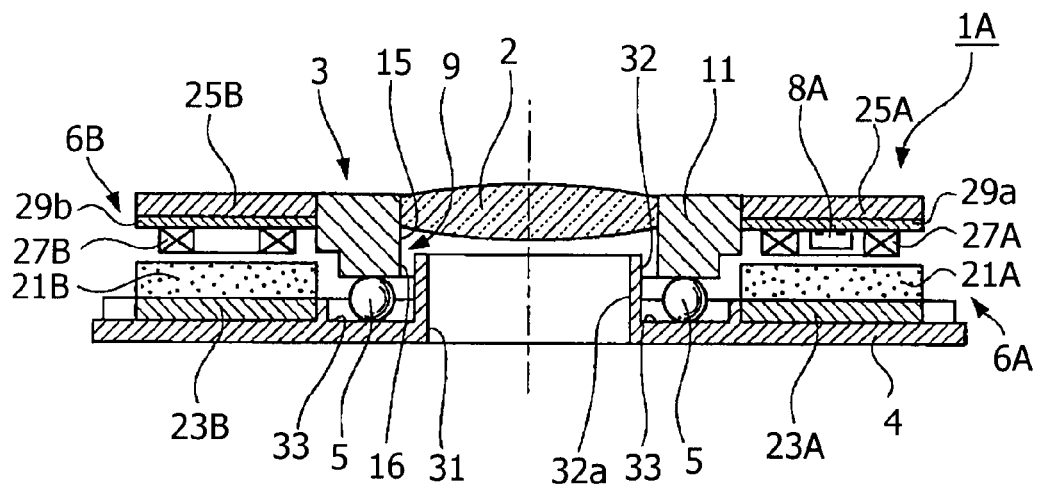
FIG. 17 shows a second embodiment of the image blur correction apparatus of the present invention, and is a cross sectional view of the image blur correction apparatus having a moving-coil type electric actuator.
Figure 18:
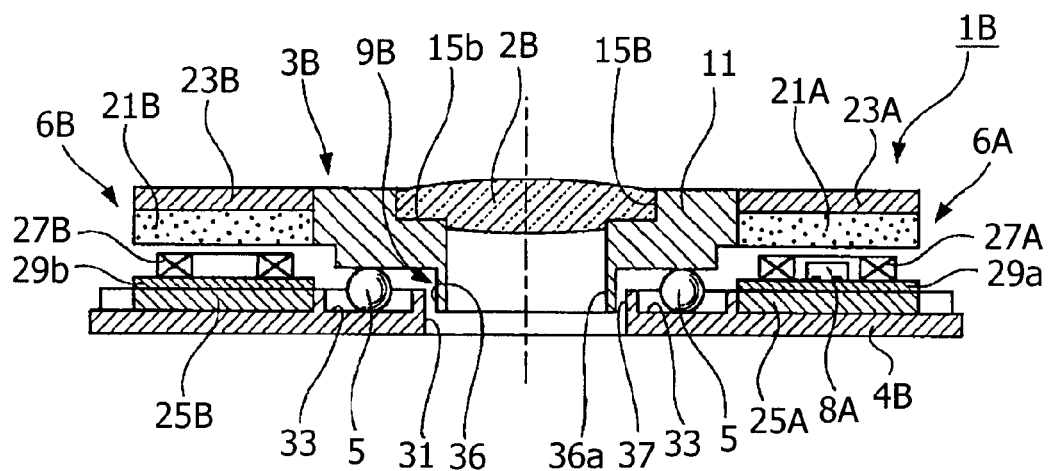
FIG. 18 is a cross sectional view showing a third embodiment of the image blur correction apparatus of the present invention.
Figure 19:
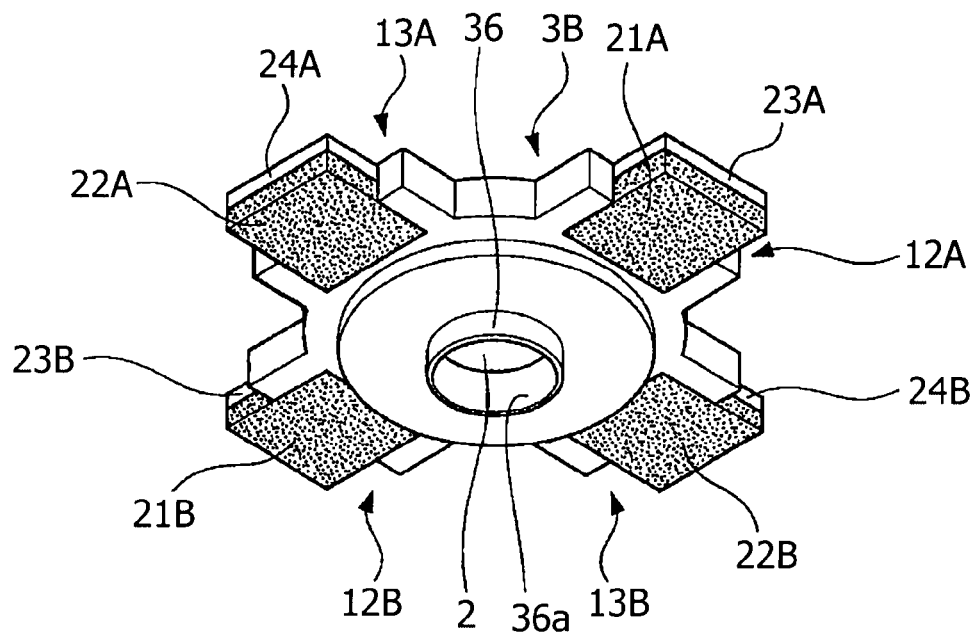
FIG. 19 illustrates the third embodiment of the image blur correction apparatus of the present invention, in which the moving frame is viewed from underneath.
Figure 20:
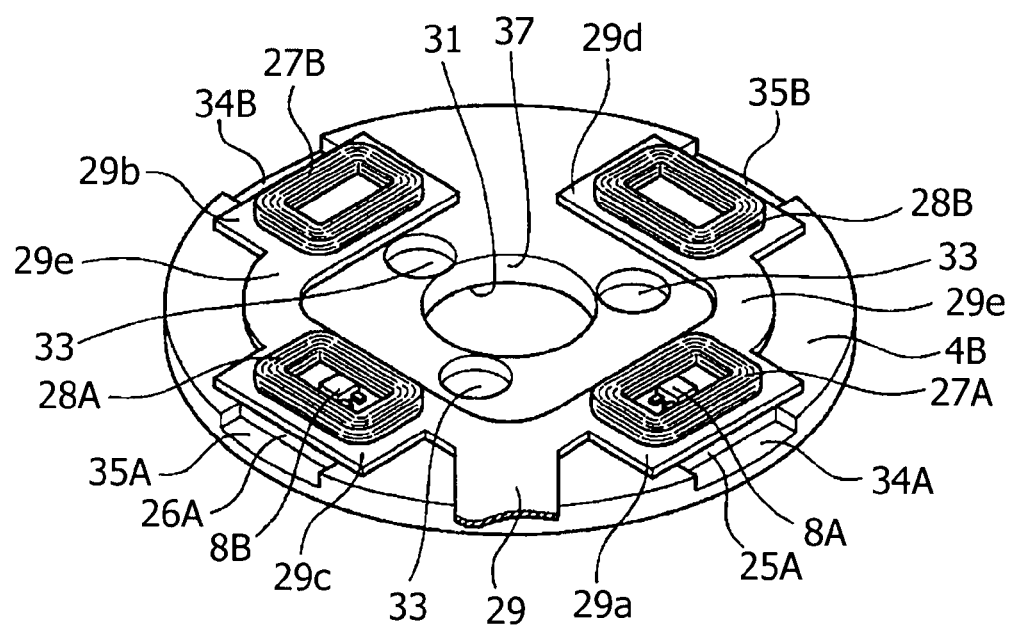
FIG. 20 illustrates the third embodiment of the image blur correction apparatus of the present invention, in which a support frame is viewed from above.
Figure 21A:
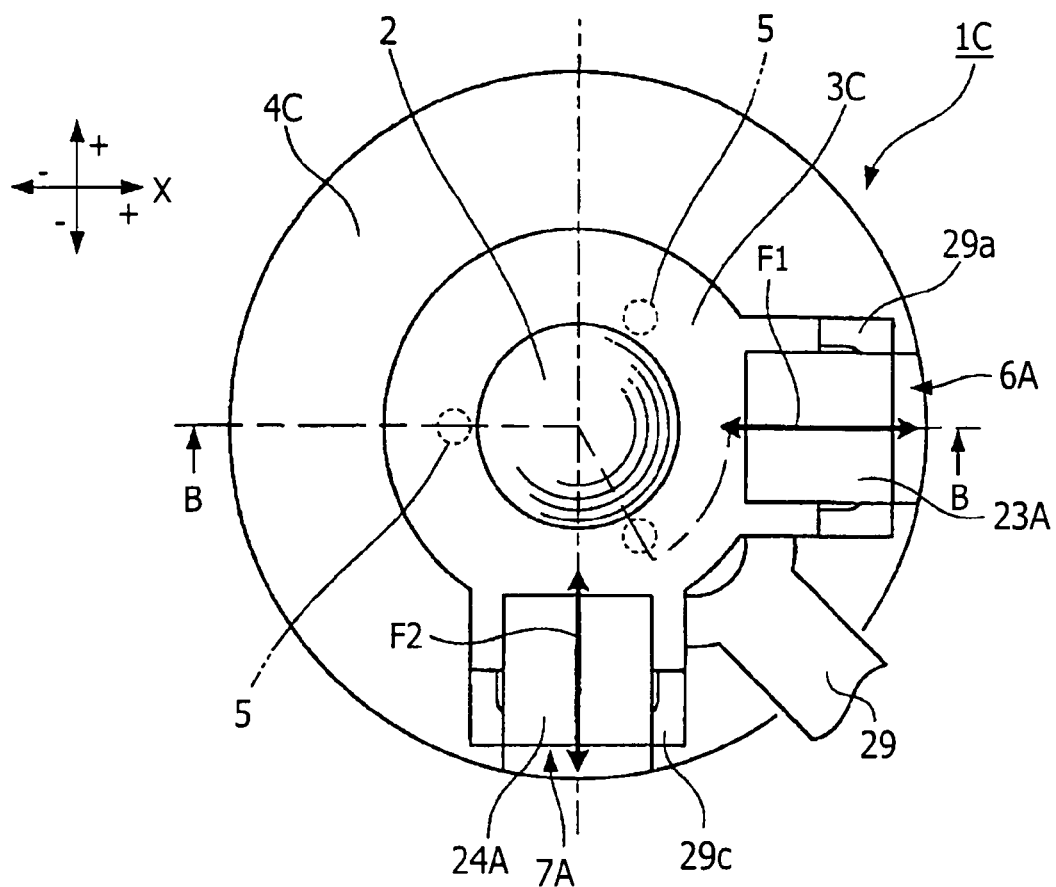
FIG. 21 shows a fourth embodiment of the image blur correction apparatus of the present invention, in which FIG.
FIG. 21B is a cross sectional view taken along B-B line as shown in FIG. 21A.
Figure 21B:
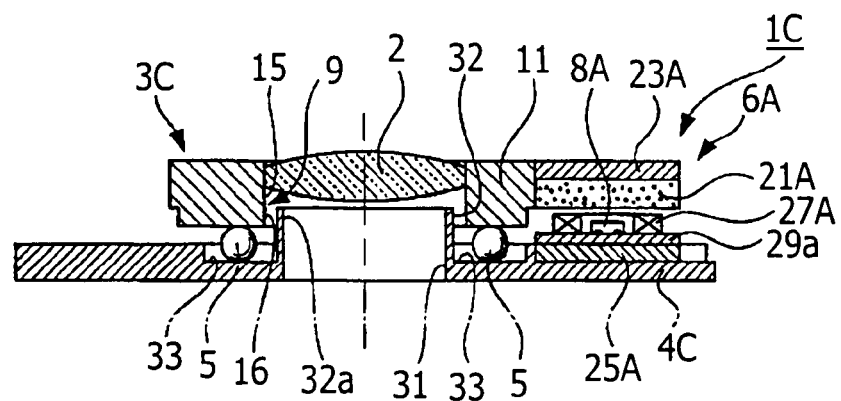
Figure 22A:
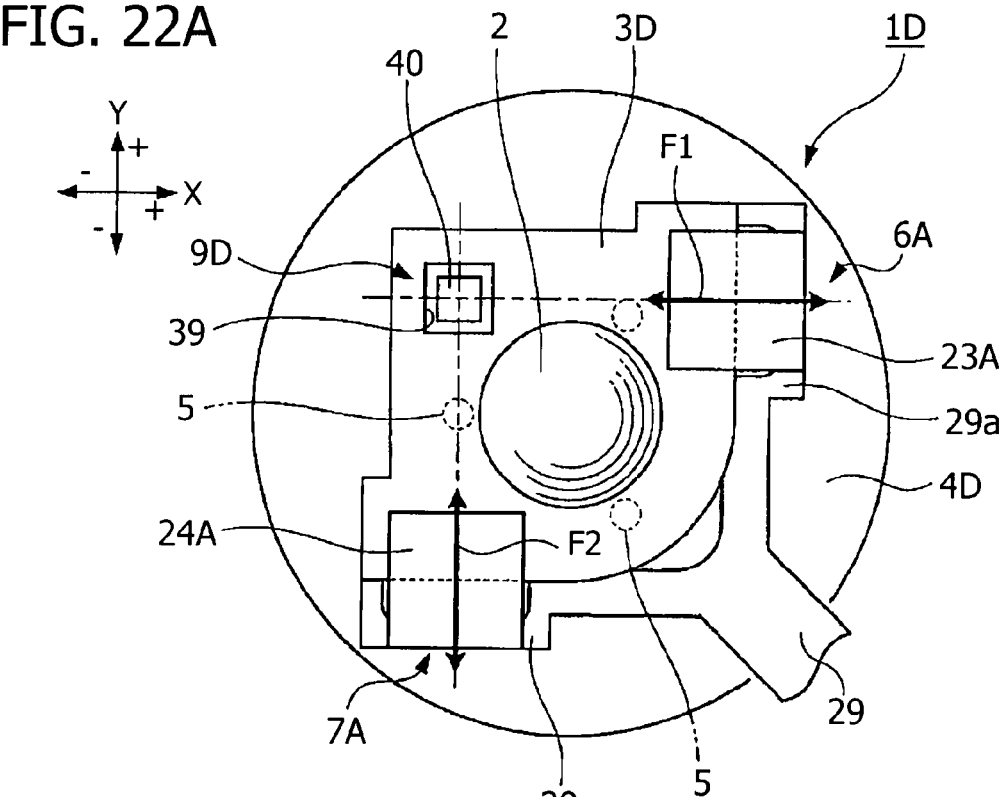
FIG. 22A is a plan view of the image blur correction apparatus.
Figure 22B:
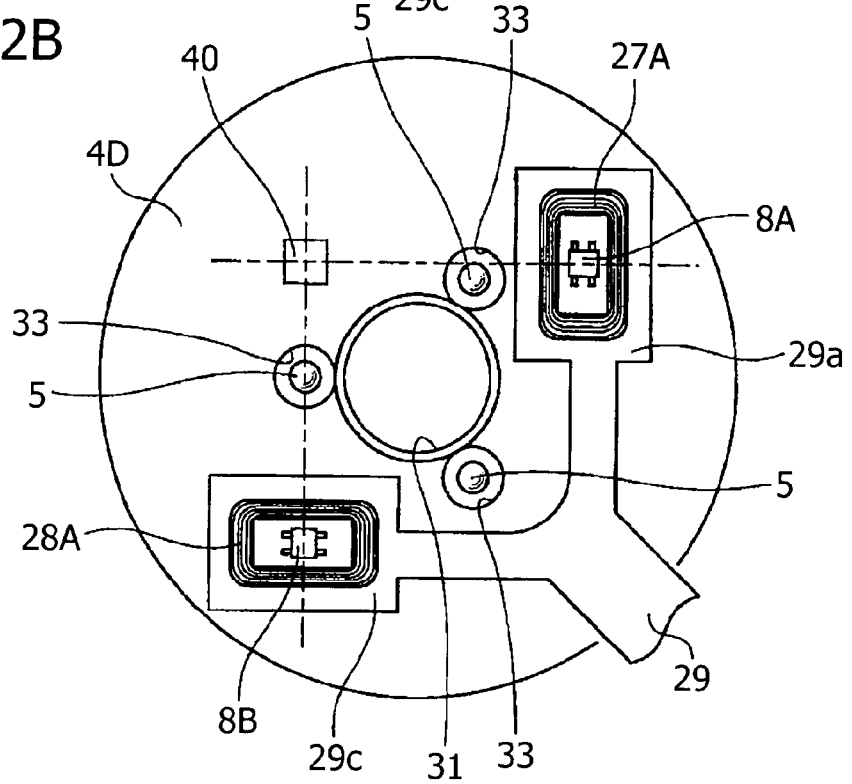
FIG. 22B is a plan view showing a state where the moving frame is removed from the image blur correction apparatus as shown in FIG. 22A.
Figure 23A:
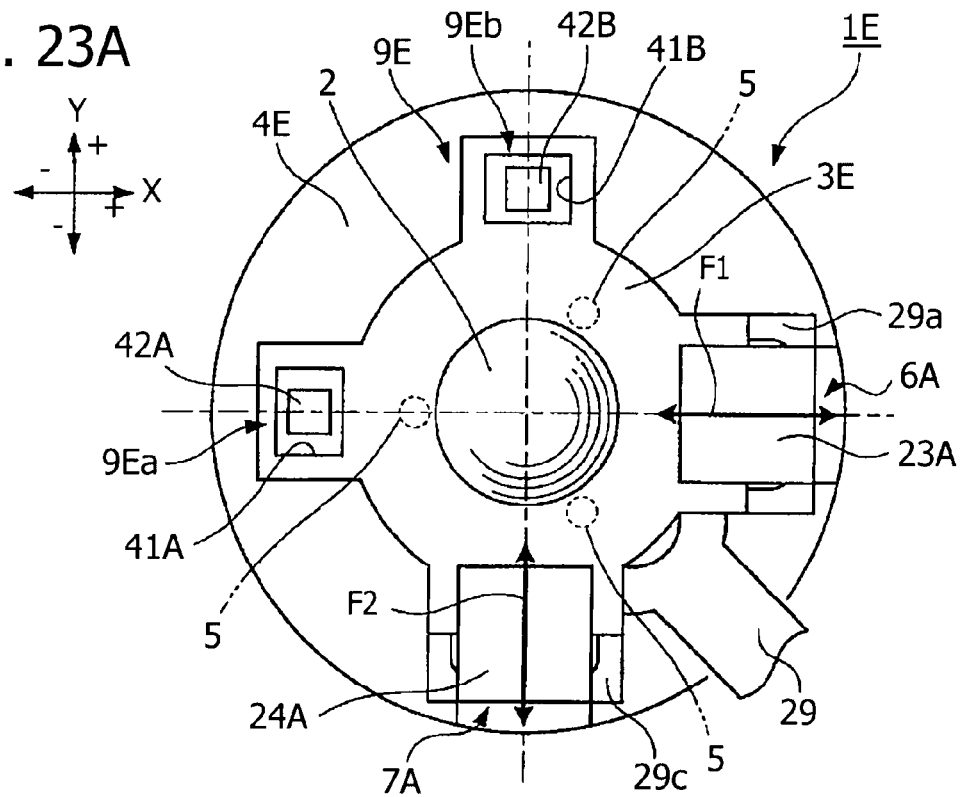
FIG. 23A is a plan view of the image blur correction apparatus.
Figure 23B:
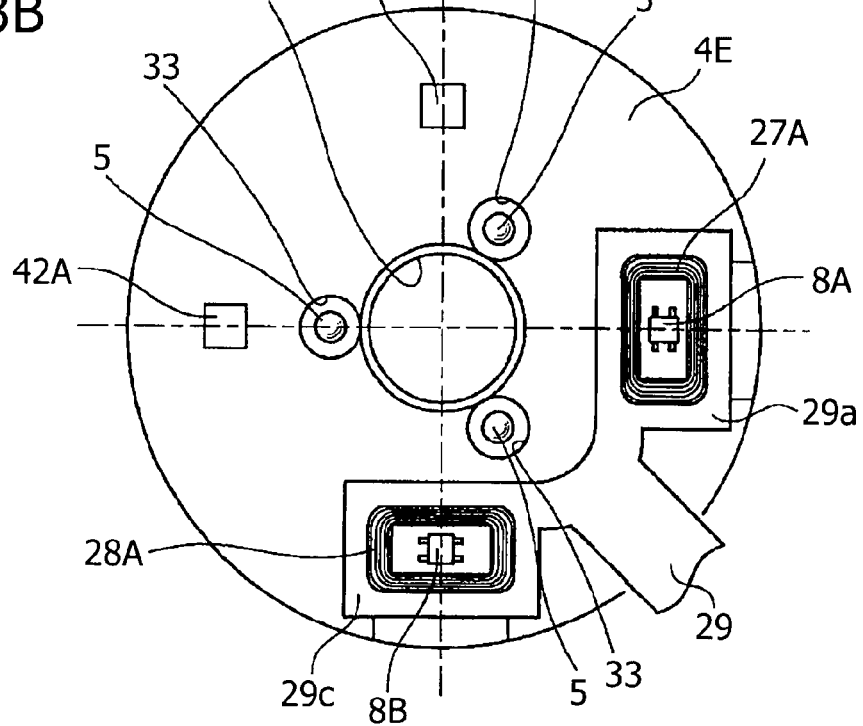
FIG. 23B is a plan view showing a state where the moving frame is removed from the image blur correction apparatus as shown in FIG. 23A.
Figure 24A:
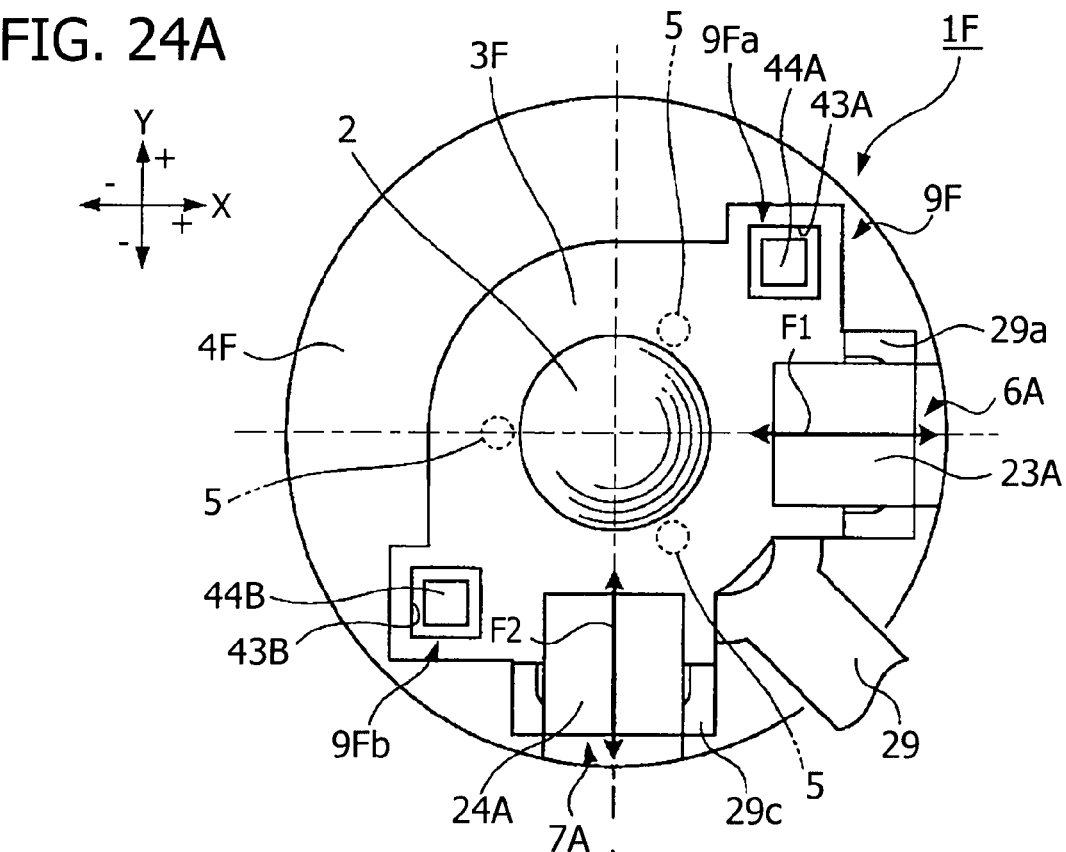
FIG. 24A is a plan view of the image blur correction apparatus.
Figure 24B:
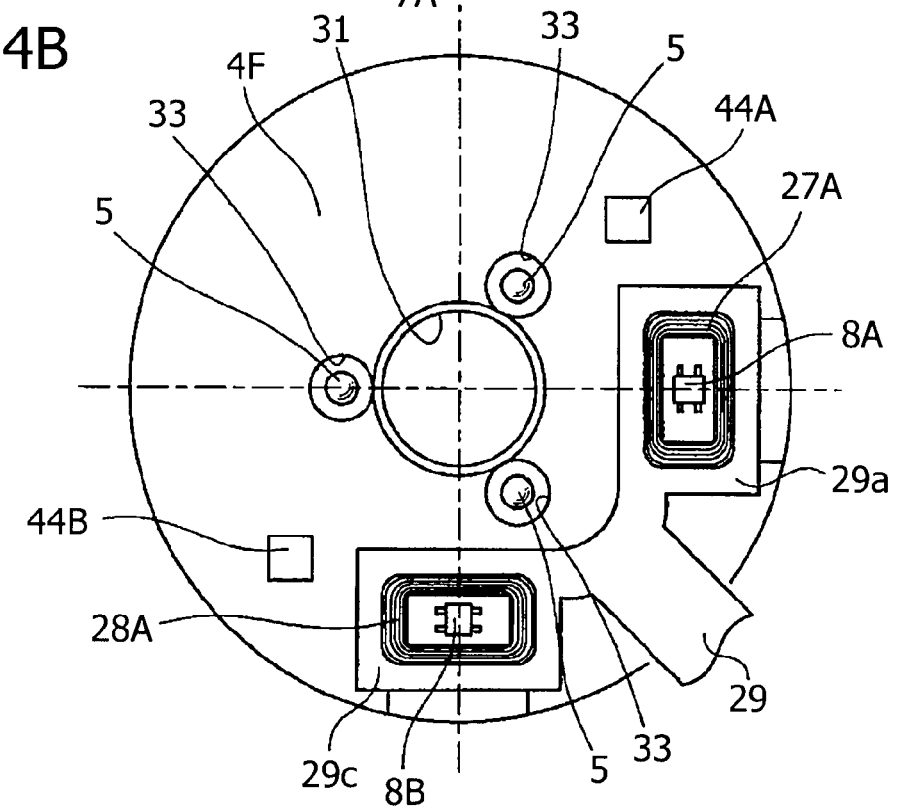
FIG. 24B is a plan view showing a state where the moving frame is removed from the image blur correction apparatus as shown in FIG. 24A.
Figure 25A:
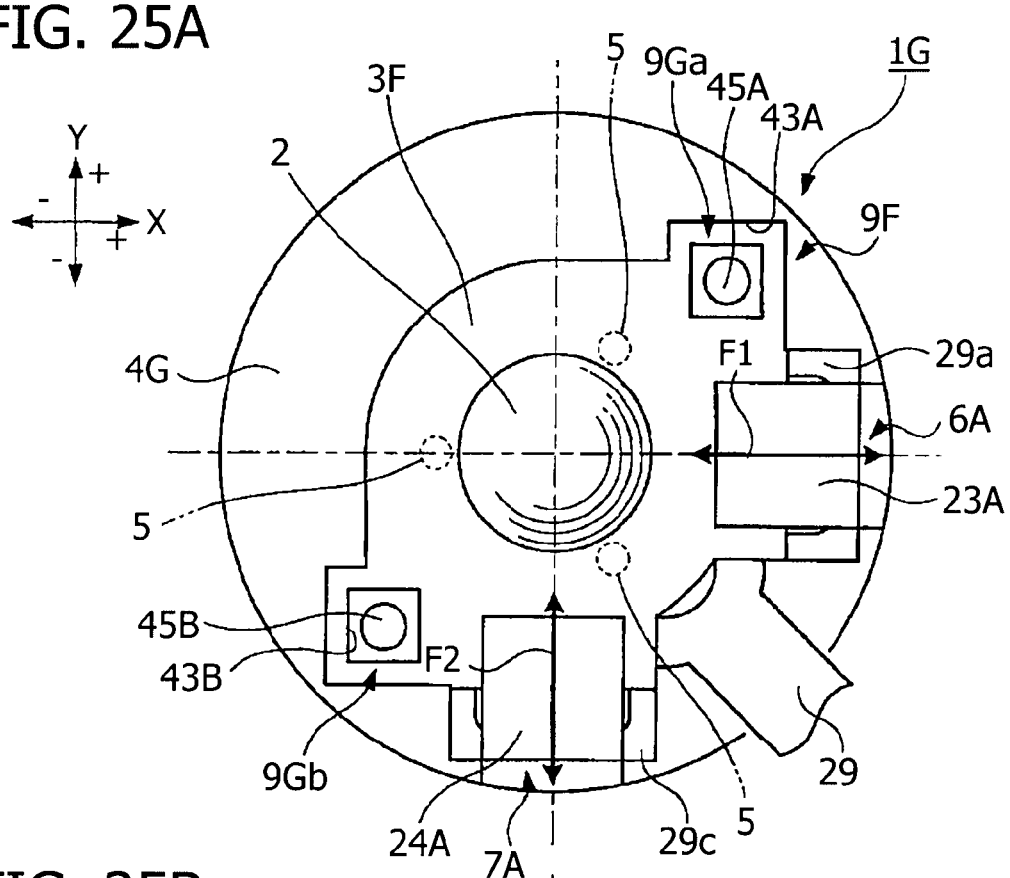
FIG. 25A is a plan view of the image blur correction apparatus.
Figure 25B:
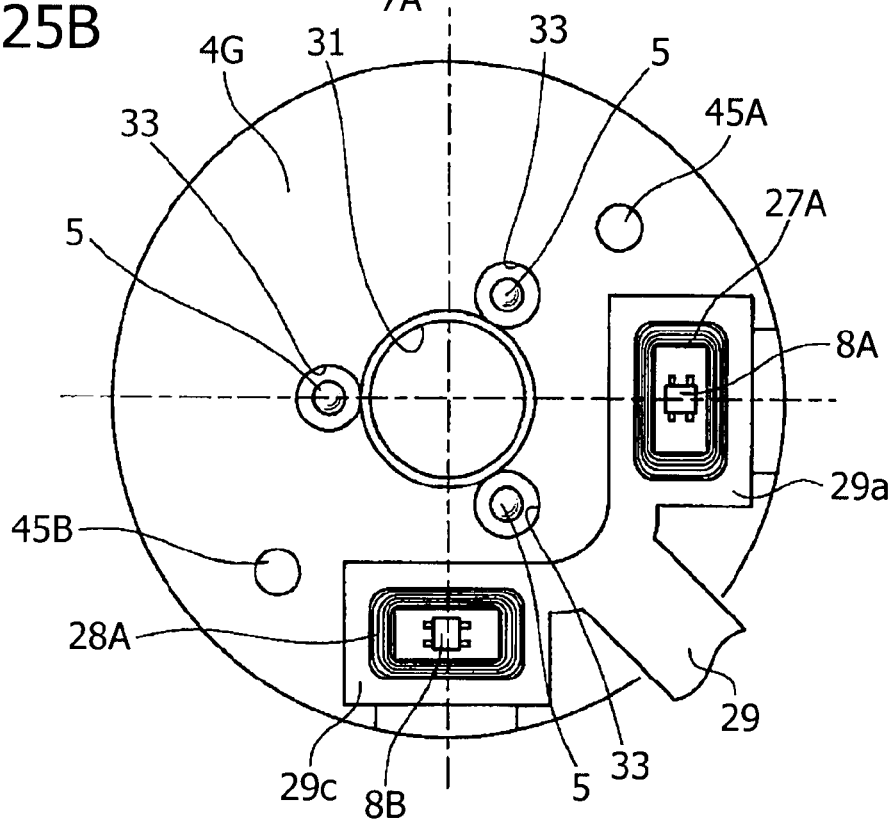
FIG. 25B is a plan view showing a state where the moving frame is removed from the image blur correction apparatus as shown in FIG. 25A.
Figure 26A:
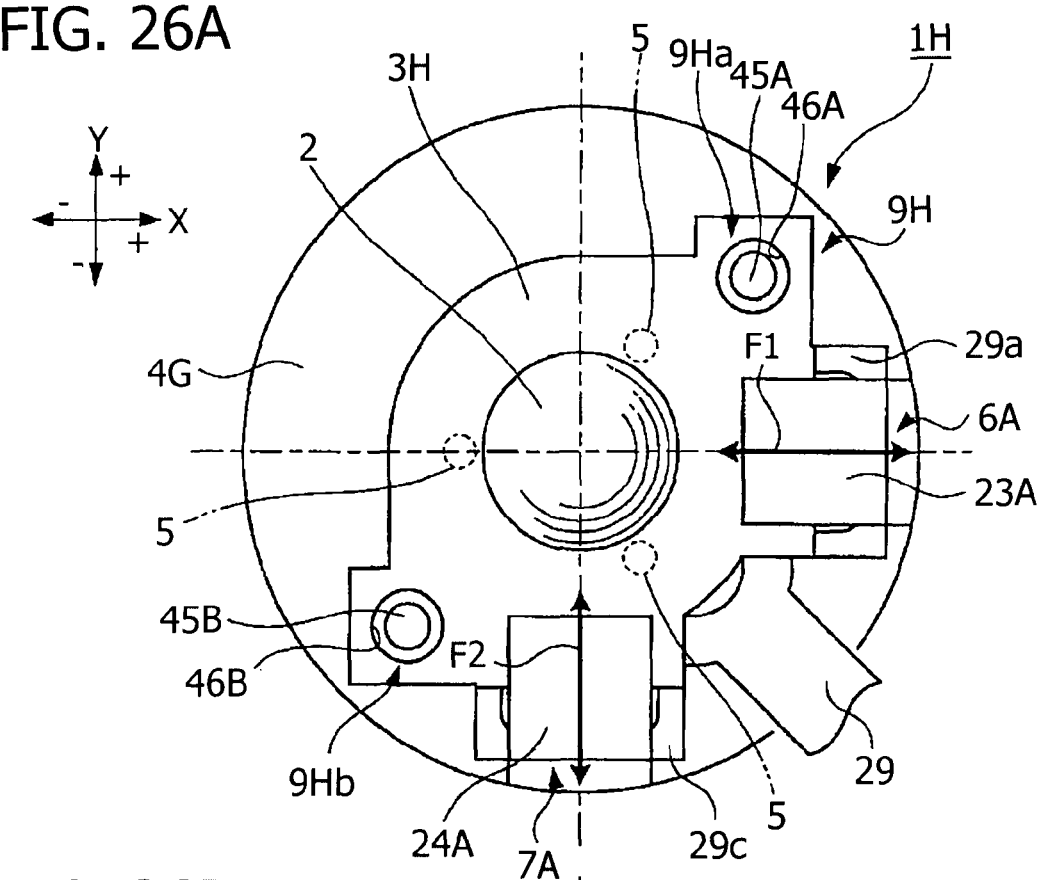
FIG. 26A is a plan view of the image blur correction apparatus.
Figure 26B:
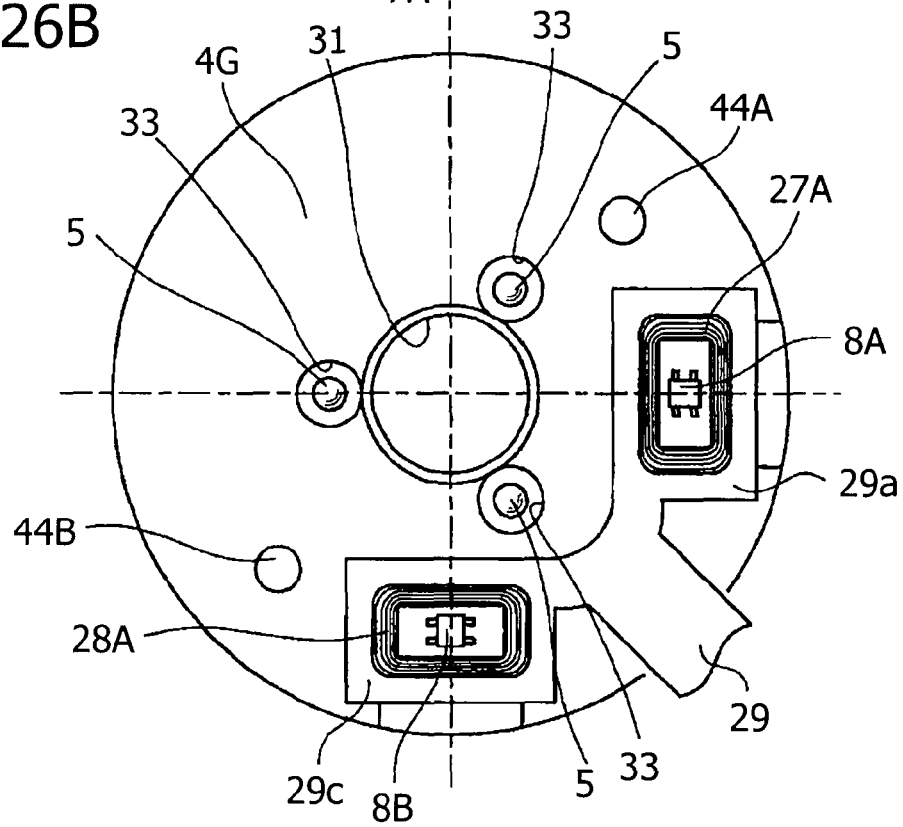
FIG. 26B is a plan view showing a state where the moving frame is removed from the image blur correction apparatus shown in FIG. 26A.
Figure 27A:
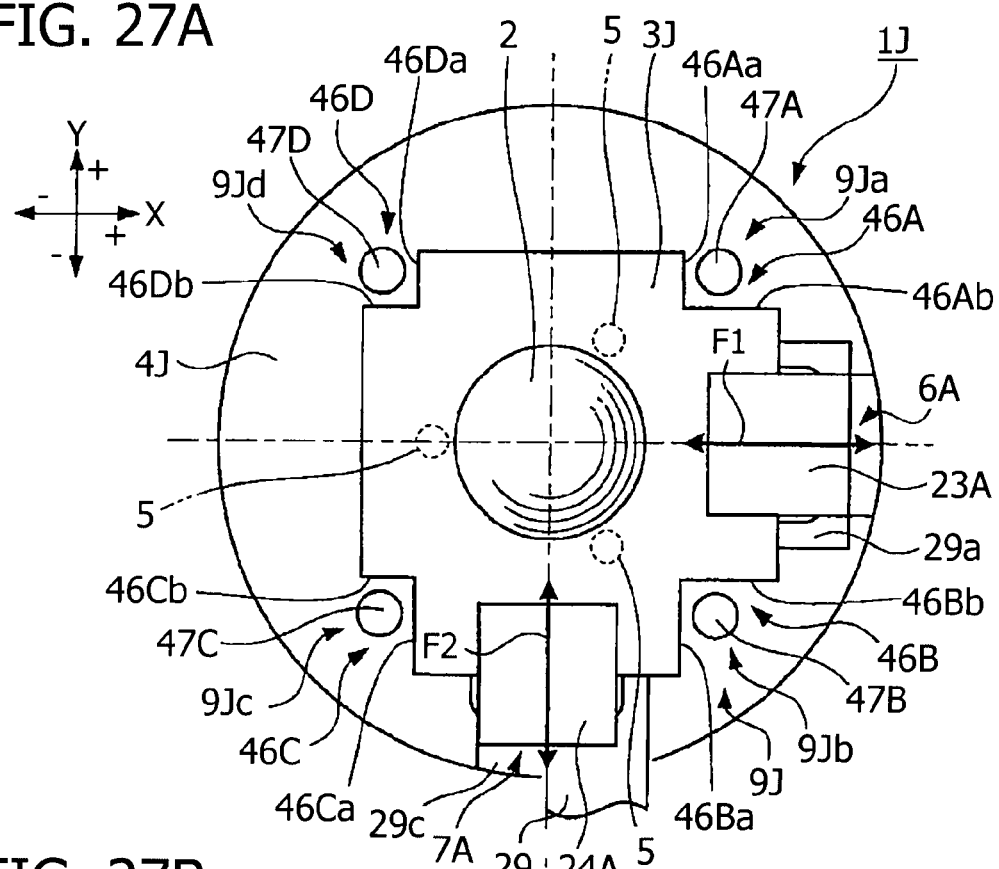
FIG. 27A is a plan view of the image blur correction apparatus.
Figure 27B:
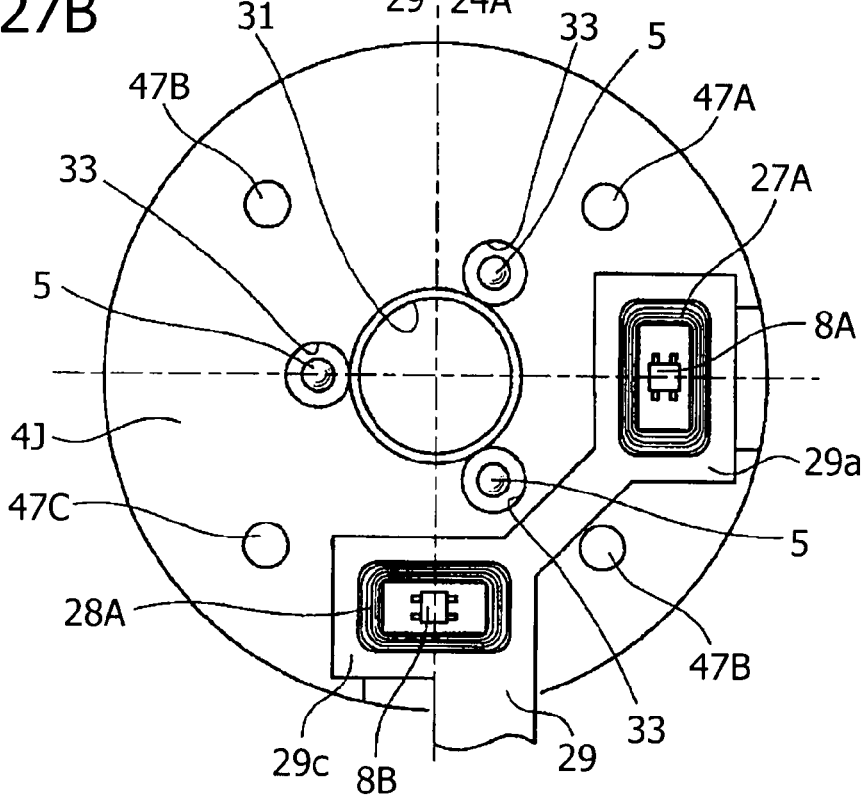
FIG. 27B is a plan view showing a state where the moving frame is removed from the image blur correction apparatus shown in FIG. 27A.
Figure 28A:
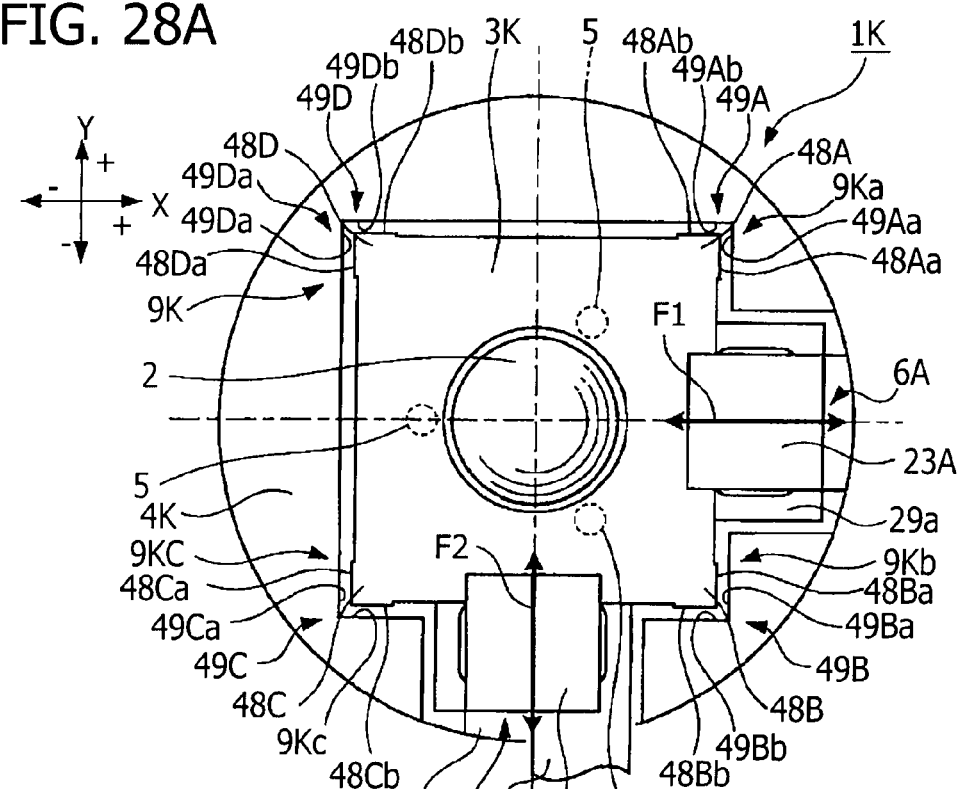
FIG. 28A is a plan view of the image blur correction apparatus.
Figure 28B:
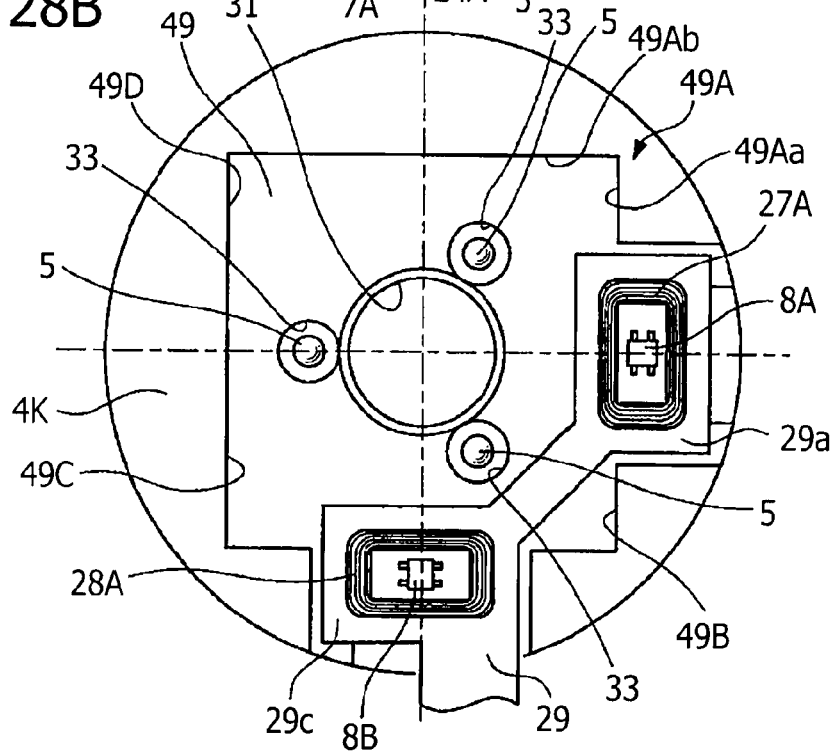
FIG. 28B is a plan view showing a state where the moving frame is removed from the image blur correction apparatus shown in FIG. 28A.

FIG. 17 is a sectional view showing a second embodiment of the image blur correction apparatus of the present invention, FIGS. 18-20 illustrate a third embodiment of the image blur correction apparatus of the present invention, FIG. 18 is a sectional view, FIG. 19 is a perspective view of the moving frame, and FIG. 20 is a perspective view of a support frame. FIGS. 21A and 21B are diagrams illustrating a fourth embodiment of the image blur correction apparatus of the present invention, FIGS. 22A and 22B are diagrams illustrating a fifth embodiment of the image blur correction apparatus of the present invention, FIGS. 23A and 23B are diagrams illustrating a sixth embodiment of the image blur correction apparatus of the present invention, FIGS. 24A and 24B are diagrams illustrating a seventh embodiment of the image blur correction apparatus of the present invention, FIGS. 25A and 25B are diagrams illustrating an eighth embodiment of the image blur correction apparatus of the present invention, FIGS. 26A and 26B are diagrams illustrating a ninth embodiment of the image blur correction apparatus of the present invention, FIGS. 27A and 27B are diagrams illustrating a tenth embodiment of the image blur correction apparatus of the present invention, and FIGS. 28A and 28B are diagrams illustrating an eleventh embodiment of the image blur correction apparatus of the present invention.

Figure 29:
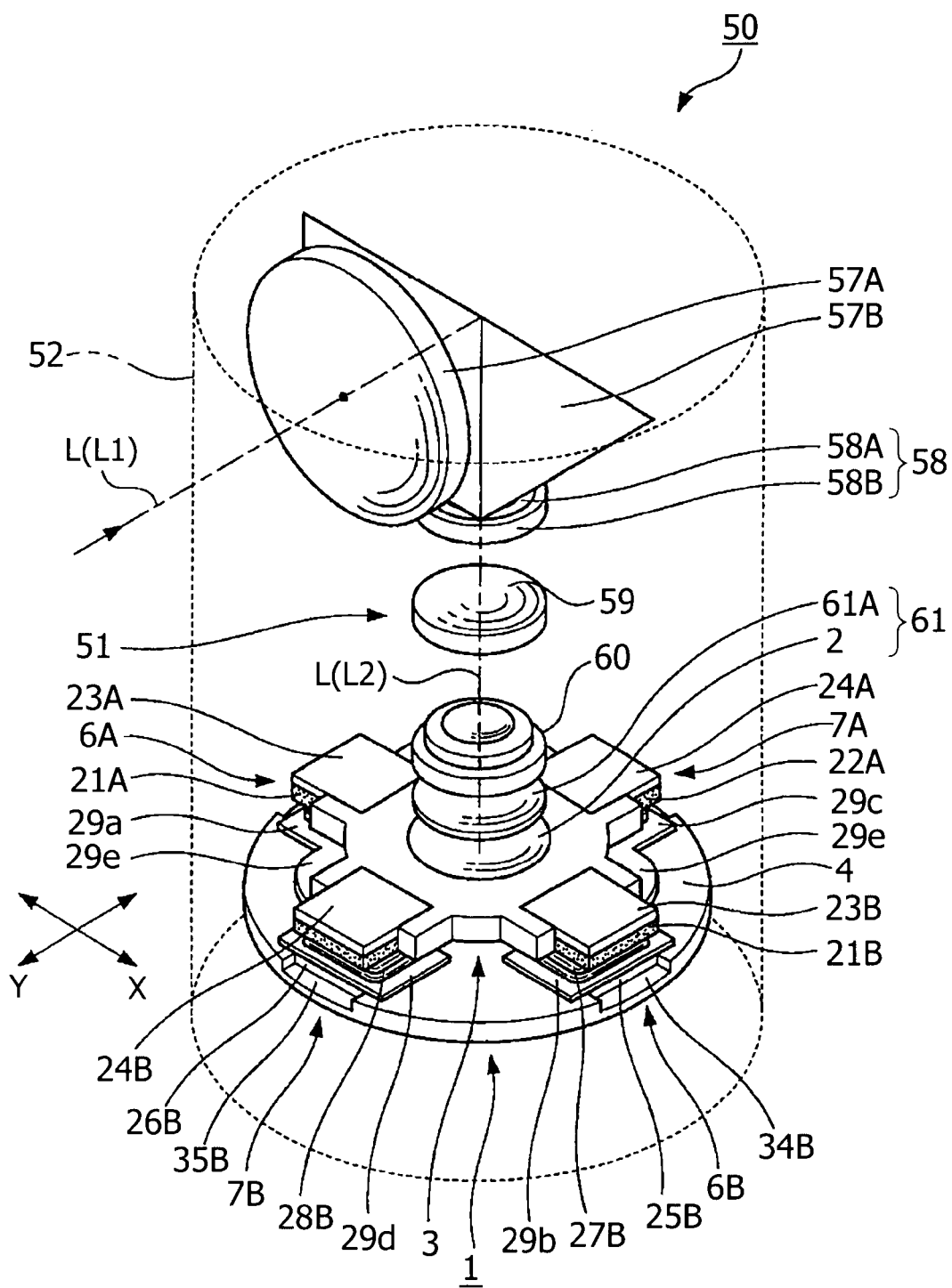
FIG. 29 is a perspective view showing a first embodiment of a lens barrel of the present invention.
Figure 31:
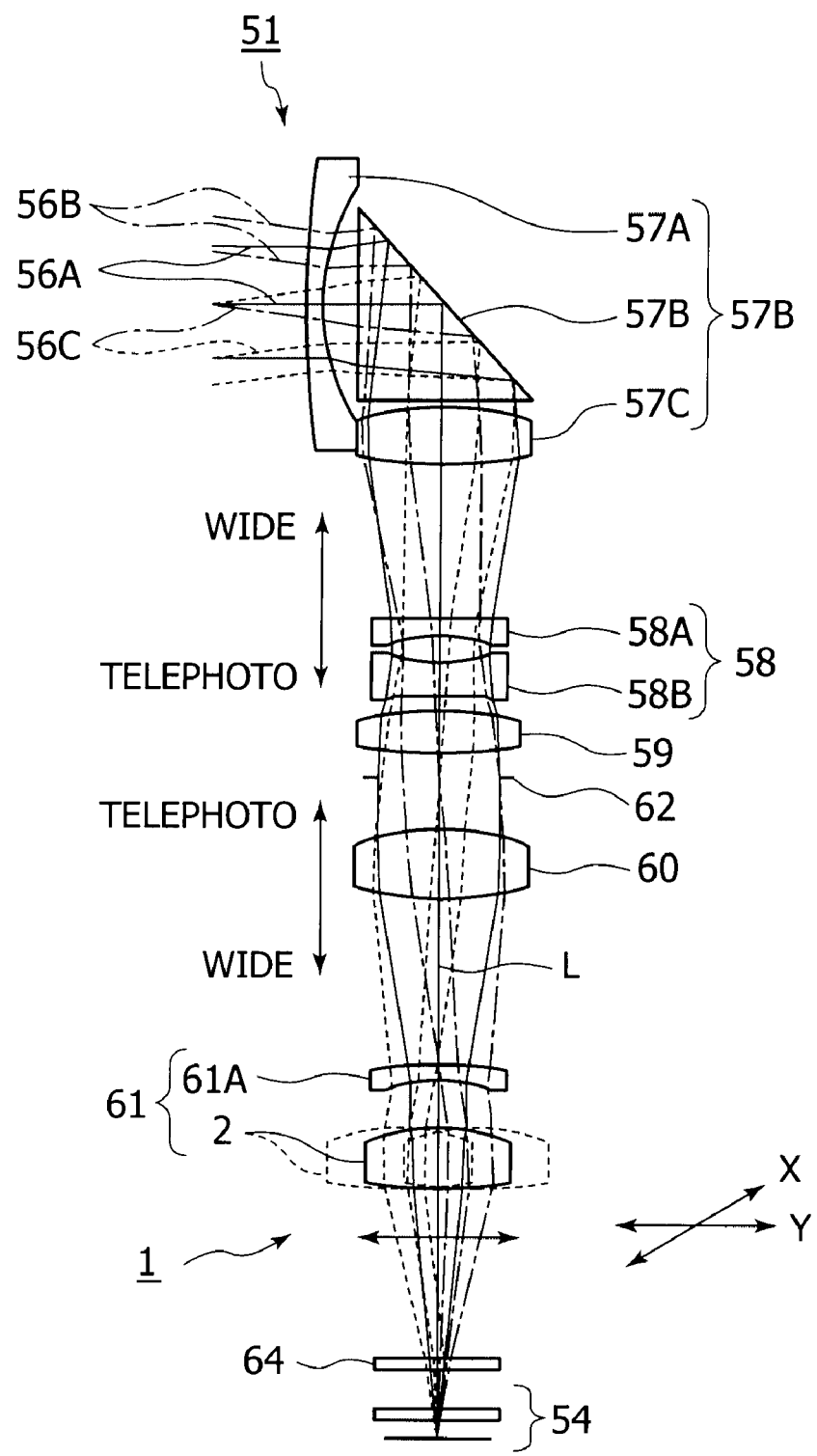
FIG. 31 is an illustrative diagram for explaining a structure of a lens system in accordance with the first embodiment of the lens barrel of the present invention.
Figure 32:
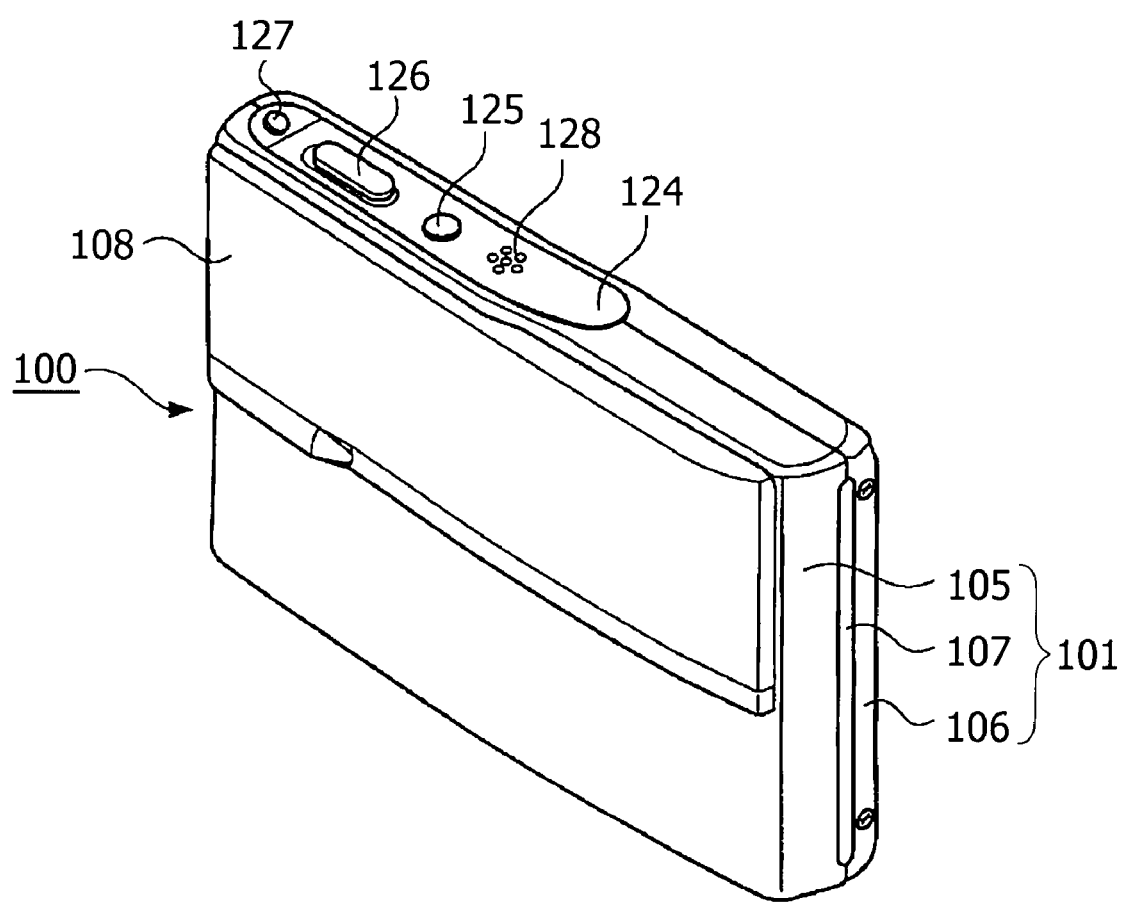
FIG. 32 is a perspective view showing a state where an object lens is closed with a lens cover, in which a first embodiment of an image capture apparatus of the present invention viewed from the front.
Figure 33:
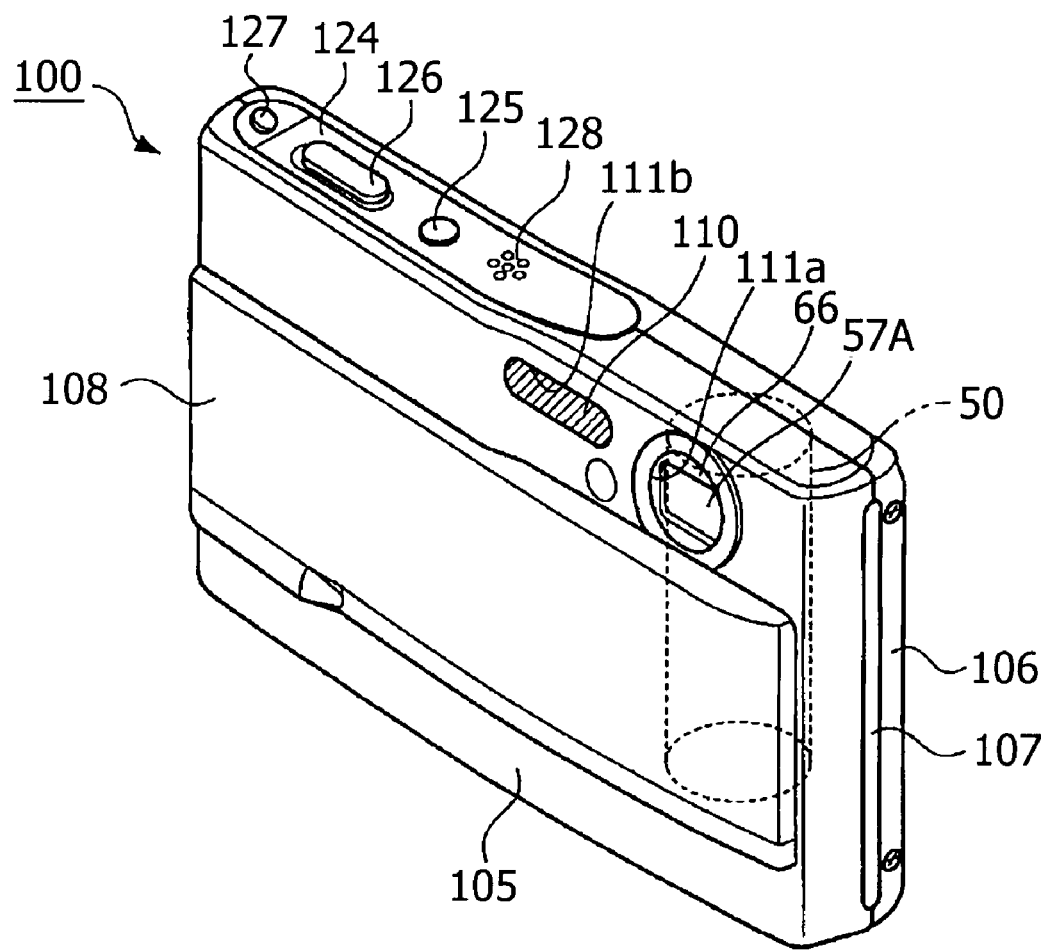
FIG. 33 is a perspective view showing a state where the object lens is exposed by opening the lens cover, in which the first embodiment of the image capture apparatus of the present invention is viewed from the front.
Figure 34:
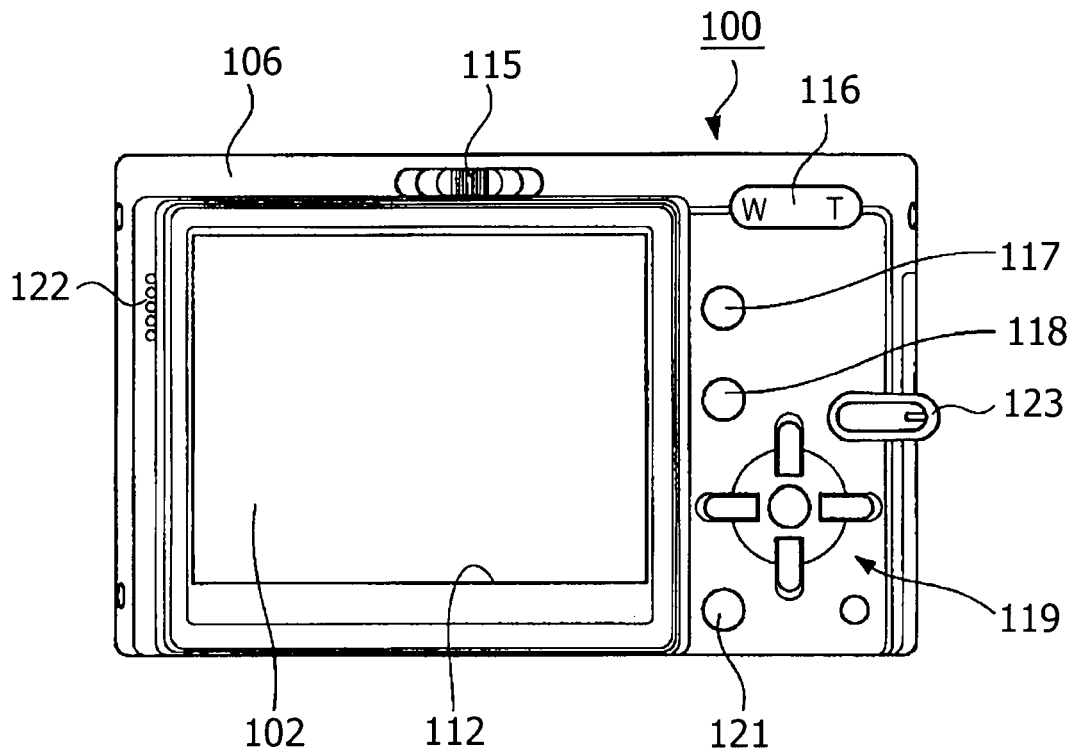
FIG. 34 is a rear view showing the first embodiment of the image capture apparatus of the present invention.
Figure 35:
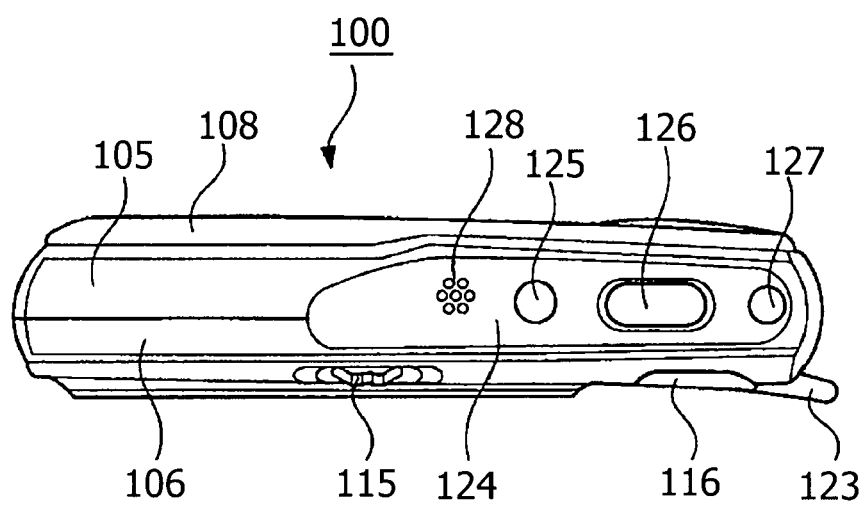
FIG. 35 is a plan view showing the first embodiment of the image capture apparatus of the present invention.
Figure 36:
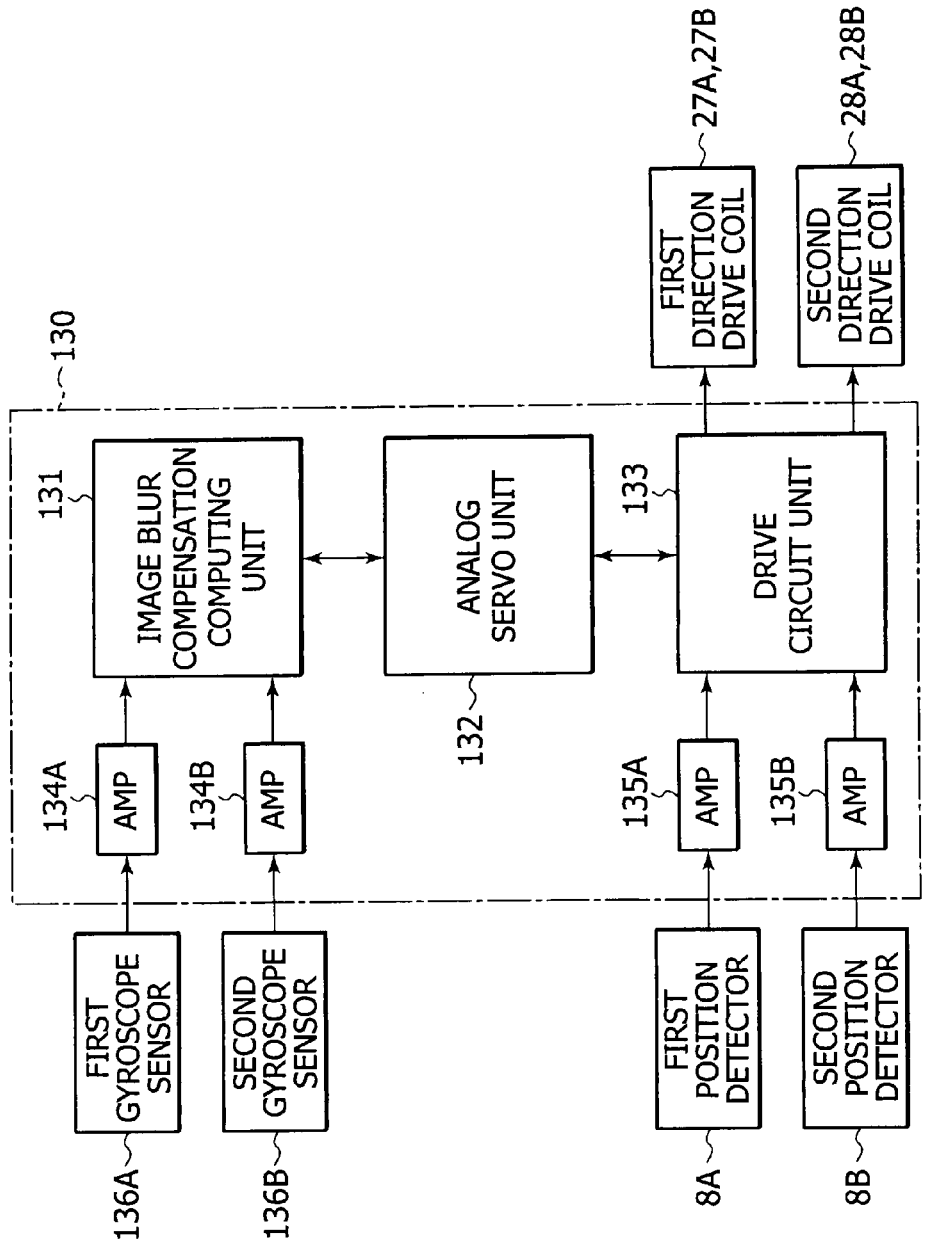
FIG. 36 is a block diagram for explaining a control concept of the image blur correction apparatus of the present invention.
Figure 37:
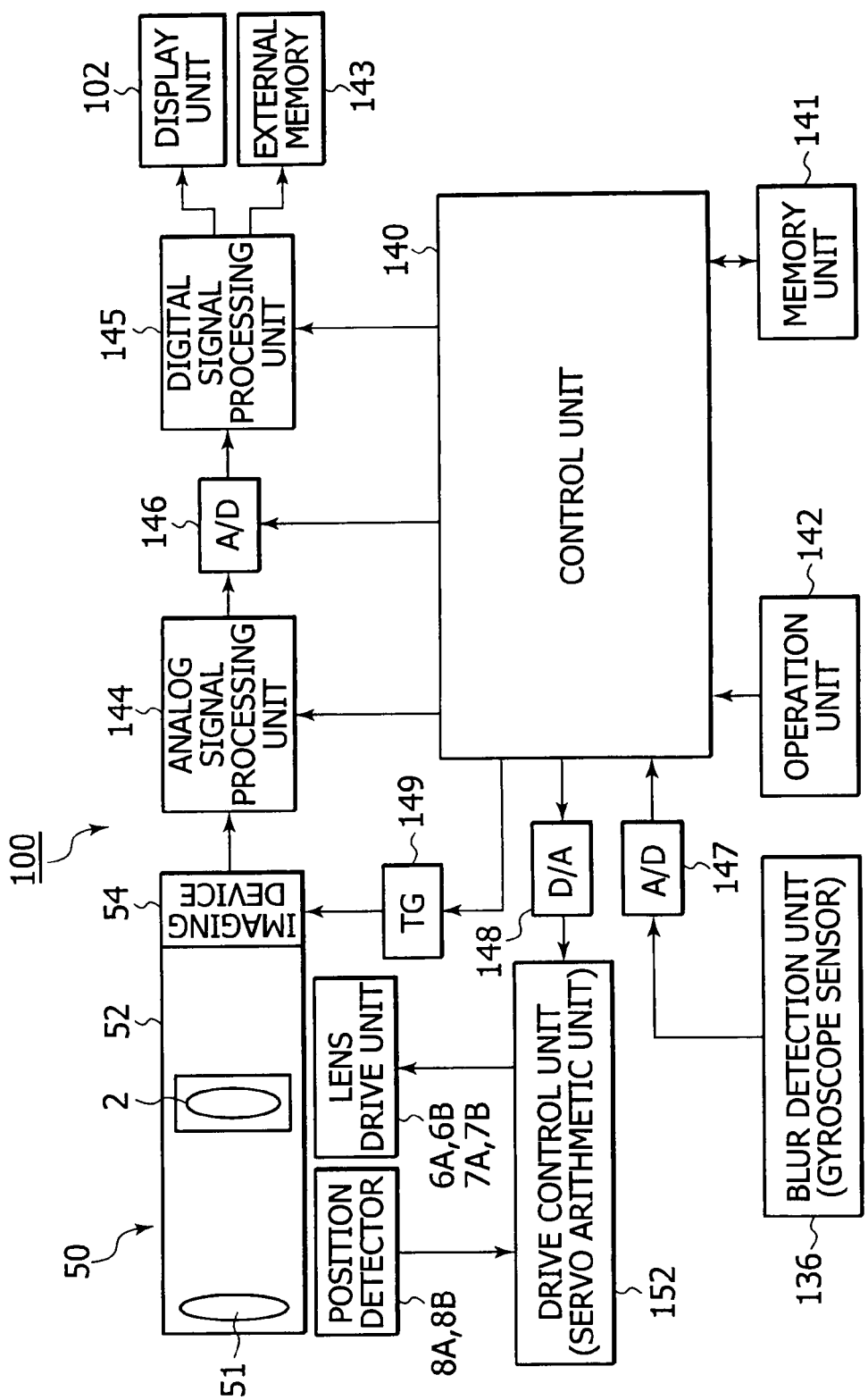
FIG. 37 is a block diagram showing the first embodiment of a schematic structure of the image capture apparatus in accordance with the present invention.
Figure 38:
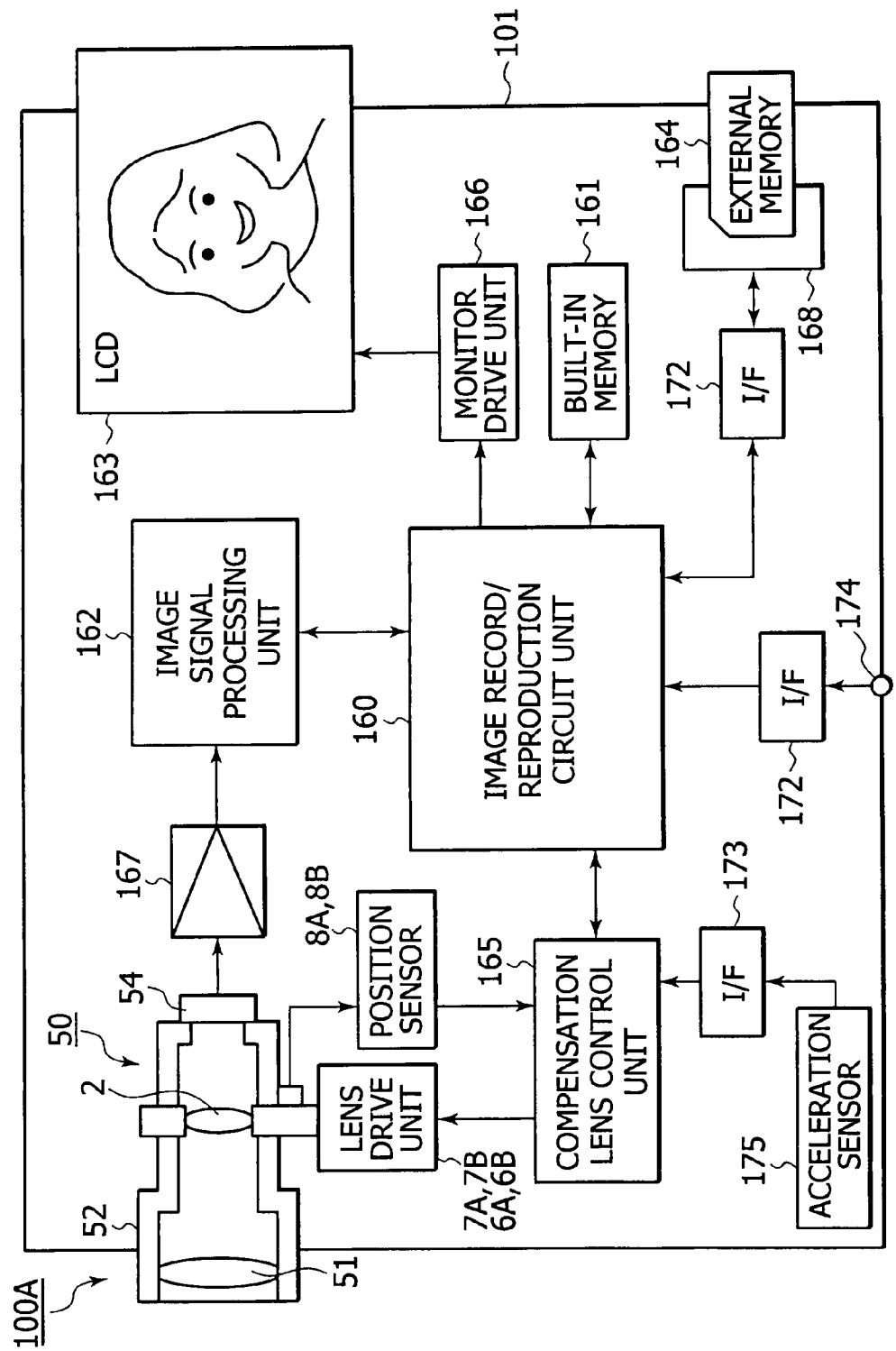
FIG. 38 is a block diagram showing a second embodiment of a schematic structure of the image capture apparatus in accordance with the present invention.
Figure 39:
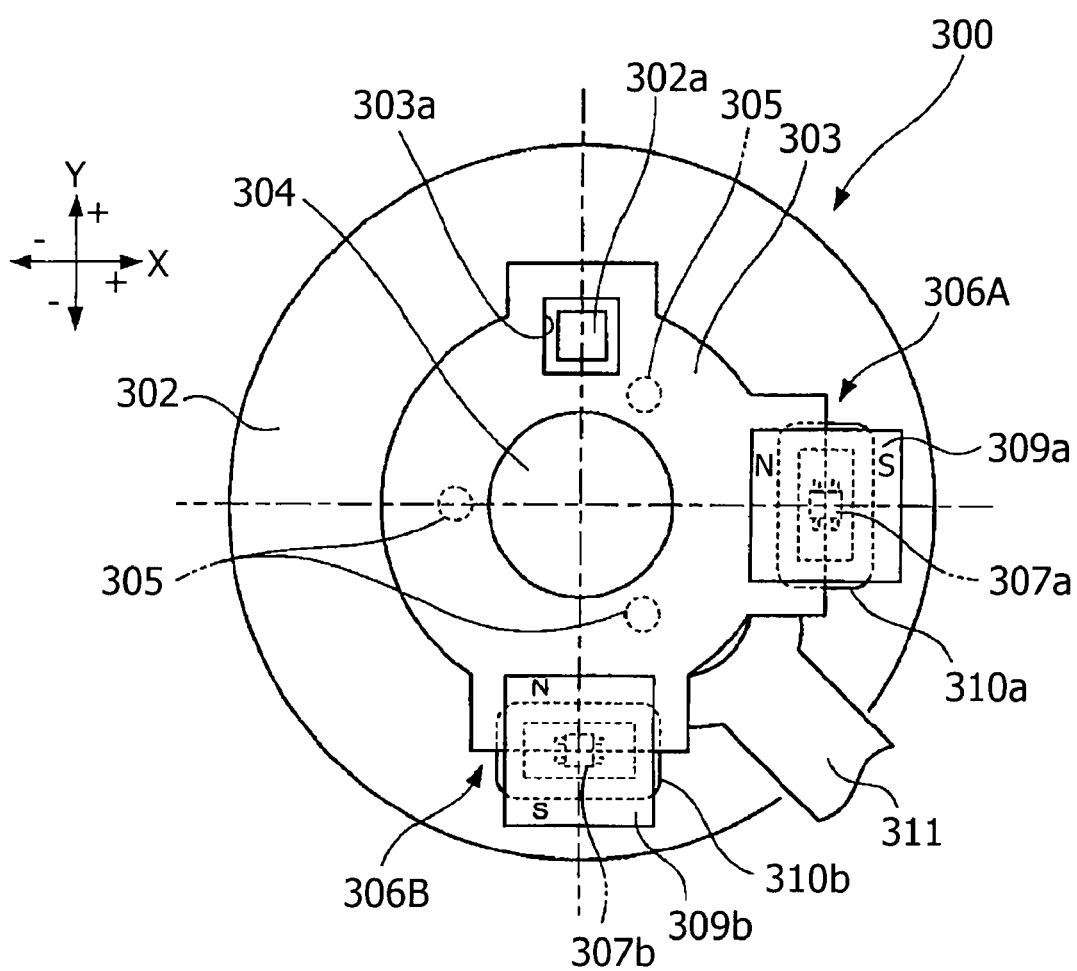
FIG. 39 is a plan view showing an image blur correction apparatus of the related art.
Figure 40A:
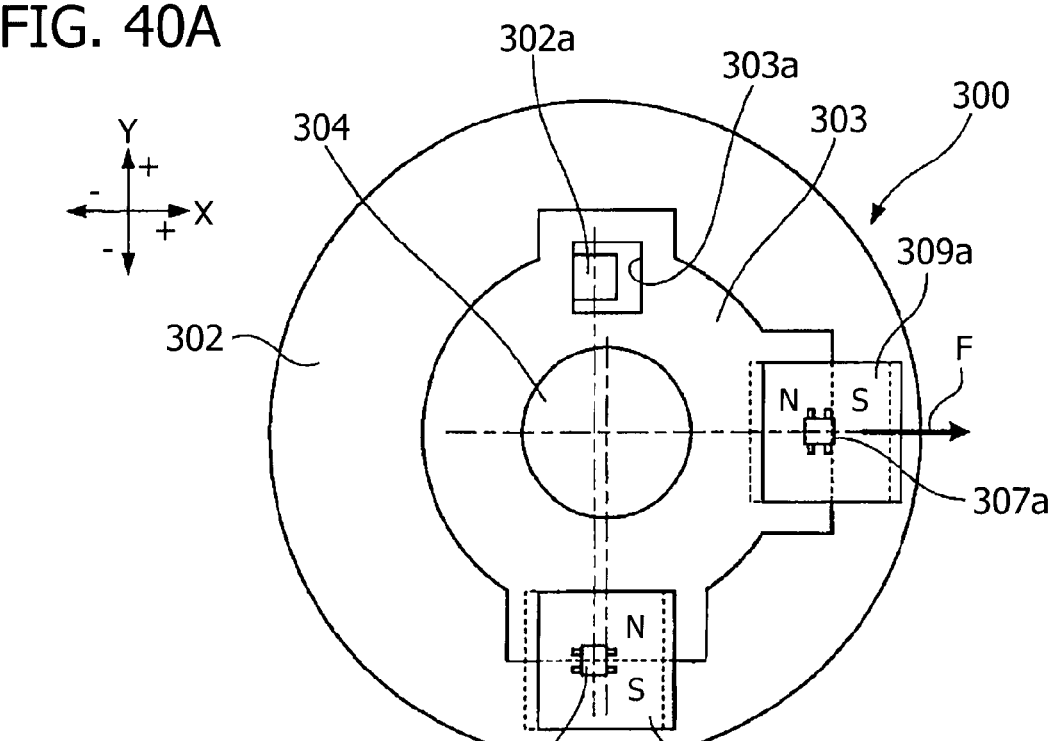
FIG. 40A is an illustrative diagram showing a state where the moving frame is prevented from moving to "+" side of the first direction by a move limit mechanism in the image blur correction apparatus shown in FIG. 39.
Figure 40B:
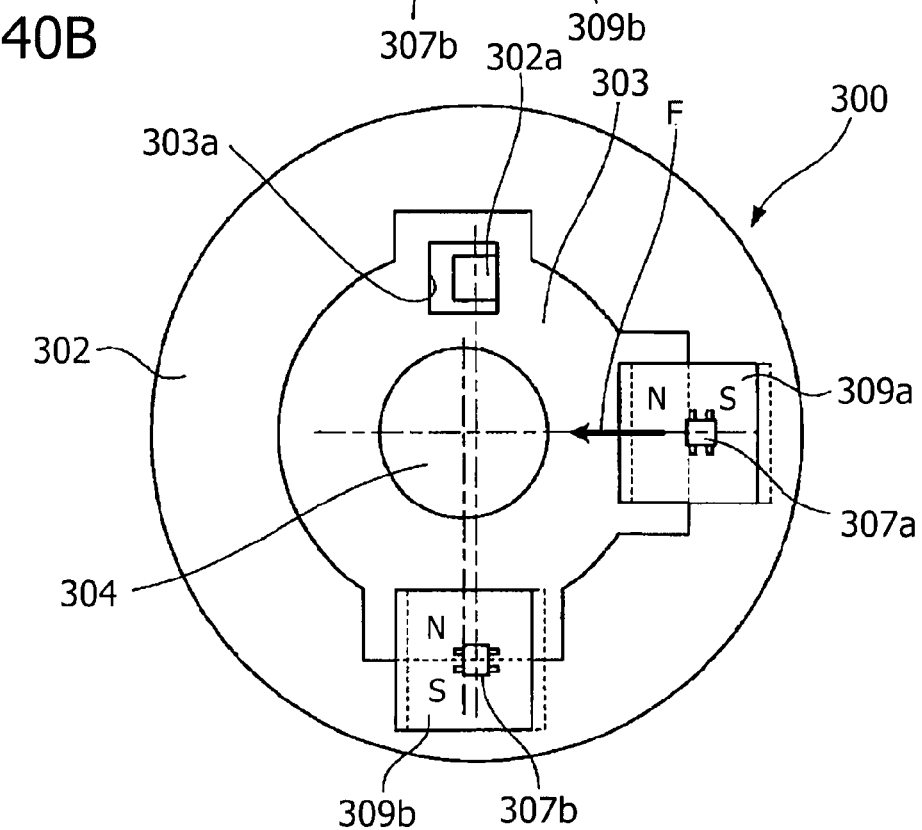
FIG. 40B is an illustrative diagram showing a state where the moving frame is prevented from moving to "−" side of the first direction by the move limit mechanism in the image blur correction apparatus shown in FIG. 39.
Figure 41A:
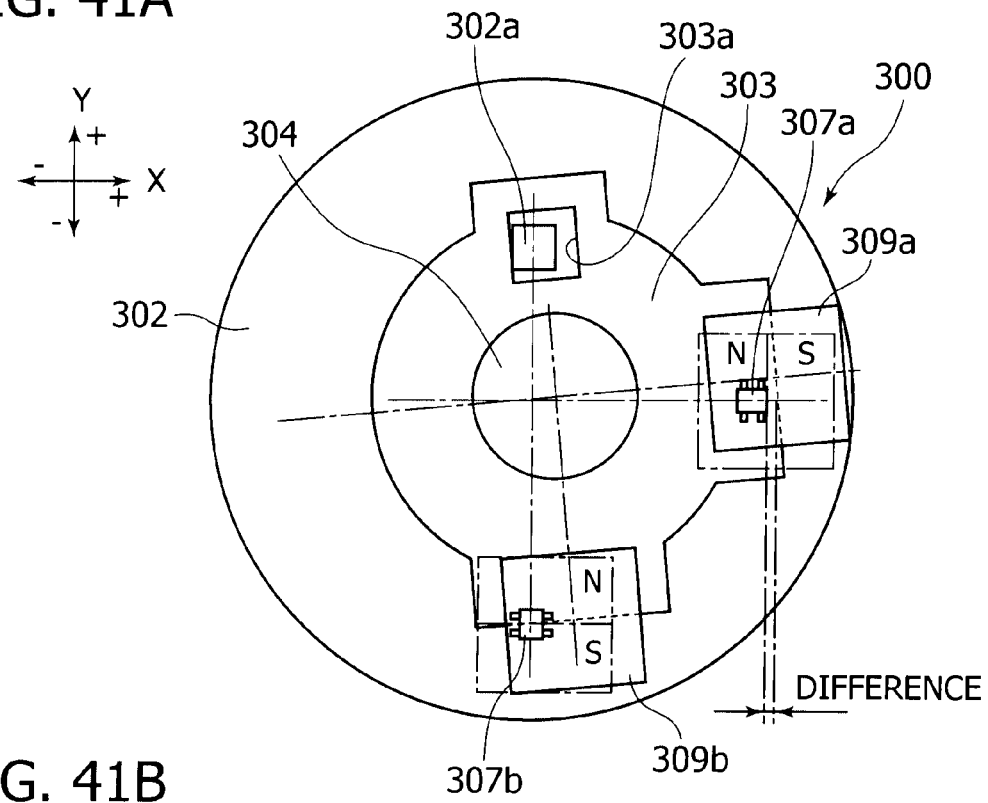
FIG. 41A is an illustrative diagram showing a state where the moving frame is turned from a state shown in FIG. 40A.
Figure 41B:
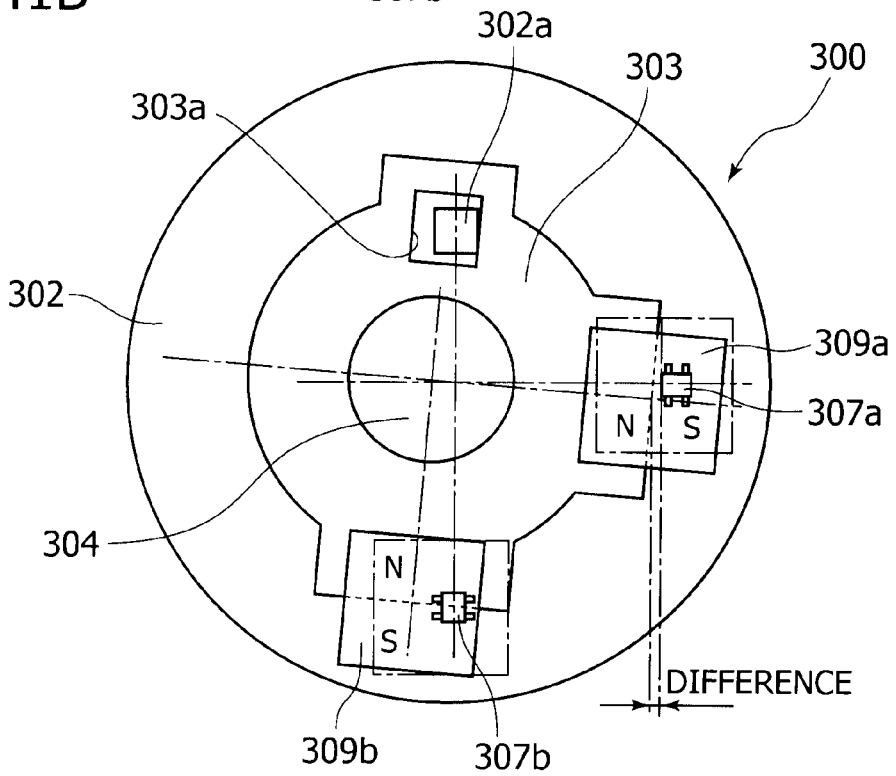
FIG. 41B is an illustrative diagram showing a state where the moving frame is turned from a state shown in FIG. 40B.

FIGS. 29-31 show a first embodiment of the lens barrel of the present invention, in which FIG. 29 is a perspective view, FIG. 30A is a front view, FIG. 30B is a left hand side view, and FIG. 31 is a diagram illustrating an arrangement of a lens system. FIGS. 32-35 show a first embodiment of the image capture apparatus of the present invention, in which FIG. 32 is a perspective diagram viewed from the front side, FIG. 33 is a perspective view where an object lens is exposed by moving the lens cover, FIG. 34 is a rear view, and FIG. 35 is a plan view. FIG. 36 is a block diagram for explaining a control concept of the image blur correction apparatus of the present invention, FIG. 37 is a block diagram showing the first embodiment of a schematic structure of the image capture apparatus in accordance with the present invention, and FIG. 38 is a block diagram showing the second embodiment of a schematic structure of the image capture apparatus similarly.

The first embodiment of the image blur correction apparatus of the present invention as shown in FIGS. 1-16 is configured as an image blur correction apparatus 1 provided with a moving-magnet type drive mechanism. As shown in FIGS. 1-7, this image blur correction apparatus 1 is configured by including a correction lens 2 for correcting image blurs in the lens system, a moving frame 3 for holding this correction lens 2, a support frame 4 for supporting this moving frame 3 via three spheres 5 showing a particular example of the move guide on a plane orthogonal to an optical axis of the correction lens 2 in a movable manner, two first electric actuators 6A and 6B for moving the moving frame 3 in a first direction X orthogonal to an optical axis of the lens system, two second electric actuators 7A and 7B for moving the moving frame 3 in a second direction Y which is a direction orthogonal to the optical axis of the lens system, and is also orthogonal to the first direction X, a first Hall device 8A for detecting a position with respect to the first direction of the moving frame 3, a second Hall device 8B for detecting a position with respect to the second direction Y of the moving frame 3, an operation limit mechanism 9 for stopping the movement of the moving frame 3 within a predetermined range.

In the case where a shake due to a hand shake arises at a camera body, which will be described later, the correction lens 2 moves the position in the first direction X and/or the second direction Y (normally in a direction where the first direction X and the second direction Y are added together) corresponding to an amount of image blurs at that time to correct the image blurs. This correction lens 2 is fixed to the moving frame 3.

As shown in FIGS. 5 to 8, the moving frame 3 is configured by including a lens fixing unit 11 formed of a plate body having a suitable thickness, a pair of first magnet fixing units 12A and 12B formed integrally with this lens fixing unit 11, and a pair of second magnet fixing units 13A and 13B, and the like. A fitting hole 15 into which the correction lens 2 is fitted is formed in the substantially central part of the lens fixing unit 11, and the correction lens 2 is fixed and integrally attached to this fitting hole 15 by fixing means, such as an adhesive. Furthermore, a limit receptacle part 16 is formed at an undersurface which faces towards the support frame 4 of the moving frame 3. This limit receptacle part 16 is formed as an inner periphery of the fitting hole 15. A limit projection 32 (described later) of the support frame 4 is inserted into the fitting hole 15 as this limit receptacle part 16, and they are engaged so as to be movable in a radial direction within a predetermined range.

A pair of first magnet fixing units 12A and 12B are provided at the positions which are outside of the radial direction of the lens fixing unit 11, and symmetrical each other by sandwiching the fitting hole 15. A direction along both the magnet fixing units 12A and 12B is set as the first direction X. Each of the pair of first magnet fixing units 12A and 12B has two protrusion pieces 18 and 18. These two protrusion pieces 18 and 18 are provided by having a predetermined interval therebetween at the second direction Y, and protruded to the first direction X.

Further, the pair of second magnet fixing units 13A and 13B are arranged at the positions which are displaced and turned by approximately 90 degrees from the pair of first magnet fixing units 12A and 12B. A direction along both the magnet fixing units 13A and 13B provided at the positions which are symmetrical each other by sandwiching the fitting hole 15 is set as the second direction Y. Each of the pair of second magnet fixing units 13A and 13B has two protrusion pieces 19 and 19. These two protrusion pieces 19 and 19 are arranged by having a predetermined interval therebetween in the first direction X, are protruded in the second direction Y.

As for the two first magnet fixing units 12A and 12B, a first magnet 21A and a first back yoke 23A which constitute a part of a first electric actuator 6A are fixed by securing methods, such as an adhesive and a fixing screw, between the protrusion pieces 18 and 18 of one first magnet fixing unit 12A. Furthermore, a first magnet 21B and a first back yoke 23B which constitute a part of a first electric actuator 6B are fixed by the securing methods, such as an adhesive and a fixing screw, between the protrusion pieces 18 and 18 of the another first magnet fixing unit 12B.

As for the two second magnet fixing units 13A and 13B, a second magnet 22A and a second back yoke 24A which constitute a part of a second electric actuator 7A are fixed by securing methods, such as an adhesive and a fixing screw, between the protrusion pieces 19 and 19 of one of the second magnet fixing unit 13A. Furthermore, a second magnet 22B and a second back yoke 24B which constitute a part of a second electric actuator 7B are fixed by the securing methods, such as an adhesive and a fixing screw, between the protrusion pieces 19 and 19 of the another second magnet fixing unit 13B.

The two first magnets 21A and 21B and the two second magnets 22A and 22B are each formed as a quadrangular plain plate in the same shape, and magnetized so that magnetic force having same intensity is generated in a predetermined direction. In other words, the two first magnets 21A and 21B and the two second magnets 22A and 22B are arranged to have different polarities so that a plane direction may be equally divided into two and a thickness direction orthogonal to the plane direction may also be equally divided into two to have different polarities.

In this embodiment, as shown in FIG. 12B etc., with respect to the one first magnet 21A, a radial inner portion near to the correction lens 2 is provided with N pole by magnetization and a radial outer portion distant from the correction lens 2 is provided with S pole by magnetization at a surface facing the support frame 4 (surface closer to first coil 27A). Further, at a surface opposite the support frame 4 of the first magnet 21A (surface distant from first coil 27A), a radial inner side near the correction lens 2 is provided with S pole by magnetization and a radial outer portion distant from the correction lens 2 is provided with N pole by magnetization. Furthermore, as for the first magnet 21B, a radial inner side near to the correction lens 2 is provided with S pole by magnetization and a radial outer side distant from the correction lens 2 is provided with N pole by magnetization at the surface facing the support frame 4. Further, at the surface opposite the support frame 4 of the first magnet 21B, a radial inner side near to the correction lens 2 is provided with N pole by magnetization and a radial outer side distant from the correction lens 2 is provided with S pole by magnetization.

As shown in FIG. 12C etc., with respect to the second magnet 22A, a radial inner side near the correction lens 2 is provided with N pole by magnetization and a radial outer side distant from the correction lens 2 is provided with S pole by magnetization at a surface facing the support frame 4. Further, at a surface opposite to the support frame 4 of the second magnet 22A, a radial inner side near the correction lens 2 is provided with S pole by magnetization and a radial outer side distant from the correction lens 2 is provided with N pole by magnetization. Furthermore, as for the second magnet 22B, a radial inner side near the correction lens 2 is provided with S pole by magnetization and a radial outer side distant from the correction lens 2 is provided with N pole by magnetization at the surface facing the support frame 4. Further, at the surface opposite to the support frame 4 of the second magnet 22B, a radial inner side near the correction lens 2 is provided with N pole by magnetization and a radial outer portion distant from the correction lens 2 is provided with S pole by magnetization. However, the polarity arrangement of the first and second magnets 21A, 21B, 22A, and 22B is not limited to this embodiment. It is possible to reversely arrange with the polarities different in the plane direction and the thickness direction.

As shown in FIG. 7 etc., two first back yokes 23A and 23B and two second back yokes 24A and 24B are each formed as the quadrangular plain plate in the same shape, and a size of the plane is set to be equal with that of the first and second magnets 21A, 21B, 22A, and 22B. Each of the two first back yokes 23A and 23B is fixed to a respective one surface (surfaces opposite the support frame 4) of two magnets 21A and 21B by the securing methods, such as an adhesive. Each of the two second back yokes 24A and 24B is fixed to a respective one surface (surfaces opposite the support frame 4) of two magnets 22A and 22B by the securing methods, such as an adhesive.

The support frame 4 is formed of a circular plate body which is larger than the moving frame 3. This support frame 4 has a through hole 31 formed in the central part, a limit projection 32 arranged to project out of a surface, three sphere body holding parts 33 provided by forming recesses at the surface, two first recesses 34A and 34B for yokes provided by forming recesses at the surface similarly, and two second recesses 35A and 35B for yokes.

The limit projection 32 of the support frame 4 is formed as a cylindrical (ring) shaped cylinder body surrounding the through hole 31, and an opening hole 32a connected in series with the through hole 31. This limit projection 32 is arranged to be smaller than the limit receptacle part 16 provided to the moving frame 3, and is inserted into the limit receptacle part 16 in a state where image blur correction apparatus 1 is assembled. Within a range of a space set between this limit projection 32 and the fitting hole 15 which is the limit receptacle part, the moving frame 3 and the support frame 4 are arranged in a manner relatively movable in the respective plane directions. An inner periphery of the limit receptacle part 16 provided to the moving frame 3 abuts with an outer periphery surface of the limit projection 32 provided to the support frame 4, and whereby a range in which the moving frame 3 moves in the direction orthogonal to the optical axis of the lens system is limited. In other words, a stopper part 9 which limits the movement of the moving frame 3 in the first direction X and the second direction Y is constituted by the limit projection 32 provided to the support frame 4 and the limit receptacle part 16 provided for the moving frame 3, and this stopper part 9 serves as the operation limit mechanism.

The three sphere body holding parts 33 are each formed as circular recesses, and are arranged at equal intervals around the limit projection 32. A diameter of the sphere body holding part 33 is set to be larger than the diameter of the sphere body 5. Further, a depth of the sphere body holding part 33 is set to be equal to or larger than a radius of the sphere body 5 so that the sphere body 5 may not come out of the part easily. Through the sphere body 5 held at this sphere body holding part 33, the moving frame 3 is supported by the support frame 4 in a movable manner. By means of such a structure, it is possible to reduce frictional resistance caused between the moving frame 3 and the sphere body 5 and between the sphere body holding part 33 and the sphere body 5. Thus, it is possible to reduce loss of driving force of the first and second electric actuators 6A, 6B, 7A, and 7B, and move the moving frame 3 with a small force. It should be noted that the depth of the sphere body holding part 33 may be smaller than the radius of the sphere body 5.

In this Example, in order to secure the stability of the moving frame 3, the number of the sphere body holding parts 33 or the number of the sphere bodies 5 is set to be three, but embodiments of the present invention is not limited in this regard. The number of the sphere bodies or the number of the sphere body holding parts in accordance with embodiments of the present invention may be four or more. Further, it is preferable that a material of the sphere body 5 may not be influenced by the magnetic force of the first and second magnets 21A, 21B, 22A, and 22B, and has high strength. Examples are ceramics, stainless steel, etc. However, the sphere body 5 may be metal, such as carbon steel for structures vulnerable to influence of magnetic force, and it is possible to use an engineering plastic regardless of whether it is a magnetic substance or not.

Figure 11A:
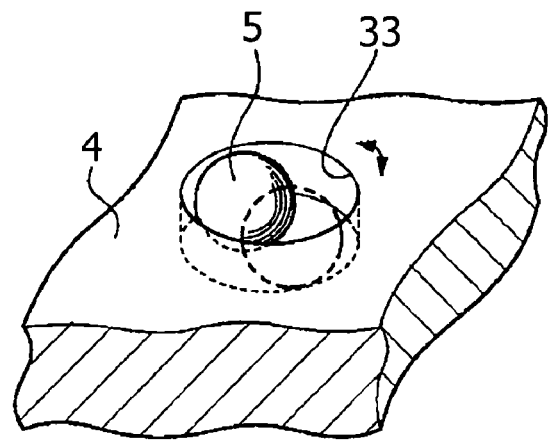
FIG. 11A is an illustrative diagram showing a schematic structure.
Figure 11B:
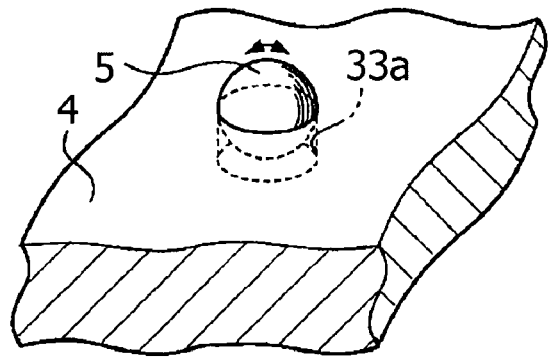
FIG. 11B is an illustrative diagram of the holding part which includes the sphere and the circular recess unit having a diameter approximately same as a diameter of the sphere.

Further, as shown in FIG. 11A etc., in this embodiment, it is arranged that the diameter of the sphere body holding part 33 is set to be larger than the diameter of the sphere body 5, and the sphere body 5 is held by the sphere body holding part 33 in a rotatable manner, however it is not limited in this regard. The sphere body holding part in accordance with embodiments of the present invention may employ a sphere body holding part 33a which holds the sphere body 5 at a predetermined position in a rotatable manner. This sphere body holding part 33a is formed as a circular recess which has substantially equal length diameter as the diameter of the sphere body 5, whereby the sphere body 5 is rotatably held at approximately one point. By means of such a structure, it is possible to reduce the frictional resistance caused between the moving frame 3 and the sphere body holding part 33a, and the sphere body 5, and reduce the loss of the driving force of each of the electric actuators 6A, 6B, 7A, and 7B, and move the moving frame 3 with small driving force (force).

Figure 11C:
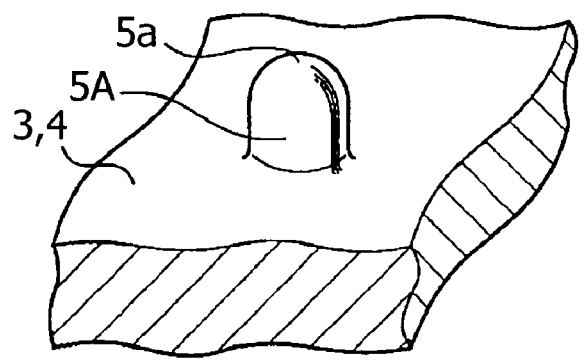
FIG. 11C is an illustrative diagram of a spherical protrusion having a spherical surface at its tip, which is a second embodiment of the move guide.

Furthermore, although in this embodiment, it is arranged that the sphere body 5 is employed as a particular example of the move guide, it is not limited in this regard. As the move guide in accordance with embodiments of the present invention, as shown in FIG. 11C, a spherical protrusion 5A may also be applicable which is provided integrally with the support frame 4 or the moving frame 3, for example. The spherical protrusion 5A has a spherical surface 5a at the tip, and point contact is made between this spherical surface 5a and the support frame 4 or the moving frame 3. Therefore, the frictional resistance caused between the support frame 4 or the moving frame 3 and the spherical protrusion 5A can be made comparatively small, the loss of the driving force of each electric actuators 6A, 6B, 7A, and 7B can be reduced, and the moving frame 3 can be moved with the small driving force (force).

Figure 11D:
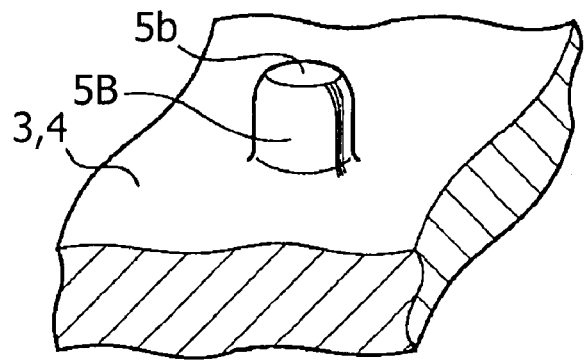
FIG. 11D is an illustrative diagram of a sliding protrusion having a sliding surface at its tip, which is a third embodiment of the move guide.

Further, as the move guide in accordance with embodiments of the present invention, as shown in FIG. 11D, it is possible to employ a sliding protrusion 5B provided integrally with the support frame 4 or the moving frame 3, for example. A sliding surface 5b which is a horizontally parallel plane is formed at the tip of the sliding protrusion 5B, and this sliding surface 5b is brought into surface contact with the support frame 4 or the moving frame 3. A lubricant, such as lubricating oil, is interposed between the support frame 4 or the moving frame 3 and the sliding surface 5b of the sliding protrusion 5B, whereby frictional resistance caused between the support frame 4 or the moving frame 3 and the sliding surface 5b can be reduced, the loss of the driving force of each electric actuators 6A, 6B, 7A, and 7B can be reduced, and the moving frame 3 can be moved with the small driving force (force).

The pair of first recesses 34A and 34B for yokes are provided at the positions corresponding to the two first magnets 21A and 21B attached to the moving frame 3. In other words, the pair of first recesses 34A and 34B for yokes are provided at the positions symmetrical each other by sandwiching the through hole 31, and face the first direction X. Further, the pair of second recesses 35A and 35B for yokes is provided at the positions corresponding to the two second magnets 22A and 22B attached to the moving frame 3. In other words, the pair of second recesses 35A and 35B for yokes are provided at the positions which are displaced and rotated by approximately 90 degrees from the pair of first recesses 34A and 34B for yokes, and face to the second direction Y across the through hole 31.

First opposing yokes 25A and 25B which constitute a part of the first electric actuators 6A and 6B are respectively fixed to the pair of first recesses 34A and 34B for yokes by the securing methods, such as an adhesive and a fixing screw. Further, second opposing yokes 26A and 26B which constitute a part of second electric actuators 7A and 7B are respectively fixed to the pair of second recesses 35A and 35B for yokes by the securing methods, such as an adhesive and a fixing screw.

The first opposing yokes 25A and 25B and the second opposing yokes 26A and 26B are the same as the first back yokes 23A and 23B and the second back yokes 24A and 24B which are attached to the moving frame 3 and formed as the quadrangular plates. These first and second opposing yokes 25A, 25B, 26A, and 26B respectively face the first and second magnets 21A, 21B, 22A, and 22B in a state where the image blur correction apparatus 1 is assembled. Each of the magnets 21A, 21B, 22A, and 22B is attracted to a respective one of the opposing yokes 25A, 25B, 26A, and 26B by its magnetic force, so that the moving frame 3 is biased towards the support frame 4 through the three sphere bodies 5.

A flexible wiring board 29 is placed to the first and second opposing yokes 25A, 25B, 26A, and 26B fixed to the support frame 4. The flexible wiring board 29 has first coil mounting parts 29a and 29b corresponding to the first opposing yokes 25A and 25B, the second coil mounting parts 29c and 29d corresponding to the second opposing yokes 26A and 26B, and a plurality of connection parts 29e for connects them.

The first coil mounting parts 29a and 29b are arranged such that they overlap with the first opposing yokes 25A and 25B fixed to the support frame 4, and each fixed by the securing methods, such as an adhesive. Further, the second coil mounting parts 29c and 29d are arranged such that they overlap with the second opposing yokes 26A and 26B fixed to the support frame 4, and each fixed by the securing methods, such as an adhesive. Two first coils 27A and 27B which constitute a part of the first electric actuators 6A and 6B are respectively mounted to the first coil mounting parts 29a and 29b of the flexible wiring board 29, and fixed by the securing methods, such as an adhesive. Further, two second coils 28A and 28B which constitute a part of the second electric actuators 7A and 7B are respectively mounted to the second coil mounting parts 29c and 29d, and fixed by the securing methods, such as an adhesive.

The first coils 27A and 27B and the second coils 28A and 28B are of a flat coil which is substantially elliptical shape and two-dimensionally wound, and each is formed by winding one coil wire. The respective coils 27A, 27B, 28A, and 28B are electrically connected with predetermined wiring patterns provided to the first and second coil mounting parts 29a, 29b, 29c, and 29d of the flexible wiring board 29.

As shown in FIG. 7, in four coils 27A, 27B, 28A, and 28B, two straight portions of longer sides which face to a width direction serve as force generating parts 27a and 27b and force generating parts 28a and 28b for generating a force as an actuator, respectively. The first coils 27A and 27B are arranged such that an extended direction of each of the force generating parts 27a and 27b is orthogonal to the first direction X, and the second coils 28A and 28B are arranged such that an extended direction of each of the force generating parts 28a and 28b is orthogonal to the second direction Y.

In the state where image blur correction apparatus 1 is assembled, one magnetic pole part (S pole in this embodiment) of the first magnets 21A and 21B faces each of the force generating parts 27a and 27a of the two first coils 27A and 27B. A magnetic pole part (N pole in this embodiment) of the first magnets 21A and 21B faces each of the force generating parts 27b and 27b of the first coils 27A and 27B. Further, a magnetic pole part (S pole in this embodiment) of the second magnets 22A and 22B faces each of the force generating parts 28a and 28a of the second coils 28A and 28B, and a magnetic pole part (N pole in this embodiment) of the second magnets 22A and 22B faces each of the force generating parts 28b and 28b.

As described above, the first electric actuator 6A is constituted by the first coil 27A, the first magnet 21A, the first back yoke 23A, and the first opposing yoke 25A. The first electric actuator 6B is constituted by the first coil 27B, the first magnet 21B, the first back yoke 23B, and the first opposing yoke 25B.

Further, the second electric actuator 7A is constituted by the second coil 28A, the second magnet 22A, the second back yoke 24A, and the second opposing yoke 26A. The second electric actuator 7B is constituted by the second coil 28B, the second magnet 22B, the second back yoke 24B, and the second opposing yoke 269.

As shown in FIG. 2 etc., the two first electric actuators 6A and 6B and the two second electric actuators 7A and 7B are arranged at the positions symmetrical each other with the correction lens 2 located at center, respectively. The two first electric actuators 6A and 6B face the first direction X, and the two second electric actuators 7A and 7B face the second direction Y. Further, the first and second electric actuators 6A, 6B, 7A, and 7B are set such that each have the same distance from a center E of the correction lens 2.

In such an arrangement structure, the magnetic force of the first magnets 21A and 21B acts in the direction perpendicular to each of the coils 27A and 27B. Therefore, if electric current is flown in the first coils 27A and 27B, the force towards the first direction X occurs in the two first electric actuators 6A and 6B according to Fleming's left hand rule. Further, the magnetic force of the second magnets 22A and 22B acts in the direction perpendicular to each of the coils 28A and 28B. Therefore, when electric current is flown in the second coils 28A and 28B, the force towards the second direction Y occurs in the two second electric actuators 7A and 7B according to Fleming's left hand rule.

In this case, in the first coil 27A (similar to other coils 27B, 28A, and 28B), the force generating parts 27a and 27b constituted by the straight portions where the force is generated exist in two places. Directions along which the current flows are opposite in the two positions. However, since the directions of the magnetic force of the first magnet 21A which acts on the two force generating parts 27a and 27b are also opposite, the directions of the forces generated in the two force generating parts 27a and 27b are in the same direction. The resultant force by summing both the forces becomes a force generated by the first electric actuator 6A, thus acting as force of moving the moving frame 3 in the first direction X (similar in the case of other electric actuators 6B, 7A, and 7B).

Further, as shown in FIG. 12A etc., the limit projection 32 of the stopper part 9 is provided in the position at which a line in alignment with a center F1 of the force generated by the first electric actuators 6A and 6B crosses a line in alignment with a center F2 of the force generated by the second electric actuators 7A and 7B.

In order to perform drive control of the correction lens 2, it is preferable to provide a position detector for detecting a position of the correction lens 2. In this embodiment, as shown in FIG. 9 etc., the two Hall devices 8A and 8B are provided as a position detector. It is configured as the magnetic force of the first magnet 21A and the second magnet 22A is detected by the two Hall devices 8A and 8B, so that the position of the correction lens 2 is computed based on the magnitude of the magnetic force.

As shown in FIG. 9, the first Hall device 8A is arranged in a gap of a wound portion of the first coil 27A, and is mounted to the first coil mounting part 29a of the flexible wiring board 29. A central part of this first Hall device 8A is set at a polar boundary between N pole and S pole of the first magnet 21A. Further, the second Hall device 8B is arranged at a gap of a wound portion of the second coil 28A, and is mounted to the second coil mounting part 29c of the flexible wiring board 29. A central part of this second Hall device 8B is set at a polar boundary between N pole and S pole of the second magnet 22A.

The first and second Hall devices 8A and 8B detect the magnetic force of N pole and S pole of the respective magnets 21A and 22A, and output detection signals according to strength of the magnetic force, respectively. Based on the detection signals from the respective Hall devices 8A and 8B, a control apparatus calculates and computes the position of the correction lens 2 in the first direction X and the second direction Y. Thus, the control apparatus can perform the drive control of the correction lens 2 with sufficient accuracy.

FIGS. 10A and 10B show the strength (against the position) of the magnetic force of the magnets 21A and 22A which acts on the first and second Hall devices 8A and 8B across the polar boundaries of the first and second magnets 21A and 22A. Taking the first Hall device 8A as an example, the detection of the magnetic force with the first magnet 21A will be described hereafter. Also, in the second Hall device 8B, the strength of the magnetic force of the second magnet 22A is detected similarly.

As shown in FIG. 10A, a magnetic flux by the first magnet 21A, the first back yoke 23A, and the first opposing yoke 25A passes from N pole 21a (N pole 22a in the case of the second magnet 22A) at the lower side of the first magnet 21A to the first opposing yoke 25A. Then, it passes through the first opposing yoke 25A to S pole 21b (S pole 22b in the case of second magnet 21A) at the lower part of the first magnet 21A. On the polar boundary between N pole 21a and S pole 21b of the first magnet 21A, the magnetic flux advances in neither of the directions.

The first Hall device 8A detects a magnetic flux density of the magnetic flux which passes from N pole 21a of the first magnet 21A to the first opposing yoke 25A as a plus (+) value, and detects a magnetic flux density of the magnetic flux which passes from the first opposing yoke 25A to S pole 21b of the first magnet 21A as a minus (−) value. Further, the first Hall device 8A detects a value of the magnetic flux density as "0" in a state where its central part faces the polar boundary between N pole 21a and S pole 21b.

When the moving frame 3 moves in the first direction X, the first Hall device 8A and the first magnet 21A move relatively. At this time, if the first Hall device 8A detects a plus (+) magnetic flux density, it means that the first Hall device 8A moves to the N pole 21a side relatively. As such, the control apparatus determines that the moving frame 3 moved to "+" side in the first direction X as shown in FIG. 13, and calculates a moved distance by an absolute value of the detected magnetic flux density. Further, when the first Hall device 8A detects a minus (−) magnetic flux density, it means that the first Hall device 8A moves to the S pole 21b side relatively. As such, the control apparatus determines that the moving frame 3 moved to "−" side in the first direction X as shown in FIG. 14, and calculates a moved distance by an absolute value of the detected magnetic flux density.

The image blur correction apparatus 1 having a structure as described above can be assembled as follows, for example. Firstly, the first and second back yokes 23A, 23B, 24A, and 24B are fixed to the first and second magnets 21A, 21B, 22A, and 22B by the securing methods, such as an adhesive, respectively. Next, the first and second magnets 21A, 21B, 22A, and 22B to which the respective back yokes 23A, 23B, 24A, and 24B are fixed are fixed to the first and second magnet fixing units 12A, 12B, 13A, and 13B of the moving frame 3 by the securing methods, such as an adhesive and a fixing screw, respectively.

Then, the correction lens 2 is fitted into the fitting hole 15 of the moving frame 3 to which the first and second magnets 21A, 21B, 22A, and 22B etc. are fixed, and is fixed by the securing methods, such as an adhesive, whereby a moving frame assembly is configured by integrating the correction lens 2, the four magnets 21A, 21B, 22A, and 22B, the four back yokes 23A, 23B, 24A, and 24B, and the moving frame 3, as shown in FIG. 5.

Next, as shown in FIG. 7 etc., the first and second coils 27A, 27B, 28A, and 28B are mounted on upper surfaces of the four coil mounting parts 29a, 29b, 29c, and 29d of the flexible wiring board 29, respectively. The first and second Hall devices 8A and 8B are mounted on the first and second coil mounting parts 29a and 29c exposed from openings of the first and second coils 27A and 28A. Thus, a coil assembly is configured by integrating the flexible wiring board 29, the four coils 27A, 27B, 28A, and 28B, and the two Hall devices 8A and 8B.

Next, the first and second opposing yokes 25A, 25B, 26A, and 26B are fixed to the first and second recesses 34A, 34B, 35A, and 35B for yokes of the support frame 4 by the securing methods, such as an adhesive and a fixing screw, respectively. Each of the coil mounting parts 29a, 29b, 29c, and 29d of the coil assembly is mounted and fixed to a respective opposing yokes 25A, 25B, 26A, and 26B attached to the support frame 4. Thus, a support frame assembly is configured where the coil assembly, the support frame 4, and four opposing yokes 25A, 25B, 26A, and 26B are integrated.

Next, the three sphere bodies 5 are respectively placed at the three sphere body holding parts 33 of the support frame assembly. Each of the magnets 21A, 21B, 22A, and 22B of the moving frame assembly is caused to face a respective coils 27A, 27B, 28A, and 28B of the support frame assembly, and the support frame assembly and the moving frame assembly are overlapped, whereby the limit projection 32 of the support frame 4 is inserted into the limit receptacle part 16 provided to the moving frame 3. Each of the magnets 21A, 21B, 22A, and 22B of the moving frame assembly is attracted to a respective opposing yokes 25A, 25B, 26A, and 26B of the support frame assembly by a respective magnetic forces, so that the moving frame assembly is biased towards the support frame assembly via three sphere bodies 5. In this way, the moving frame assembly, the three sphere bodies 5, and the support frame assembly are integrated to assemble the image blur correction apparatus 1.

In the state where image blur correction apparatus 1 is assembled, the moving frame 3 is biased towards the support frame 4 side by the magnetic force of each magnets 21A, 21B, 22A, and 22B, and movably supported in the support frame 4 through the three sphere bodies 5. Thus, the moving frame 3 and the support frame 4 are brought into close contact with each other through the three sphere bodies 5, whereby the moving frame 3 can be moved without producing saccadic movement. Further, it is possible to perform movement control of the correction lens 2 with very sufficient accuracy, and suppress degradation in the optical characteristic to the minimum.

Operation of the image blur correction apparatus 1 having such a structure is as follows: movement of the correction lens 2 of this image blur correction apparatus 1 is performed by supplying drive current of a proper value selectively or simultaneously to the respective coils 27A, 27B, 28A, and 28B of the first and second electric actuators 6A, 6B, 7A, and 7B through the flexible wiring board 29.

In other words, the first coils 27A and 27B and the second coils 28A and 28B of the image blur correction apparatus 1 are respectively fixed to the first opposing yokes 25A and 25B of the support frame 4 and the second opposing yokes 26A and 26B through the flexible wiring board 29. Each of the force generating parts 27a and 27b of the first coils 27A and 27B is extended in the second direction Y, and each of the force generating parts 28a and 28b of the second coils 28A and 28B is extended in the first direction X. Further, the first magnets 21A and 21B fixed to the moving frame 3 are respectively arranged above the first coils 27A and 27B, and the second magnets 22A and 22B are respectively arranged above the second coils 28A and 28B.

As a result, the magnetic flux of respective magnetic circuits formed by the first opposing yokes 25A and 25B, the first magnets 21A and 21B, etc. acts such that they penetrate the respective force generating parts 27a and 27b of the first coils 27A and 27B from up to down direction. Similarly, the magnetic flux of respective magnetic circuits formed by the second opposing yokes 26A and 26B, the second magnets 22A and 22B, etc. acts such that they penetrate the respective force generating parts 28a and 28b of the second coils 28A and 28B from the up to down direction.

Each of the coils 27A, 27B, 28A, and 28B is fixed to the support frame 4, and each of the magnets 21A, 21B, 22A, and 22B is fixed to the moving frame 3 which is movably supported in this support frame 4. Therefore, the correction lens 2 can move through the moving frame 3 in any direction on the plane including the first direction X and the second direction Y within a predetermined range, that is, within a range limited by the limit projection 32 and the limit receptacle part 16.

When current is passed respectively in the first coils 27A and 27B of the first electric actuators 6A and 6B, the current flows in the second direction Y in each of the force generating parts 27a and 27b, because the force generating parts 27a and 27b of each of the first coils 27A and 27B are extended in the second direction Y. At this time, since the magnetic flux of the first magnets 21A and 21B acts on the up and down direction which is perpendicular to each of the force generating parts 27a and 27b, the force directed to the first direction X acts on the first magnets 21A and 21B due to Fleming's rule. Thus, the moving frame 3 to which the first magnets 21A and 21B are fixed moves in the first direction X. As a result, the correction lens 2 held at the moving frame 3 moves in the first direction X according to a magnitude of current passed in the first coils 27A and 27B.

Similarly, when the current is passed respectively in the second coils 28A and 28B of the second electric actuators 7A and 7B, the current flows in the respective force generating parts 28a and 28b in the first direction X, because the force generating parts 28a and 28b of each of the second coils 28A and 28B are extended in the first direction X. Since the magnetic flux of the second magnets 22A and 22B acts on the up-and-down direction which is perpendicular to each of the force generating parts 28a and 28b at this time, the force directed towards the second direction Y acts on the second magnets 22A and 22B due to Fleming's rule. Thus, the moving frame 3 to which the second magnets 22A and 22B are fixed moves in the second direction Y. As a result, the correction lens 2 held at the moving frame 3 moves in the second direction Y according to magnitude of current passed through the second coils 28A and 28B.

When the current is simultaneously passed in the first coils 27A and 27B and the second coils 28A and 28B, movement operation by the first coils 27A and 27B as described above and movement operation by the second coils 28A and 28B are performed in a compositive manner. In other words, the correction lens 2 moves in the second direction Y by the effect of the current which flows into the second coils 28A and 28B, and at the same time, the correction lens 2 moves in the first direction X by the effect of the current which flows into the first coils 27A and 27B. As a result, the correction lens 2 moves in a diagonal direction to correct the image blur.

Next, a setup of a reference position of the moving frame 3 using the mechanism end in the image blur correction apparatus 1 having such a structure as described above will be described with reference to FIGS. 12 - 16. The setup of the reference position of the moving frame 3 using the mechanism end is set up by determining a reference position with respect to the first direction X of the moving frame 3 and a reference position with respect to the second direction Y.

Firstly, the setup of the reference position with respect to the first direction X of the moving frame 3 will be described. In order to set up the reference position with respect to the first direction X of the moving frame 3, the moving frame 3 is moved to "+" side of the first direction X, and the limit receptacle part 16 is brought into abutment with the limit projection 32, as shown in FIGS. 13A and 13B. Thus, the moving frame 3 stops movement towards "+" side of the first direction X. And output (hereinafter referred to as "X-direction mechanism end "+" output") of the first Hall device 8A at this time is detected. At this stage, since the limit receptacle part 16 is brought into abutment with the limit projection 32 on an extended line of the center F1 of the force generated by the first electric actuators 6A and 6B, it is possible to prevent the moving frame 3 from rotating along the limit receptacle part 16. As a result, the X-direction mechanism end "+" output can be correctly detected.

Next, the moving frame 3 is moved to "−" side of the first direction X and the limit receptacle part 16 is brought into abutment with the limit projection 32, as shown in FIGS. 14A and 14B. Thus, the moving frame 3 stops moving towards "−" side of the first direction X. Output (hereinafter referred to as "X-direction mechanism end "−" output") of the first Hall device 8A at this time is detected. At this stage, the limit receptacle part 16 is brought into abutment with the limit projection 32 on the extended line of the center F1 of the force generated by the first electric actuators 6A and 6B. Therefore, it is possible to prevent the moving frame 3 from rotating along the limit receptacle part 16 and the X-direction mechanism end "−" output can be detected correctly. Then, an intermediate output value of the X-direction mechanism end "+" output and the X-direction mechanism end "−" output is computed, and a position where the output therefrom is detected is set as the reference position with respect to the first direction X of the moving frame 3.

Similarly, the moving frame 3 is moved to "+" side and "−" side of the second direction Y, and the limit receptacle part 16 is brought into abutment with the limit projection 32. Also in this case, as shown in FIGS. 15A and 15B and FIGS. 16A and 16B, the limit receptacle part 16 is brought into abutment with the limit projection 32 on an extended line of the center F2 of the force generated by the second electric actuators 7A and 7B. Therefore, it is possible to prevent the moving frame 3 from rotating along the limit receptacle part 16, and a +Y direction mechanism end output and a −Y direction mechanism end output can be detected correctly. Then, an intermediate output value of the +Y direction mechanism end output and the −Y direction mechanism end output is computed, and a position where the output is detected is set as the reference position with respect to the second direction Y of the moving frame 3. And as shown in FIG. 12A to FIG. 12C, a position which is the reference position with respect to the first direction X of the moving frame 3 and is also the reference position with respect to the second direction Y is set as the reference position of the moving frame 3.

As described above, the limit receptacle part 16 and the limit projection 32 stops the movement of the moving frame 3 to the first direction X and the second direction Y, and prevents the moving frame 3 from rotating in the stopped position. Therefore, an error does not occur in the X-direction mechanism end "+" output, the X-direction mechanism end "−" output, the +Y direction mechanism end output, and the −Y direction mechanism end output, and the reference position of the moving frame 3 can be correctly set up by the single apparatus. As a result, the position of the correction lens 2 fixed to the moving frame 3 can be recognized correctly, and highly precise image blur correction can be performed.

Further, in this embodiment, the stopper part 9 which is the operation limit mechanism is arranged to the position where the line in alignment with the center F1 of the force generated by the first electric actuators 6A and 6B crosses the line in alignment with the center F2 of the force generated by the second electric actuators 7A and 7B. Therefore, one stopper part 9 can stop the movement of the moving frame 3 in the first direction X and the second direction Y and prevent the moving frame 3 from rotating in the stopped position. As a result, the image blur correction apparatus 1 can be realized with a simple structure in which the moving frame 3 can be moved to the position where the movement is limited, and the reference position of the moving frame 3 can be set based on the output from the first and second Hall devices 8A and 8B.

Further, in this embodiment, the two first electric actuators 6A and 6B and the two second electric actuators 7A and 79 are respectively arranged in the positions symmetrical with respect to the correction lens 2. The moving frame 3 is biased to the support frame 4 side by the magnetic force of each of the magnets 21A, 21B, 22A, and 22B of the four electric actuators 6A, 6B, 7A, and 7B. Therefore, resistance in which reactive forces caused by the magnetic forces of the respective magnets 21A, 21B, 22A, and 22B cause mutual interference and prevent rectilinearity with respect to the move direction of the moving frame 3 is cancelled and it is possible to realize the highly precise image blur correction with excellent rectilinearity.

FIG. 17 is a sectional view for explaining an image blur correction apparatus 1A illustrating the second embodiment of the image blur correction apparatus of the present invention. This image blur correction apparatus 1A is configured by including a moving-coil type electric actuator. In other words, in the image blur correction apparatus 1 as described above which shows the first embodiment, the image blur correction apparatus 1A arranges four magnets 21A, 21B, 22A, and 22B to the support frame 4, and arranges four opposing yokes 25A, 25B, 26A, and 26B and four coils 27A, 27B, 28A, and 28B to the moving frame 3. Since other structures are the same as those of the image blur correction apparatus 1 in accordance with the first embodiment, the description thereof will not be repeated.

Also in the image blur correction apparatus 1A having such a structure, the moving frame 3 can be moved to the extent that the movement to the first direction X and the second direction Y is limited, and the reference position of the moving frame 3 can be set up correctly based on the output of the first and second Hall devices 8A and 8B at that time.

FIGS. 18 to 20 are for explaining an image blur correction apparatus showing the third embodiment of the image blur correction apparatus of the present invention, in which FIG. 18 is the sectional view of the image blur correction apparatus, FIG. 19 is the perspective view of the moving frame, and FIG. 20 is the perspective view of the support frame. Difference between the image blur correction apparatus 1B of the second embodiment and the image blur correction apparatus 1 of the first embodiment is that the limit projection is provided to the moving frame and the limit receptacle part is provided to the support frame. Therefore, the same reference signs are used for the same portions as those of the image blur correction apparatus 1, and the description thereof will not be repeated.

As shown in FIG. 18, an image blur correction apparatus 1B includes a moving frame 3B, a support frame 4B, etc. The moving frame 3B of the image blur correction apparatus 1B has a fitting hole 15B to which a correction lens 2B is fitted. A stage part 15b is formed in this fitting hole 15B, and a diameter of a support frame 4B side is arranged to be small. The correction lens 2B has a shape suiting the fitting hole 15B, and the support frame 4B side is formed to have cylindrical shape. As shown in FIG. 19, in the moving frame 3B, a limit projection 36 is provided at a surface facing the support frame 4B. This limit projection 36 is formed to be cylindrical (ring) shape, surrounding the fitting hole 15B and the opening hole 36a is connected in series with the fitting hole 15B.

As shown in FIG. 20 etc., in the support frame 4B, a limit receptacle part 37 is formed in a position facing the limit projection 36 of the moving frame 3B. This limit receptacle part 37 is constituted by a through hole which passes thorough the front and the back surface of the support frame 4B, and its shape is arranged to be circular. The limit receptacle part 37 is set to be larger than the limit projection 36 of the moving frame 3B. In a state where the image blur correction apparatus 1B is assembled, the limit projection 36 is inserted into this limit receptacle part 37, and the limit receptacle part 37 and limit projection 36 are in a concentric state. In other words, a stopper part 9B which limits the movement of the moving frame 3 in the first direction X and the second direction Y is constituted by the limit projection 36 of the moving frame 3B and the limit receptacle part 37 of the support frame 4B, and this stopper part 9B serves as the operation limit mechanism.

The limit receptacle part 37 of the stopper part 9B is arranged at a position where the extended line the center F1 of the force generated by the first electric actuators 6A and 6B crosses the extended line of the center F2 of the force generated by the second electric actuators 7A and 7B. Thus, the stopper part 9B brings the limit projection 36 into abutment with the limit receptacle part 37 on the extended line of the center F1 of the force generated by the first electric actuators 6A and 6B, and limits the movement of the moving frame 3B to the first direction X. Therefore, in the position where the moving frame 3B is limited from moving to the first direction, it is possible to prevent the moving frame 3B from rotating along the limit receptacle part 16.

Further, the stopper part 9B brings the limit projection 36 into abutment with the limit receptacle part 37 on the extended line of the center F2 of the force generated by the second electric actuators 7A and 7B, and limits the movement of the moving frame 3B to the second direction X. Therefore, in the position where the moving frame 3B is limited from moving to the second direction, it is possible to prevent the moving frame 3B from rotating along the limit receptacle part 16.

Also in the image blur correction apparatus 1B having such a structure, it is possible to stop the moving frame 3B from moving in the first direction X and the second direction Y at a predetermined distance, and to prevent the moving frame 3B from rotating in the stopped position. As a result, the moving frame 3B can be moved to the extent that the movement is limited in the first direction X and the second direction Y, and the reference position of the moving frame 3B can be set correctly based on the output of the first and second Hall devices 8A and 8B at that time.

FIGS. 21A and 21B show the image blur correction apparatus 1B in accordance with the fourth embodiment of the image blur correction apparatus of the present invention, in which FIG. 21A is the plan view and FIG. 21B is the sectional view taken along B-B line as shown in FIG. 21A. This image blur correction apparatus 1C has the same structure as that of the image blur correction apparatus 1 of the first embodiment, and difference between the image blur correction apparatus 1 is that one first electric actuator and one second electric actuator are each arranged and provided. Since other structures are the same as those of the image blur correction apparatus 1 in accordance with the first embodiment, the description thereof will not be repeated.

As shown in FIGS. 21A and 21B, an image blur correction apparatus 1C has a moving frame 3C, a support frame 4C, the first electric actuator 6A, the second electric actuator 7A, and the stopper part 9, and the like. The first electric actuator 6A is arranged on "+" side of the first direction X with respect to the correction lens 2. The second electric actuator 7A is arranged on one side (-) of the second direction X with respect to the correction lens 2.

Also in the image blur correction apparatus 1C having such a structure, it is possible to stop movement of the moving frame 3C to the first direction X and the second direction Y at a predetermined distance, and to prevent the moving frame 3C from rotating at the stopped position. As a result, the moving frame 3C can be moved to the extent that the movement is limited in the first direction X and the second direction Y, and the reference position of the moving frame 3C can be set correctly based on the output of the first and second Hall devices 8A and 8B at that time.

Further, the image blur correction apparatus 1C is configured such that one first electric actuator 6A is provided as an actuator for moving the moving frame 3C in the first direction and one second electric actuator 7A is provided as an actuator for moving the moving frame 3C in the second direction. Therefore, it is possible to reduce the number of components to be less than that of the image blur correction apparatus 1 of the first embodiment, and reduce the costs.

FIGS. 22A and 22B show an image blur correction apparatus 1D in accordance with the fifth embodiment of the image blur correction apparatus of the present invention, in which FIG. 22A is a plan view, and FIG. 22B is a plan view in a state where the moving frame is removed. This image blur correction apparatus 1D has the same structure as that of the image blur correction apparatus 1 of the first embodiment, and configured by including a moving frame 3D for holding the correction lens 2, a support frame 4D for movably supporting through three sphere bodies 5, the first electric actuator 6A, the second electric actuator 7A, the first Hall device 8A, the second Hall device 8B, and the operation limit mechanism 9D for limiting the movement of the moving frame 3D in the first direction X and the second direction Y.

As shown in FIG. 22A, the moving frame 3D of the image blur correction apparatus 1D has a substantially quadrangular plane having two sides facing the first direction X and two sides facing the second direction Y. The correction lens 2 is fixed to a substantially central part of this moving frame 3D. Further, the limit receptacle part 39 is provided at one corner of the moving frame 3D. The limit receptacle part 39 is constituted by a square through hole, and has two sides facing the first direction X and two sides facing the second direction Y. In a state where the image blur correction apparatus 1D is assembled, a limit projection 40, which will be described later, of the support frame 4D is inserted into this limit receptacle part 39.

As shown in FIG. 22B, the support frame 4D of the image blur correction apparatus 1D is formed of a circular plate body which is larger than the moving frame 3D. This support frame 4D has the through hole 31 and the three sphere body holding parts 33 like the support frame 4 in accordance with the first embodiment. Further, in the support frame 4D, the limit projection 40 is provided in a position facing the limit receptacle part 39 of the moving frame 3D. The limit projection 40 is constituted by a square pillar body whose plane shape is a square. Four side surfaces of this limit projection 40 respectively face four sides of the limit receptacle part 39 provided to the moving frame 3B. Thus, by bringing the limit projection 40 of the support frame 4D into abutment with the limit receptacle part 39 of the moving frame 3D, movement of the moving frame 3D in the first direction X and the second direction Y is stopped. In other words, the stopper part 9D which limits the movement of the moving frame 3D in the first direction X and the second direction Y is constituted by the limit projection 40 and the limit receptacle part 39, and this stopper part 9D serves as the operation limit mechanism.

The first electric actuator 6A and the second electric actuator 7A of the image blur correction apparatus 1D have the same structures as that of the first and second electric actuators 6A and 7A in accordance with the image blur correction apparatus 1 of the first embodiment. The first electric actuator 6A is provided in a position where a predetermined distance is kept from the stopper part 9D to "+" side of the first direction X. Further, the second electric actuator 7A is provided in a position where a predetermined distance is kept from the stopper part 9D to one side (−) of the second direction Y. In other words, the limit projection 40 of the stopper part 9D is arranged in the position where the extended line of the center F1 of the force generated by the first electric actuator 6A crosses the extended line of the center F2 of the force generated by the second electric actuator 7A.

Also in the image blur correction apparatus 1D having such a structure, it is possible to stop the moving frame 3D from moving in the first direction X and the second direction Y at a predetermined distance by means of the stopper part 9D, and to prevent the moving frame 3D from rotating in the stopped position. As a result, the moving frame 3D can be moved up to the position where the movement to the first direction X and the second direction Y is limited, and the reference position of the moving frame 3D can be correctly set based on the output of the first and second Hall devices 8A and 8B at that time.

FIGS. 23A and 23B show the image blur correction apparatus in accordance with the sixth embodiment of the image blur correction apparatus of the present invention, in which FIG. 23A is a plan view and FIG. 23B is a plan view in a state where the moving frame is removed. This image blur correction apparatus 1E has the same structure as that of the image blur correction apparatus 1 of the first embodiment, and configured by including a moving frame 3E for holding the correction lens 2, a support frame 4E for movably supporting through three sphere bodies 5, the first electric actuator 6A, the second electric actuator 7A, the first Hall device 8A, the second Hall device 8B, the operation limit mechanism 9E for limiting the movement of the moving frame 3E in the first direction X and the second direction Y, etc.

As shown in FIG. 23A, the moving frame 3E of the image blur correction apparatus 1E is formed into a cross shape which is arranged to be convex shape in the first direction X and the second direction Y. The correction lens 2 is fixed to a substantially central part of this moving frame 3E. Further, at the moving frame 3E, a first limit receptacle part 41A is provided at a position where a predetermined distance is kept from the correction lens 2 to one side (−) in the first direction X, and the second limit receptacle part 41B is provided at a position where a predetermined distance is kept from the correction lens 2 to "+" side in the second direction Y.

The first limit receptacle part 41A is constituted by a rectangular through hole in which two long sides are extended in the second direction Y, and two short sides are extended in the first direction X. Further, the second limit receptacle part 41B is constituted by a rectangular through hole set to be the same size as that of the first limit receptacle part 41A. The two long sides are extended in the first direction X, and two short sides are extended in the second direction Y. In the state where the image blur correction apparatus 1E is assembled, a first limit projection 42A and a second limit projection 42B (to be set forth later) of a support frame 4E are inserted into the first and second limit receptacle parts 41A and 41B, respectively.

As shown in FIG. 23B, the support frame 4E of the image blur correction apparatus 1E is formed of a circular plate body, which is larger than the moving frame 3E. This support frame 4E has the through hole 31 and the three sphere body holding parts 33, as similar with the case in the support frame 4 in accordance with the first embodiment. Further, in the support frame 4E, the first limit projection 42A is provided in a position facing the first limit receptacle part 41A of the moving frame 3E and the second limit projection 42B is provided in a position facing the second limit receptacle part 41B of the moving frame 3E.

The first limit projection 42A of the support frame 4E is constituted by a square pillar body whose plane shape is a square and smaller than that of the first limit receptacle part 41A. Four side surfaces of the first limit projection 42A respectively faces four sides of the first limit receptacle part 41A provided on the moving frame 3E. Thus, as for a gap between the first limit projection 42A and the first limit receptacle part 41A, a side facing the first direction X is arranged to be smaller than a side facing the second direction Y.

Further, the second limit projection 42B is formed in the same shape as that of the first limit projection 42A, and constituted by a square pillar body whose plane shape is a square. Four side surfaces of the second limit projection 42B respectively face four sides of the second limit receptacle part 41B provided to the moving frame 3C. Thus, as for a gap between the second limit projection 42B and the second limit receptacle part 41B, a side facing the second direction Y is arranged to be smaller than a side facing the first direction X.

When the moving frame 3E is moved in the first direction X, the first limit receptacle part 41A of the moving frame 3E is brought into abutment with the first limit projection 42A of the support frame 4E, whereby the movement of the moving frame 3E in the first direction X is limited. In other words, a first stopper part 9Ea which limits the movement of the moving frame 3E in the first direction X is constituted by the first limit receptacle part 41A and the first limit projection 42A.

Further, when the moving frame 3E is moved in the second direction Y, the second limit receptacle part 41B of the moving frame 3E is brought into abutment with the second limit projection 42B of the support frame 4E, whereby the movement in the second direction Y of the moving frame 3E is limited. In other words, a second stopper part 9Eb which limits the movement of the moving frame 3E in the second direction Y is constituted by the second limit receptacle part 41B and the second limit projection 42B. Further, the operation limit mechanism 9E which limits the movement of the moving frame 3E in the first direction X and the second direction Y in the predetermined range is constituted by the first stopper part 9Ea and the second stopper part 9Eb.

The first electric actuator 6A of the image blur correction apparatus 1E and the second electric actuator 7A have the same structures as that of the first and second electric actuators 6A and 7A in accordance with the image blur correction apparatus 1 of the first embodiment. The first electric actuator 6A of the image blur correction apparatus 1E is arranged at a position facing the first stopper part 9Ea across the correction lens 2, whereby the first stopper part 9Ea limits the movement of the moving frame 3E to the first direction X on the extended line of the center F1 of the force generated by the first electric actuator 6A. Further, the second electric actuator 7A is arranged in a position facing the second stopper part 9Eb across the correction lens 2, whereby the second stopper part 9Eb limits the movement of the moving frame 3E in the second direction Y on the extended line of the center F2 of the force generated by the second electric actuator 7A.

According to the image blur correction apparatus 1E having such a structure, since the first stopper part 9Ea of the operation limit mechanism 9E limits the movement of the moving frame 3E in the first direction X on the extended line of the center F1 of the force generated by the first electric actuator 6A, it is possible to prevent the moving frame 3E from rotating at the stopped position. Further, since the second stopper part 9Eb of the operation limit mechanism 9E limits the movement of the moving frame 3E in the second direction Y on the extended line of the center F2 of the force generated by the second electric actuator 7A, it is possible to prevent the moving frame 3E from rotating at the stopped position. As a result, the moving frame 3E can be moved up to the position where the movement in the first direction X and the second direction Y is limited, and the reference position of the moving frame 3E can be correctly set based on the output of the first and second Hall devices 8A and 8B at that time.

FIGS. 24A and 24B show the image blur correction apparatus in accordance with the seventh embodiment of the image blur correction apparatus of the present invention, in which FIG. 24A is a plan view and FIG. 24B is a plan view in the state where the moving frame is removed. This image blur correction apparatus 1F has the same structure as that of the image blur correction apparatus 1 of the first embodiment, and configured by including a moving frame 3F for holding the correction lens 2, a support frame 4F for movably supporting through three sphere bodies 5, the first electric actuator 6A, the second electric actuator 7A, the first Hall device 8A, the second Hall device 8B, an operation limit mechanism 9F which limits the movement of the moving frame 3F in the first direction X and the second direction Y, etc.

As shown in FIG. 24A, the moving frame 3F of the image blur correction apparatus 1F has a substantially quadrangular plane shape having two sides facing the first direction and two sides facing the second direction Y. The correction lens 2 is fixed to a substantially central part of this moving frame 3F. Further, the first limit receptacle part 43A and the second limit receptacle part 43B are provided to the moving frame 3F. The first limit receptacle part 43A and the second limit receptacle part 43B are facing to a diagonal direction of the moving frame 3F across the correction lens 2.

The first limit receptacle part 43A is provided at a corner which is position at "+" side of the first direction X of the moving frame 3F, and the second limit receptacle part 43B is provided at a corner on "−" side of the first direction X. These first and second limit receptacle parts 43A and 43B are formed as square through holes in the same shape. Each has two sides facing the first direction X, and two sides facing the second direction Y. In a state where the image blur correction apparatus 1F is assembled, the first limit projection 44A and the second limit projection 44B of the support frame 4F (to be described later) are inserted into the first and second limit receptacle parts 43A and 43B, respectively.

As shown in FIG. 24B, the support frame 4F of the image blur correction apparatus 0F is constituted by a circular plate body which is larger than the moving frame 3F. The support frame 4F has the through hole 31 and the three sphere body holding parts 33, as similar with the case of the support frame 4 in accordance with the first embodiment. Further, in the support frame 4F, the first limit projection 44A is provided in a position facing the first limit receptacle part 43A of the moving frame 3F, and the second limit projection 44B is provided in a position facing the second limit receptacle part 43B of the moving frame 3F.

The first limit projection 44A of the support frame 4F is constituted by a square pillar body whose plane shape is a square and smaller than that of the first limit receptacle part 43A provided to the moving frame 3F. Four side surfaces of the first limit projection 44A respectively face four sides of the first limit receptacle part 43A provided to the moving frame 3F. Further, the second limit projection 44B is formed in the same shape as that of the first limit projection 44A, and is constituted by a square pillar body whose plane shape is a square. Four side surfaces of the second limit projection 42B respectively face four sides of the second limit receptacle part 43B provided to the moving frame 3F.

The first electric actuator 6A and the second electric actuator 7A of the image blur correction apparatus 1F have the same structures as that of the first and second electric actuators 6A and 7A in accordance with the image blur correction apparatus 1 of the first embodiment. The first electric actuator 6A of the image blur correction apparatus 1F is provided on "+" side of the first direction X of the correction lens 2 fixed to the moving frame 3F. Further, the second electric actuator 7A is provided at one side (−) of the second direction Y of the correction lens 2 fixed to the moving frame 3F.

In the image blur correction apparatus 1F, a first limit part 9Fa is constituted by the first limit receptacle part 43A and the first limit projection 44A, and the second limit part 9Fb is constituted by the second limit receptacle part 43B and the second limit projection 44B. The first limit part 9Fa and the second limit part 9Fb serve as both the first stopper part which limits the movement of the moving frame 3F in the first direction X and the second stopper part which limits the movement of the moving frame 3F in the second direction Y. Further, the two stoppers 9Fa and 9Fb are arranged by sandwiching the extended line of the center F1 of the force generated by the first electric actuator 6A, and extended line of the center F2 of the force generated by the second electric actuator 7A. The operation limit mechanism 9F is constituted by the first limit part 9Fa and the second limit part 9Fb.

According to the image blur correction apparatus 1F having such a structure, since two limit parts 9Fa and 9Fb of the operation limit mechanism 9F limit the movement of the moving frame 3F in the first direction X on both sides of the center F1 of the force generated by the first electric actuator 6A, it is possible to prevent the moving frame 3F from rotating at the stopped position. Further, since two limit parts 9Fa and 9Fb stop the moving frame 3F from moving in the second direction Y on both sides of the center F2 of the force generated by the second electric actuator 7A, it is possible to prevent the moving frame 3F from rotating at the stopped position. As a result, the moving frame 3F can be moved up to the position where the movement in the first direction X and the second direction Y is limited, and the reference position of the moving frame 3F can be correctly set based on the output of the first and second Hall devices 8A and 8B at that time.

Further, if the two limit parts 9Fa and 9Fb are arranged by sandwiching the center F1 of the force generated by the first electric actuator 6A, and the center F2 of the force generated by the second electric actuator 7A, it is possible to prevent the moving frame 3F from rotating wherever they are arranged. Therefore, limits at the time two positions of the limit parts 9Fa and 9Fb are set are reduced and it is possible to extend flexibility of a design. Furthermore, only by bringing two limit receptacle parts 43A and 43B into abutment with two limit projections 44A and 44B, it is possible to stop the moving frame 3F from moving, to carry out positioning unfailingly, and to realize a reliable apparatus.

FIGS. 25A and 25B show the image blur correction apparatus in accordance with the eighth embodiment of the image blur correction apparatus of the present invention, in which FIG. 25A is a plan view and FIG. 25B is a plan view in the state where the moving frame is removed. This image blur correction apparatus 1G has the same structure as the image blur correction apparatus 1F of the seventh embodiment, and difference between the image blur correction apparatus 1F is only the limit projection. Therefore, the same reference signs are used for the same portions as those of the image blur correction apparatus 1F, and the description thereof will not be repeated.

As shown in FIGS. 25A and 25B, a first limit projection 45A is provided in a position facing the first limit receptacle part 43A of the moving frame 3F in a support frame 4G of the image blur correction apparatus 1G, and the second limit projection 45B is provided in a position facing the second limit receptacle part 43B of the moving frame 3F. The first limit projection 45A and the second limit projection 45B are formed in the same cylinder shape, and the size of the plane is set to be smaller than that of the first and second limit receptacle parts 43A and 43B of the moving frame 3F.

In the image blur correction apparatus 1G, a first limit part 9Ga is constituted by the first limit receptacle part 43A and the first limit projection 45A, and a second limit part 9Gb is constituted by the second limit receptacle part 43B and the second limit projection 45B. The first limit part 9Ga and the second limit part 9Gb serve as the first stopper part which limits the movement of the moving frame 3F in the first direction X and the second stopper part which limits the movement of the moving frame 3F in the second direction Y. Further, the two stoppers 9Ga and 9Gb are arranged by sandwiching the extended line of the center F1 of the force generated by the first electric actuator 6A, and the extended line of the center F2 of the force generated by the second electric actuator 7A. Further, an operation limit mechanism 9G is constituted by the first limit part 9Ga and the second limit part 9Gb.

Also in the image blur correction apparatus 1G having such a structure, the reference position of the moving frame 3F can be correctly set like a case in the image blur correction apparatus 1F of the seventh embodiment. Further, since there are few limits when setting positions of two limit parts 9Ga and 9Gb, it is possible to extend the flexibility of a design. Furthermore, only by bringing two limit receptacle parts 43A and 43B into abutment with two limit projections 45A and 45B, it is possible to stop the moving frame 3F, to carry out positioning unfailingly, and to realize a highly reliable apparatus.

FIGS. 26A and 26B show the image blur correction apparatus in accordance with the ninth embodiment of the image blur correction apparatus of the present invention, in which FIG. 26A is a plan view and FIG. 26B is a plan view in the state where the moving frame is removed. This image blur correction apparatus 1H has the same structure as that of the image blur correction apparatus 1G of the eighth embodiment, and difference between the image blur correction apparatus 1G is only the limit receptacle part. Therefore, the same reference signs are used for the same portions as those of the image blur correction apparatus 1G, and the description thereof will not be repeated.

As shown in FIG. 26A, a moving frame 3H of the image blur correction apparatus 1H is provided with a first limit receptacle part 46A to which the first limit projection 45A of the support frame 4G is inserted, and a second limit receptacle part 46B to which the second limit projection 45B of the support frame 4G is inserted. The first limit receptacle part 46A and the second limit receptacle part 46B are formed as circular through holes of the same shape, and the size is set to be larger than the plane size of the first and the second limit projections 45A and 45B of the support frame 4G.

In the image blur correction apparatus 1H, a first limit part 9Ha is constituted by the first limit receptacle part 46A and the first limit projection 45A, and a second limit part 9Hb is constituted by the second limit receptacle part 46B and the second limit projection 45B. The first limit part 9Ha and the second limit part 9Hb serve as the first stopper part which limits the movement of the moving frame 3H in the first direction X, and the second stopper part which limits the movement of the moving frame 3H in the second direction Y. Further, the two stoppers 9Ha and 9Hb are arranged by sandwiching the extended line of the center F1 of the force generated by the first electric actuator 6A and the extended line of the center F2 of the force generated by the second electric actuator 7A. Further, an operation limit mechanism 9H is constituted by the first limit part 9Ha and the second limit part 9Hb.

Also in the image blur correction apparatus 1H having such a structure, the reference position of the moving frame 3H can be correctly set like a case in the image blur correction apparatuses 1F and 1G of the seventh and eighth embodiments. Further, since there are few limits in setting positions of two limit parts 9Ha and 9Hb, it is possible to extend the flexibility of a design. Furthermore, only by bringing two limit receptacle parts 46A and 46B into abutment with two limit projections 45A and 45B, it is possible to stop the moving frame 3H from moving, to carry out positioning unfailingly, and to realize a highly reliable apparatus.

FIGS. 27A and 27B show the image blur correction apparatus in accordance with the tenth embodiment of the image blur correction apparatus of the present invention, in which FIG. 27A is a plan view and FIG. 27B is a plan view in the state where the moving frame is removed. This image blur correction apparatus 1J has the same structure as that of the image blur correction apparatus 1 of the first embodiment, and is configured by including a moving frame 3J for holding the correction lens 2, a support frame 4J movably supporting through three sphere bodies 5, the first electric actuator 6A, the second electric actuator 7A, the first Hall device 8A, the second Hall device 8B, an operation limit mechanism 9J which limits the movement of the moving frame 3J in the first direction X and the second direction Y, etc.

As shown in FIG. 27A, the moving frame 3J of the image blur correction apparatus 1J has a substantially quadrangular plane shape having two sides facing the first direction and two sides facing the second direction Y. The correction lens 2 is fixed to a substantially central part of this moving frame 3J. Further, four corners of the moving frame 3J are respectively provided with the first to fourth limit receptacle parts 46A to 46D.

The first limit receptacle part 46A is provided at a corner positioned at intermediate of "+" side of the first direction X and "1+" side of the second direction Y in the moving frame 3J. This first limit receptacle part 46A is formed by cutting off a corner along the first direction X and the second direction Y, and has an X-direction receptacle surface 46Aa which is parallel to the second direction Y, and a Y-direction receptacle surface 46Ab which is parallel to the first direction X. The second limit receptacle part 46B is provided at a corner positioned at the center of "+" side of the first direction X and "−" side of the second direction Y of the moving frame 3J. This second limit receptacle part 46B is also formed like the first limit receptacle part 46A, and has an X-direction receptacle surface 46Ba which is parallel to the second direction Y and a Y-direction receptacle surface 46Bb which is parallel to the first direction X.

The third limit receptacle part 46C is provided at a corner positioned at the center of "−" side of the first direction X and "−" side of the second direction Y of the moving frame 3J. As with the first limit receptacle part 46A, this third limit receptacle part 46C has an X-direction receptacle surface 46Ca which is parallel to the second direction Y, and a Y-direction receptacle surface 46Cb which is parallel to the first direction X. Further, the fourth limit receptacle part 46D is provided at a corner which is positioned between "−" side of the first direction X and "+" side of the second direction Y of the moving frame 3J. As with the first limit receptacle part 46A, this fourth limit receptacle part 46D has an X-direction receptacle surface 46Da which is parallel to the second direction Y, and a Y-direction receptacle surface 46Db which is parallel to the first direction X.

As shown in FIG. 27B, the support frame 4J of the image blur correction apparatus 1J is formed of a circular plate body which is larger than the moving frame 3J. This support frame 4J has the through hole 31 and the three sphere body holding parts 33 like the support frame 4 in accordance with the first embodiment. Further, in the support frame 4J, the first limit projection 47A is provided in a position corresponding to the first limit receptacle part 46A of the moving frame 3J and the second limit projection 47B is provided at a position corresponding to the second limit receptacle part 46B. The third limit projection 47C is provided at a position corresponding to the third limit receptacle part 46C of the moving frame 3J, and the fourth limit projection 47D is provided in a position corresponding to the fourth limit receptacle part 46D. These four limit projection 47A to 47D are formed as the same cylinder shape.

The first electric actuator 6A and the second electric actuator 7A of the image blur correction apparatus 1J have the same structures as that of the first and second electric actuators 6A and 7A in accordance with the image blur correction apparatus 1 of the first embodiment. The first electric actuator 6A of the image blur correction apparatus 1J is provided to "+" side of the first direction X of the correction lens 2 fixed to the moving frame 3J. Further, the second electric actuator 7A is provided to one side (−) of the second direction Y of the correction lens 2 fixed to moving frame 3J.

In the image blur correction apparatus 1J, a first limit part 9Ja is constituted by the first limit receptacle part 46A and the first limit projection 47A, and a second limit part 9Jb is constituted by the second limit receptacle part 46B and the second limit projection 47B. Furthermore, a third limit part 9Jc is constituted by the third limit receptacle part 46C and the third limit projection 47C, and a fourth limit part 9Jd is constituted by the fourth limit receptacle part 46D and the fourth limit projection 47D. The first to fourth limit parts 9Ja, 9Jb, 9Jc, and 9Jd serve as the first stopper part which limits the movement of the moving frame 3J in the first direction X, and the second stopper part which limits the movement of the moving frame 3J in the second direction Y. In other words, a pair of the two limit parts 9Ja and 9Jb and a pair of the two limit parts 9Jc and 9Jd function as the first stopper part, and a pair of the two stopper parts 9Ja and 9Jd and a pair of the two stopper parts 9Jb and 9Jc function as the second stopper part.

When the moving frame 3J is moved to "+" side of the first direction X, the X-direction receptacle surface 46Aa of the first limit receptacle part 46A is brought into abutment with the first limit projection 47A in the first limit part 9Ja. At the same time, the X-direction receptacle surface 46Ba of the second limit receptacle part 46B is brought into abutment with the second limit projection 47B in the second limit part 9Jb, whereby the movement of the moving frame 3J towards "+" side of the first direction X is limited. Similarly, when the moving frame 3J is moved to "−" side of the first direction X, the X-direction receptacle surface 46Ca of the third limit receptacle part 46C is brought into abutment with the third limit projection 47C in the third limit part 9Jc. At the same time, the X-direction receptacle surface 46Da of the fourth limit receptacle part 46C is brought into abutment with the fourth limit projection 47D in the fourth limit part 9Jd, whereby the movement of the moving frame 3J towards side of the first direction X is limited.

Further, when the moving frame 3J is moved to "+" side of the second direction Y, the Y-direction receptacle surface 46Ab of the first limit receptacle part 46A is brought into abutment with the first limit projection 47A in the first limit part 9Ja. At the same time, the Y-direction receptacle surface 46Db of the fourth limit receptacle part 46D is brought into abutment with the fourth limit projection 47D in the fourth limit part 9Jd, whereby the movement of the moving frame 3J towards "+" side of the second direction Y is limited. Similarly, when the moving frame 3J is moved to "−" side of the second direction Y, the Y-direction receptacle surface 46Bb of the second limit receptacle part 46B is brought into abutment with the second limit projection 47B in the second limit part 9Jb. At the same time, the Y-direction receptacle surface 46Cb of the third limit receptacle part 46C is brought into abutment with the third limit projection 47C in the third limit part 9Jc, whereby the movement of the moving frame 3J towards "−" side of the second direction Y is limited.

Having the role as the first stopper part, the two limit parts 9Ja and 9Jb and the two limit parts 9Jc and 9Jd are respectively arranged such that they sandwich the extended line of the center F1 of the force generated by the first electric actuator 6A. Further, having the role as the second stopper part, the two limit parts 9Ja and 9Jd and the two limit parts 9Jb and 9Jc are arranged such that they sandwich the extended line of the center F2 of the force generated by the second electric actuator 7A. The operation limit mechanism 9J is constituted by the first to fourth limit parts 9Ja, 9Jb, 9Jc, and 9Jd.

According to the image blur correction apparatus 1J having such a structure, the movement of the moving frame 3J towards "+" side of the first direction X is limited by the first and second limit parts 9Ja and 9Jb respectively arranged at both sides of the center F1 of the force generated by the first electric actuator 6A. Therefore, in the position where the movement of the moving frame 3J towards "+" side of the first direction X is limited, it is possible to prevent the moving frame 3J from rotating. Similarly, the movement of the moving frame 3J towards "−" side of the first direction X is limited by the third and fourth limit parts 9Jc and 9Jd respectively arranged at both sides of the center F1 of the force generated by the first electric actuator 6A. Therefore, in the position where the movement of the moving frame 3J towards "−" side of the first direction X is limited, it is possible to prevent the moving frame 3J from rotating.

Further, the movement of the moving frame 3J towards "+" side of the second direction Y is limited by the first and fourth limit parts 9Ja and 9Jd respectively arranged at both sides of the center F2 of the force generated by the second electric actuator 7A. The movement of the moving frame 3J towards "−" side of the second direction Y is limited by the second and third limit parts 9Jb and 9Jc respectively arranged at both sides of the center F2 of the force generated by the second electric actuator 7A. Therefore, even when the movement of the moving frame 3J in the second direction Y is stopped, it is possible to prevent the moving frame 3J from rotating in the stopped position. As a result, the moving frame 3J can be moved up to the position where the movement to the first direction X and the second direction Y is limited, and the reference position of the moving frame 3J can be correctly set based on the output of the first and second Hall devices 8A and 8B at that time.

FIGS. 28A and 28B show the image blur correction apparatus in accordance with the eleventh embodiment of the image blur correction apparatus of the present invention, in which FIG. 28A is a plan view and FIG. 28B is a plan view in the state where the moving frame is removed. This image blur correction apparatus 1K has the same structure as that of the image blur correction apparatus 1 of the first embodiment, and is configured by including a moving frame 3K for holding the correction lens 2, a support frame 4K for movably supporting through three sphere bodies 5, the first electric actuator 6A, the second electric actuator 7A, the first Hall device 8A, the second Hall device 8B, an operation limit mechanism 9K which limits the movement of the moving frame 3K in the first direction X and the second direction Y, etc.

As shown in FIG. 28A, the moving frame 3K of the image blur correction apparatus 1K has a substantially quadrangular plane shape having two sides facing the first direction X and two sides facing the second direction Y. The correction lens 2 is fixed to a substantially central part of this moving frame 3K. Further, four corners of the moving frame 3K are respectively provided with a first to a fourth limit projections 48A to 48D.

The first limit projection 48A is provided at a corner positioned between "+" side of the first direction X of the moving frame 3K and "+" side of the second direction Y. This first limit projection 48A is formed by making the corner to project in the first direction X and the second direction Y, and has an X-direction convex surface 48Aa which is parallel to the second direction Y, and a Y-direction convex surface 48Ab which is parallel to the first direction X. The second limit projection 48B is provided at a corner positioned between "+" side of the first direction X of the moving frame 3K and "−" side of the second direction Y. This second limit projection 48B is formed like the first limit projection 48A, and has an X-direction convex surface 48Ba and a Y-direction convex surface 48Bb.

A third limit projection 48C is provided at a corner positioned between "−" side of the first direction X of the moving frame 3K and "−" side of the second direction Y. This third limit projection 48C is formed like the first limit projection 48A, and has an X-direction convex surface 48Ca and Y-direction convex surface 48Cb. Further, fourth limit projection 48D is provided at a corner positioned between "−" side of the first direction X of the moving frame 3K and "+" side of the second direction Y. This fourth limit projection 48D is formed like first limit projection 48A, and has an X-direction convex surface 48Da and a Y-direction convex surface 48Db.

As shown in FIG. 28B, the support frame 4K of the image blur correction apparatus 1K is formed of a circular plate body which is larger than the moving frame 3K. A central part of this support frame 4K is provided with a square recess 49 and the through hole 31, and the three sphere body holding parts 33 are provided to this recess 49. The recess 49 of the support frame 4K is formed in a quadrangle shape having parallel two sides facing the first direction X and parallel two sides facing the second direction Y. Four corners of this recess 49 are a first to a fourth limit receptacle parts 49A to 49D respectively corresponding to four limit projections 48A to 48D of the moving frame 3K.

The first limit receptacle part 49A has an X-direction receptacle surface 49Aa facing the X-direction convex surface 48Aa of the first limit projection 48A provided to the moving frame 3K, and a Y-direction receptacle surface 49Ab facing the Y-direction convex surface 48Ab of the first limit projection 48A. The second limit receptacle part 49B has an X-direction receptacle surface 49Ba facing the X-direction convex surface 48Ba of the second limit projection 48B provided to the moving frame 3K and a Y-direction receptacle surface 49Bb facing the Y-direction convex surface 48Bb of the second limit projection 48B.

The third limit receptacle part 49C has an X-direction receptacle surface 49Ca facing the X-direction convex surface 48Ca of the third limit projection 48C provided to the moving frame 3K, and the Y-direction receptacle surface 49Cb facing the Y-direction convex surface 48Cb of the third limit projection 48C. Further, the fourth limit receptacle part 49D has an X-direction receptacle surface 49Da facing the X-direction convex surface 48Da of the fourth limit projection 48D provided to the moving frame 3K and a Y-direction receptacle surface 49Db facing the Y-direction convex surface 48Db of the fourth limit projection 48D.

The first electric actuator 6A of the image blur correction apparatus 1K and the second electric actuator 7A have the same structures as that of the first and second electric actuators 6A and 7A in accordance with the image blur correction apparatus 1 of the first embodiment. The first electric actuator 6A of the image blur correction apparatus 1K is provided on "+" side of the first direction X of the correction lens 2 fixed to the moving frame 3K. Further, the second electric actuator 7A is provided on one side (−) of the second direction Y of the correction lens 2 fixed to the moving frame 3K.

In the image blur correction apparatus 1K, a first limit part 9Ka is constituted by the first limit projection 48A and the first limit receptacle part 49A, and a second limit part 9Kb is constituted by the second limit projection 48B and the second limit receptacle part 49B. Further, a third limit part 9Kc is constituted by the third limit projection 48C and the third limit receptacle part 49C, and a fourth limit part 9Kd is constituted by the fourth limit projection 48D and the fourth limit receptacle part 49D. The first to fourth limit parts 9Ka, 9Kb, 9Kc, and 9Kd serve as the first stopper part which limits the movement of the moving frame 3K to the first direction X and the second stopper part which limits the movement of the moving frame 3K to the second direction Y. In other words, a pair of the two limit parts 9Ka and 9Kb and a pair of the two limit parts 9Kc and 9Kd have the role of the first stopper part, and a pair of the two stopper parts 9Ka and 9Kd and a pair of the two stopper parts 9Kb and 9Kc have the role of the second stopper part.

When the moving frame 3K is moved to "+" side of the first direction X, the X-direction convex surface 48Aa and the X-direction receptacle surface 49Aa of the first limit part 9Ka are brought into abutment. At the same time, the X-direction convex surface 48Ba and the X-direction receptacle surface 49Ba of the second limit part 9Kb are brought into abutment, whereby the movement of the moving frame 3K to "+" side of the first direction X is limited. When the moving frame 3K is moved to "−" side of the first direction X, the X-direction convex surface 48Ca and the X-direction receptacle surface 49Ca of the third limit part 9Kc are brought into abutment. At the same time, the X-direction convex surface 48Da and the X-direction receptacle surface 49Da of the fourth limit part 9Kd are brought into abutment, whereby the movement of the moving frame 3K to "−" side of the first direction X is limited.

Further, when the moving frame 3K is moved to "+" side of the second direction Y, the Y-direction convex surface 48Ab and the Y-direction receptacle surface 49Ab of the first limit part 9Ka are brought into abutment. At the same time, the Y-direction convex surface 48Db and the Y-direction receptacle surface 49Db of the fourth limit part 9Kd are brought into abutment, whereby the movement of the moving frame 3K to "+" side of the second direction Y is limited. When the moving frame 3K is moved to "−" side of the second direction Y, the Y-direction convex surface 48Bb and the Y-direction receptacle surface 49Bb of the second limit part 9Kb are brought into abutment. At the same time, the Y-direction convex surface 48Cb and the Y-direction receptacle surface 49Cb of the third limit part 9Kc are brought into abutment, whereby the movement of the moving frame 3K to "−" side of the second direction Y is limited.

Having the role of the first stopper part, the two limit parts 9Ka and 9Kb and the two limit parts 9Kc and 9Kd are respectively arranged such that they sandwich the extended line of the center F1 of the force generated by the first electric actuator 6A. Further, having the role of the second stopper part, the two limit parts 9Ka and 9Kd and the two limit parts 9Kb and 9Kc are arranged such that they sandwich the extended line of the center F2 of the force generated by the second electric actuator 7A. The operation limit mechanism 9K is constituted by the first to fourth limit parts 9Ka, 9Kb, 9Kc, and 9Kd.

According to the image blur correction apparatus 1K having such a structure, the movement of the moving frame 3K to "+" side of the first direction X is limited by the first and second limit parts 9Ka and 9Kb respectively arranged at both sides of the center F1 of the force generated by the first electric actuator 6A. Therefore, in the position where the movement of the moving frame 3K to "+" side of the first direction X is limited, it is possible to prevent the moving frame 3K from rotating. Similarly, the movement of the moving frame 3K to "−" side of the first direction X is limited by the third and fourth limit parts 9Kc and 9Kd respectively arranged on both sides of the center F1 of the force generated by the first electric actuator 6A. Therefore, in the position where the movement of the moving frame 3K to "−" side of the first direction X is limited, it is possible to prevent the moving frame 3K from rotating.

Further, the movement of the moving frame 3K to "+" side of the second direction Y is limited by the first and fourth limit parts 9Ka and 9Kd respectively arranged at both sides of the center F2 of the force generated by the second electric actuator 7A. The movement of the moving frame 3K to "−" side of the second direction Y is limited by the second and third limit parts 9Kb and 9Kc respectively arranged at both sides of the center F2 of the force generated by the second electric actuator 7A. Therefore, even when the movement of the moving frame 3K to the second direction Y is stopped, it is possible to prevent the moving frame 3K from rotating in the stopped position. As a result, the moving frame 3K can be moved up to the position where the movement to the first direction X and the second direction Y is limited, and the reference position of the moving frame 3K can be correctly set based on the output of the first and second Hall devices 8A and 8B which is detected when the frame was moved.

Although the fifth to eleventh embodiments are described with reference to examples in which two or four limit parts are provided to constitute the operation limit mechanism, the operation limit mechanism in accordance with embodiments of the present invention, it is not limited in this regard. The operation limit mechanism in accordance with embodiments of the present invention may be constituted by three limit parts in total, for example, in which the two limit parts limit the movement of the moving frame in the first direction, and one limit part limits the movement of the moving frame in the second direction. It should be noted that one to four limit parts may be provided for each of the first direction and the second direction. In other words, the operation limit mechanism in accordance with embodiments of the present invention may be provided with five to eight limit parts.

FIGS. 29 to 31 show a first embodiment of the lens barrel of the present invention provided with the image blur correction apparatus 1 having such an operation effect as described above. This lens barrel 50 is configured by including a lens system 51 having five groups of lenses in which a plurality of lenses are arranged on one optical axis L, a cylinder body 52 for fixing or movably supporting the lenses of this lens system 51, an image-capture device (for example, CCD, CMOS, etc.) 54 arranged on the optical axis L of the lens system 51 and fixed to the cylinder body 52, and the image blur correction apparatus 1 which is mounted to the cylinder body 52 and corrects the image blurs of the lens system 51, etc.

As shown in FIGS. 29, 30A, and 30B, the lens system 51 of the lens barrel 50 is constituted as a folding type lens formed of five groups of lenses 57 to 61 in which five sets of lens groups are arranged on the same optical axis L. Among the five lens groups 57-61, the first lens group 57 positioned at a front edge side is constituted by a first lens 57A which is an objective lens facing an object, a prism 57B arranged on the opposite side of the object at this objective lens 57A, and a second lens 57C facing this prism 57B. The prism 57B has a triangle pole shaped body whose cross-sectional shape is a right-angled isosceles triangle, the objective lens 57A faces one of two adjacent perpendicular surfaces, and the second lens 57C faces the other surface.

In this first lens group 57, the light passing through the objective lens 57A and incidence to the prism 57B from one surface is reflected at a reflective surface which is inclined by 45 degrees with respect to the optical axis L, and a direction of travel is folded by 90 degrees. Subsequently, the folded light is emitted from the other surface and passes through the second lens 57C. The passed light advances toward a second lens group 58 along the optical axis L. The second lens group 58 is constituted by combination of a third lens 58A and a fourth lens 58B, and is arranged to be movable on the optical axis L. The light transmitted the second lens group 58 is incident to a third lens group 59.

The third lens group 59 is constituted by a fifth lens fixed to the cylinder body 52 of the lens barrel 50. Behind the third lens group 59, a fourth lens group 60 constituted by a sixth lens is arranged. An iris diaphragm mechanism 62 for adjusting a quantity of the light passing through the lens system 51 is arranged between this fourth lens group 60 and the third lens group 59. The fourth lens group 60 is arranged to be movable along the optical axis L. Behind the fourth lens group 60, a fifth lens group 61 constituted by a seventh lens 61A and a correction lens 2 is arranged. In the fifth lens group 61, the seventh lens 61A is fixed to the cylinder body 52 of the lens barrel 50. Further, the correction lens 2 is movably arranged behind this seventh lens 61A. Furthermore, an image-capture device 54 is arranged behind the correction lens 2.

The second lens group 58 and the fourth lens group 60 are arranged to be separately and independently movable along the optical axis L to the optical axis direction. By moving this second lens group 58 and the fourth lens group 60 in the predetermined direction, zoom adjustment and focus adjustment can be performed. In other words, at the time of zooming, the zoom adjustment is performed by moving the second lens group 58 and the fourth lens group 60 from "wide" (wide angle) to "tele" (telephoto). Further, at the time of focusing, the focus adjustment can be performed by moving the fourth lens group 60 from "wide" (wide angle) to "tele" (telephoto).

The imaging device 54 is fixed to an adapter for the image-capture device, and is attached to the cylinder body 52 of the lens barrel 50 through this adapter for image-capture device. An optical filter 64 is arranged on one side of the image-capture device 54, and the image blur correction apparatus 1 which has the correction lens 2 is provided between this optical filter 64 and the seventh lens 61A.

In a normal state, the correction lens 2 is attached such that the optical axis may be aligned with the optical axis L of the lens system 51. When the image blurs is caused in an image formation plane of the image-capture device 54 due to a camera shake etc., the image blur correction apparatus 1 moves the correction lens 2 in the two directions (first direction X and second direction Y) which are orthogonal to the optical axis L, thus correcting the image blurs in the image formation plane.

Next, operation of the lens system 51 of the lens barrel 50 provided with the image blur correction apparatus 1 will be described with reference to FIG. 31. In the case where the objective lens 57A of the lens system 51 is pointed to the object, the light from the object is inputted into the lens system 51 through the object lens 57A. At this time, the light transmitted the objective lens 57A is refracted by 90 degrees with the prism 57B. Then, this refracted light travels towards the image-capture device 54 along the optical axis L of the lens system 51. In other words, the light reflected by the prism 57B and emitted from the second lens 57C of the first lens group 57 passes via the second lens group 58, the third lens group 59, and the fourth lens group 60 to the seventh lens 61A of the fifth lens group 61 and the correction lens 2. Then, an image corresponding to the object is formed on the image formation plane of the image-capture device 54 through the optical filter 64.

In this case, when neither hand shake nor vibration are caused in the lens barrel 50 at the time of image capturing, the light from the object travels along the optical axis L through a central part of each of the first lens group 57 to fifth lens group 61 like a light 56A as indicated by a solid line. Thus, in the image formation plane of the image-capture device 54, the image is formed in a predetermined position. Therefore, in this case, a beautiful image can be obtained without causing image blurs.

On the other hand, if the hand shake and the vibration are caused in the lens barrel 50 when capturing images, then the light from the object enters to the first lens group 57 in a state where it is inclined, as with a case of a ray 56B indicated by a dash-and-dot line or a ray 56C indicated by a broken line. Such incident rays 56B and 56C pass through each of the first lens group to the fifth lens group in a state where it is not aligned with the optical axis L. However, the hand shake or the like can be corrected by moving the correction lens 2 by a predetermined quantity in response to hand shake, or the like, whereby, in the image formation plane of the image-capture device 54, the image can be formed in the predetermined position to obtain beautiful images by clearing the image blur.

It is arranged such that an image blur detector detects whether or not there is hand shakes, vibration, etc. in this lens barrel 50. For example, a gyroscope sensor can be used as this image blur detector. This gyroscope sensor is installed to a camera together with the lens barrel 50. This gyroscope sensor is arranged to detect acceleration, angular velocity, angular acceleration, etc. which may affect the lens barrel 50 due to shaking, hand shake of a person taking photographs. Information on the acceleration, the angular velocity, etc. detected by this gyroscope sensor is supplied to the control apparatus.

The first electric actuators 6A and 6B and/or the second electric actuators 7A and 7B are driven and controlled to form an image in the predetermined position on the image formation plane of the imaging device 54. In other words, with respect to the shake in the first direction X, the first electric actuators 6A and 6B are driven and controlled, and the moving frame 3 is moved in the first direction X. Further, with respect to the shake in the second direction Y, the second electric actuators 7A and 7B are driven and controlled, and the moving frame 3 is moved in the second direction Y.

Although the image blur correction apparatus 1 is mounted with the lens barrel 50 constructed as a folding type lens in this embodiment, the image blur correction apparatus 1 in accordance with the present invention can also be mounted with a direct drive type lens barrel where the optical axis of the lens system is directed in the horizontal direction. In this case, being biased by the magnetic force of each of the magnets 21A, 21B, 22A, and 22B, the moving frame 3 of the image blur correction apparatus 1 can lift and hold the moving frame 3 in the direction opposite to the gravity. As a result, it is not always necessary to energize the electric actuator to generate the force for lifting the moving frame 3, and the power consumption can be reduced considerably.

FIGS. 32 to 35 show a digital still camera 100 which illustrates the first embodiment of the image capture apparatus provided with the lens barrel 50 having a structure as described above. This digital still camera 100 uses a semiconductor record medium as an information recording medium. Further, the digital still camera 100 converts an optical image from the object into an electric signal by the image-capture device (CCD, CMOS, etc.), whereby this digital still camera 100 can record image capture information acquired by the imaging device on the semiconductor record medium, or can display it on a display unit, such as a liquid crystal display.

This digital still camera 100 is configured by including a camera main body 101 which is an example of a main body of the image capture apparatus, the lens barrel 50 which takes in an object image as a light and leads to the image-capture device 54, a display unit 102 constituted by a liquid crystal display which displays an image based on an image signal outputted from the imaging device 54, the control apparatus for controlling operation of the lens barrel 50, the display of the display unit 102, etc., a battery power supply (not shown), etc.

As shown in FIG. 32 etc., the camera main body 101 is long is horizontal direction and has flat cylinder body. The camera main body 101 is constituted by a front case 105 and a rear case 106 which are folded in the forward/backward direction, a main frame 107 which divides a space part formed by the front case 105 and the rear case 106 into front and back space, and a lens cover 108 vertically attached to a first main surface which is a front surface of the front case 105 in a slidable manner, etc. The objective lens 57A of the lens barrel 50 faces the front (first main surface) of the main frame 107. The objective lens 57A can be opened and closed by the lens cover 108.

The object lens 57A is arranged at an upper part on one side of the main frame 107. The lens barrel 50 is attached to the camera main body 101 such that the imaging device 54 is located underneath and a second optical axis L2 shown in FIG. 29 etc. is turned in the up-and-down direction. Further, the first optical axis L1, as shown in the FIG. 29 etc., of the lens system 51 is extended in the forward/rearward direction which is a thickness direction of the camera main body 101. Thus, the first electric actuators 6A and 6B and the second electric actuators 7A and 7B which are the lens drive unit of the image blur correction apparatus 1 are arranged in a direction orthogonal to the second optical axis L2 in the camera main body 101. It should be noted that the control apparatus (not shown) formed by mounting a predetermined microcomputer, a resistor, a capacitor and other electronic components, etc. on a wiring board and a flash unit 110 etc. are attached to the main frame 107.

The control apparatus is arranged side-by-side with the lens barrel 50, above which the flash unit 110 is arranged. The flash unit 110 is configured by including a luminescence part exposed to the front of the front case 105, a drive unit for driving and controlling the luminescence part, a capacitor for supplying predetermined electric power to the drive unit, etc. In order to expose the luminescence part of this flash unit 110 and the objective lens 57A, a lens fitting hole 111a and a flash fitting hole 111b are provided in a position corresponding to the front case 105. The objective lens 57A is fitted into the lens fitting hole 111a together with a decorative plate 66, and the luminescence part of the flash unit 110 is fitted into the flash fitting hole 111b.

Further, the front case 105 is provided with a plurality of opening holes (not shown) through which a plurality of legs provided for the lens cover 108 are inserted. Since the plurality of legs are provided with stoppers, the lens cover 108 is prevented from dropping from the front case 105. This lens cover 108 can be moved vertically by the plurality of opening holes and locked at the upper end and the lower end by lock means (not shown). As shown in FIG. 32, when the lens cover 108 is at the upper end, the objective lens 57A is closed completely, whereby protection of the object lens 57A is achieved. On the other hand, if the lens cover 108 is moved to the lower end as shown in FIG. 33, the objective lens 57A is opened completely and a power switch is turned ON. Thus, it is constituted that the image capture is possible.

As shown in FIG. 34, a quadrangular opening window 112 for exposing a display surface of the display unit 102 is provided at the rear case 106. The opening window 112 is provided by opening the back surface which is the second main surface of the rear case 106 widely. Further, the display unit 102 is arranged inside the opening window 112. The display unit 102 is constituted by combination of a liquid crystal display which has a size corresponding to the opening window 112, and a back light overlapped to the inside of this liquid crystal display. A protection plate (not shown) is arranged on the liquid crystal display side of the display unit 102 through a seal frame (not shown), and a circumferential edge of this protection plate is brought into contact with the inner surface of the opening window 112.

Further, the rear case 106 is provided with various types of operation switches. As examples of the operation switch, the followings can be shown: a mode selection knob 115 for selecting functional modes (still image, moving image, reproduction, etc.), a zoom button 116 which performs zoom operation, a screen display button 117 which performs screen display, a menu button 118 for selecting various menus, a direction key 119 which moves a cursor for selecting a menu, a screen button 121 which performs change of screen size and screen deletion, etc., and these are arranged in suitable positions. Speaker holes 122 are opened at an end on the display unit 102 side of the rear case 106. Further, a speaker is built inside the speaker holes 122. On the opposite side, a support metallic ornament 123 for a strap is attached to the end of the rear case 106.

Further, as shown in FIG. 35 etc., an upper surface of the camera main body 101 is provided with a power button 125 for turning on and off a power supply, a photography button 126 for starting and stopping the image capture, a hand shake setting button 127 for operating the image blur correction apparatus 1 to perform image blur correction, if hand shake is caused, etc. Furthermore, microphone holes 128 are opened in the substantially central part of the upper surface of the camera main body 101, inside which a microphone is built in. The power button 125, the image capture button 126, and the hand shake setting button 127 are attached to a switch holder 124 to be mounted to the camera main body 101. Furthermore, the microphone holes 128 are also opened at the switch holder 124. The built-in microphone is fixed to this switch holder 124. The switch holder 124 is held at the camera main body 101 such that a part thereof may be sandwiched by the front case 105 and the rear case 106.

FIG. 36 is a block diagram for explaining a control concept of the image blur correction apparatus 1 as described above. The control unit 130 is configured by including an image blur correction processing unit 131, an analog servo unit 132, a drive circuit unit 133, four amplifiers (AMP) 134A, 134B, 135A, and 135B, etc. A first gyroscope sensor 136A is connected to the image blur correction processing unit 131 through the first amplifier (AMP) 134A. Further, the second gyroscope sensor 136B is also connected to the image blur correction processing unit 131 through the second amplifier (AMP) 134B.

The first gyroscope sensor 136A detects displacement in the first direction X caused in the camera main body 101 due to hand shake, and the second gyroscope sensor 136B detects displacement in the second direction Y caused in the camera main body 101 due to hand shake. In this Example, although an example is described in which two gyroscope sensors are provided to detect the displacement in the first direction X and the displacement in the second direction Y individually, it may be arranged such that one gyroscope sensor detects the displacement in two directions, the first direction X and the second direction Y.

The analog servo unit 132 is connected to the image blur correction processing unit 131. A value computed by the image blur correction computing unit 131 is converted from a digital value to an analog value by the analog servo unit 132, and a control signal corresponding to the analog value is outputted. The drive circuit unit 133 is connected to the analog servo unit 132. The drive circuit unit 133 is connected with the first Hall device 8A, which is the first position detector, through the third amplifier (AMP) 135A. Further, this drive circuit unit 133 is also connected with the second Hall device 8B, which is the second position detector, through fourth amplifier (AMP) 135B. Furthermore, the drive circuit unit 133 is connected with first coils 27A and 27B of the first electric actuators 6A and 6B and second coils 28A and 28B of the second electric actuators 7A and 7B respectively.

The displacement of the moving frame 3 in the first direction X which is detected by the first Hall device 8A is inputted into the drive circuit unit 133 through the third amplifier 135A. Further, the displacement of the moving frame 3 in the second direction Y which is detected by the second Hall device 8B is inputted into the drive circuit unit 133 through the fourth amplifier 135B. Based on these inputted signals and the control signal from the analog servo unit 132, the drive circuit unit 133 outputs predetermined current to the first coils 27A and 27B and/or the second coils 28A and 28B in order to move the correction lens 2 and correct the image blurs.

FIG. 37 is a block diagram showing the first embodiment of a schematic structure of the digital still camera 100 provided with the image blur correction apparatus 1 having such a structure and operation as described above. This digital still camera 100 is configured by including the lens barrel 50 having the image blur correction apparatus 1, a control unit 140 which plays the main role of the control apparatus, a memory unit 141 having a program memory for driving the control unit 140, a data memory, and other RAM, ROM, etc., an operation unit 142 for turning on and off a power supply, selecting an image capture mode, or inputting various types of command signals etc. for the image capture etc., the display unit 102 for displaying the captured image etc., an external memory 143 for expanding a storage capacity, etc.

The control unit 140 is configured by including an arithmetic circuit which has a microcomputer (CPU), etc., for example. This control unit 140 is connected with the memory unit 141, the operation unit 142, an analog signal processing unit 144, a digital signal processing unit 145, two A/D converters 146 and 147, a D/A converter 148, and a timing generator (TG) 149. The analog signal processing unit 144 is connected to the image-capture device 54 attached to the lens barrel 50. The analog signal processing unit 144 performs a predetermined signal processing with the analog signal corresponding to the captured image outputted from this image-capture device 54. This analog signal processing unit 144 is connected to the first A/D converter 146. Then, the analog signal is converted into a digital signal by this A/D converter 146.

The digital signal processing unit 145 is connected to the first A/D converter 146. Further, this digital signal processing unit 145 performs a predetermined signal processing by the digital signal supplied from the first A/D converter 146. This digital signal processing unit 145 is connected with the display unit 102 and the external memory 143. Based on the digital signal which is an output signal of the digital signal processing unit 145, the image corresponding to the object is displayed on the display unit 102, or stored in the external memory 143. Further, the gyroscope sensor 136 which is a blur detection unit is connected to the second A/D converter 147. By means of this gyroscope sensor 136, deflection, shake, etc. of the camera main body 101 are detected, and image blur correction is performed according to the resulting detection.

The D/A converter 148 is connected with a drive control unit 152 which is a servo arithmetic unit for image blur correction. The drive control unit 152 corrects the image blurs by performing drive control of the image blur correction apparatus 1 according to the position of the correction lens 2. The drive control unit 152 is connected with the first Hall device 8A and the second Hall device 8B which are position detection units. The first Hall device 8A and the second Hall device 8B detect the position of the correction lens 2 by detecting the position of the moving frame 3 of the image blur correction apparatus 1. The timing generator (TG) 149 is connected with the image-capture device 54.

As such, the image of the object is inputted into the lens system 51 of the lens barrel 50, and forms an image on the image formation plane of the image-capture device 54. Subsequently, the image signal is outputted as an analog signal which is then subject to the predetermined processing in the analog signal processing unit 144, and thereafter converted into a digital signal by the first A/D converter 146. After the predetermined processing is performed in the digital signal processing unit 145, the output from the first A/D converter 146 is displayed on the display unit 102 as the image corresponding to the object, or stored in the external memory as storage information.

In such an image capturing state, assuming that the image blur correction apparatus 1 is in operation state, if deflection, a shake, etc. arise on the camera main body 101, then the gyroscope sensor 136 detects the deflection, shake, etc., and outputs the detection signal to the control unit 140. In response to this detection signal, a predetermined arithmetic processing is performed in the control unit 140. The control unit 140 outputs the control signal for controlling operation of the image blur correction apparatus 1 to the drive control unit 152. In the drive control unit 152, a predetermined drive signal is outputted to the image blur correction apparatus 1 based on the control signal from the control unit 140. In the image blur correction apparatus 1, the moving frame 3 is moved by a predetermined amount in the first direction X and/or the second direction Y, whereby the image blur is cleared through the movement of the correction lens 2, and a beautiful image can be obtained.

FIG. 38 is a block diagram showing a second embodiment of a schematic structure of the digital still camera provided with the image blur correction apparatus 1 having such a structure and operation as described above. This digital still camera 100A is configured by including the lens barrel 50 having the image blur correction apparatus 1, an image record/reproduction circuit unit 160 which plays the main role of the control apparatus, a built-in memory 161 which has a program memory for driving the image record/reproduction circuit unit 160, a data memory, and other RAM, ROM, etc., an image signal processing unit 162 which processes the captured image etc. into a predetermined signal, a display unit 163 which displays the captured image etc., an external memory 164 for expanding a storage capacity, a correction lens control unit 165 which performs drive control of the image blur correction apparatus 1, etc.

The image record/reproduction circuit unit 160 is provided with and constituted by, for example, an arithmetic circuit which has a microcomputer (CPU), etc. This image record/reproduction circuit unit 160 is connected with the built-in memory 161, the image signal processing unit 162, the correction lens control unit 165, a monitor drive unit 166, an amplifier 167, and three interfaces (I/F) 171, 172, and 173. The image signal processing unit 162 is connected to the image-capture device 54 attached to the lens barrel 50 through the amplifier 167. The signal processed into the predetermined image signal is inputted into the image record/reproduction circuit unit 160.

The display unit 163 is connected to the image record/reproduction circuit unit 160 through the monitor drive unit 166. Further, a connector 168 is connected to the first interface (I/F) 171. The external memory 164 can be removably connected to this connector 168. A connection terminal 174 provided to the camera main body 101 is connected to the second interface (I/F) 172.

The correction lens control unit 165 is connected with an acceleration sensor 175 which is a blur detection unit through the third interface (I/F) 173. This acceleration sensor 175 detects as acceleration the displacement due to the deflection, shake, etc. which are applied to the camera main body 101. Further, this acceleration sensor 175 can employ a gyroscope sensor. The correction lens control unit 165 is connected with the first electric actuators 6A and 6B and the second electric actuators 7A and 7B which are the lens drive units for the image blur correction apparatus 1 for driving and controlling the correction lens 2. Further, the two Hall devices 8A and 8B which are the position sensors for detecting the position of the correction lens 2 are also connected to this correction lens control unit 165.

As such, the image of the object is inputted into the lens system 51 of the lens barrel 50, and forms an image on the image formation plane of the image-capture device 54. Subsequently, the image signal is inputted into the image signal processing unit 162 through the amplifier 167. The signal processed into the predetermined image signal by this image signal processing unit 162 is inputted into the image record/reproduction circuit unit 160, whereby the signal corresponding to the image of the object is outputted from the image record/reproduction circuit unit 160 to the monitor drive unit 166, the built-in memory 161, or the external memory 164. As a result, the image corresponding to the image of the object is displayed on the display unit 163 through the monitor drive unit 166, or stored in the built-in memory 161 or the external memory 164 as an information signal where necessary.

In such an image capturing state, assuming that the image blur correction apparatus 1 is in operation state, if deflection, a shake, etc. arise on the camera main body 101, then the acceleration sensor 175 detects the deflection, shake, etc. The detection signal is outputted to the image record/reproduction circuit unit 160 through the correction lens control unit 165. In response to the above, in the image record/reproduction circuit unit 160, a predetermined arithmetic processing is performed. The image record/reproduction circuit unit 160 outputs the control signal for controlling the operation of the image blur correction apparatus 1, to the correction lens control unit 165. In the correction lens control unit 165, a predetermined drive signal is outputted to the image blur correction apparatus 1 based on the control signal from the image record/reproduction circuit unit 160. In the image blur correction apparatus 1, the moving frame 3 is moved by a predetermined amount in the first direction X and/or the second direction Y, whereby the image blurs are cleared through the movement of the correction lens 2, and a beautiful image can be obtained.

As described above, according to the image blur correction apparatus, the lens barrel, and the image capture apparatus of embodiments of the present invention, even if the moving frame movable in the direction parallel to the plane orthogonal to the optical axis of the correction lens is moved to the position where the movement in the first direction and the second direction is limited, it is possible to prevent the moving frame from rotating in the position. Thus, the moving frame can be moved to the position where the movement is limited, and the reference position of the moving frame can be correctly set based on the output of the position detector at that time. As a result, the position of the correction lens fixed to the moving frame can be determined correctly, and highly precise image blur correction can be performed. Since the reference position of the moving frame can be set by the single image blur correction apparatus, the reference position of the moving frame can be set by a simple apparatus and a simple process, and the cost can be reduced considerably.

Further, the stopper part constituted by the limit projection and the limit receptacle part is arranged in the position where the extended line of the center of the force generated by the first electric actuator crosses the extended line of the center of the force generated by the second electric actuator. Therefore, the rotation of the moving frame whose movement in the first direction and the second direction is limited can be prevented by a simple structure. Further, since the limit projection is formed to be cylindrical shape and the limit receptacle part is formed in the circular hole, a moving range of the moving frame can be entirely set to be the same distance over the whole 360 degree range. As a result, even to which direction the moving frame is moved, the limit projection can be brought into abutment with the limit receptacle part on the line which is in alignment with the center of the force acting on the moving frame, and it is possible to prevent the moving frame from rotating along the limit projection or the limit receptacle part. Furthermore, since the stopper part is configured such that the limit receptacle part is provided to surround the fitting hole into which the correction lens is fitted and the limit projection which engages with this limit receptacle part is provided, it is not necessary to secure large space for the stopper part, and thus the downsizing of the apparatus can be realized.

Further, the two stopper parts in which the movement of the moving frame 3 to the first direction is limited on both sides of the central part of the force generated by the first electric actuator, and the movement of the moving frame 3 in the second direction is limited on both sides of the central part of the force generated by the second electric actuator are provided. Therefore, the limits at the time of setting the position of the stopper part can be reduced, and the flexibility of a design can be expanded.

Further, since the support frame supports the moving frame such that it can move on the plane including the first direction and the second direction through the move guide, it is possible to realize the downsizing of the apparatus itself and reduce the number of components. And the frictional resistance when the moving frame is moved can be reduced considerably. As a result, the force generated by the first and second electric actuators can be reduced, and it is possible to decrease the power consumption. Further, since the moving frame and the support frame are brought into close contact with each other through the move guide, the possibility of saccadic movement caused in the moving frame can be excluded and it is possible to control the movement of the correction lens very accurately to limit the degradation of the optical characteristic to the minimum.

The present invention is not limited to the embodiments as described above and illustrated in the drawings. Various modifications may be allowable without departing from the gist and scope of the present invention. For example, in the embodiments as described above, although the examples are described in which the digital still camera is employed as the image capture apparatus, it may also be applied to a digital video camera, a personal computer with a camera, a mobile phone with a camera, and other image capture apparatuses. Further, although the examples using five groups of lenses as the lens barrel are described, the present invention may be applied to those using four groups of lenses or less, or six groups of lenses or more.

According to the image blur correction apparatus, the lens barrel, and the image capture apparatus in an embodiment of the present invention, the moving frame may be moved in the first direction and the second direction, and the movement may be stopped at a position in a predetermined range. Further, it is possible to prevent the moving frame from rotating by arranging the stop position.

It should be understood by those skilled in the art that various modifications, combinations, sub-combinations and alterations may occur depending on design requirements and other factors insofar as they are within the scope of the appended claims or the equivalents thereof.

The present document contains subject matter related to Japanese Patent Application No. 2007-023474 filed in the Japanese Patent Office on Feb. 1, 2007, the entire content of which being incorporated herein by reference.

What is claimed is:

1. An image blur correction apparatus, comprising:
   a moving frame which holds an image receiving element via an inner surface;
   a support frame which movably supports the moving frame through a move guide on a plane orthogonal to an optical axis of the image receiving element;
   a first electric actuator which generates a first force to move the moving frame in a first direction orthogonal to the optical axis of the image receiving element;
   a second electric actuator which generates a second force to move the moving frame in a second direction which is a direction orthogonal to the optical axis of the image receiving element and is also orthogonal to the first direction; and an operation limit mechanism including a cylinder, the cylinder having at least a portion of its outer surface disposed within a portion of the inner surface of the moving frame, the outer surface of the cylinder limiting the moving frame from moving in the first direction and the second direction, and preventing the moving frame from rotating in a limit position.

2. The image blur correction apparatus according to claim 1, wherein
the operation limit mechanism includes a stopper part which limits the moving frame from moving in the first direction on an extended line of a central part of the first force and limiting the moving frame from moving in the second direction on an extended line of a central part of the second force.

3. The image blur correction apparatus according to claim 2, wherein
the stopper part includes the cylinder provided for in either one of the moving frame and the support frame, and a limit recess provided to the other of the moving frame and the support frame, and engaged with the cylinder.

4. The image blur correction apparatus according to claim 3, wherein
the moving frame is provided with a limit receptacle part constituted by a hole or the cylinder which is concentric with the optical axis of the correction lens.

5. The image blur correction apparatus according to claim 4, wherein the hole allows light which has passed through the cylinder to pass through the hole.

6. The image blur correction apparatus according to claim 2, wherein
the stopper part includes a first stopper part which limits the moving frame from moving in the first direction on the extended line of the central part of the first force, and a second stopper part which limits the moving frame from moving in the second direction on the extended line of the central part of the second force.

7. The image blur correction apparatus according to claim 1, wherein;
the operation limit mechanism includes a first stopper part which limits the moving frame from moving in the first direction on both sides of a central part of the first force, and a second stopper part which limits the moving frame from moving in the second direction on both sides of a central part of the second force.

8. The image blur correction apparatus according to claim 1, further comprising:
a first position detector which detects a position with respect to the first direction of the moving frame; and
a second position detector which detects a position with respect to the second direction of the moving frame.

9. The image blur correction apparatus according to claim 8, wherein the first position detector and the second position detector are Hall devices.

10. The image blur correction apparatus according to claim 1, wherein the image receiving element is a correction lens which corrects image blurs in a lens system.

11. The image blur correction apparatus according to claim 10, wherein the cylinder allows light from the correction lens to pass through the cylinder.

12. The image blur correction apparatus according to claim 1, wherein the move guide includes a plurality of spheres arranged between the moving frame and the support frame.

13. A lens barrel, comprising:
a housing in which a lens system is accommodated; and
an image blur correction apparatus
which includes
a moving frame which holds an image receiving element via an inner surface;
a support frame which movably supports the moving frame through a move guide on a plane orthogonal to an optical axis of the image receiving element;
a first electric actuator which generates a first force to move the moving frame in a first direction orthogonal to the optical axis of the image receiving element;
a second electric actuator which generates a second force to move the moving frame in a second direction which is a direction orthogonal to the optical axis of the image receiving element and is also orthogonal to the first direction; and
an operation limit mechanism including a cylinder, the cylinder having at least a portion of its outer surface disposed within a portion of the inner surface of the moving frame, the outer surface of the cylinder limiting motion of the moving frame in the first direction and the second direction, and preventing the moving frame from rotating in a limited position.

14. An image capture apparatus which corrects image blurs in a lens system, comprising:
a lens barrel having a housing in which the lens system is accommodated,
an apparatus body to which the lens barrel is mounted, and
a image blur correction apparatus which includes
a moving frame which holds an image receiving element via an inner surface;
a support frame which movably supports the moving frame through a move guide on a plane orthogonal to an optical axis of the image receiving element;
a first electric actuator which generates a first force to move the moving frame in a first direction orthogonal to the optical axis of the image receiving element;
a second electric actuator which generates a second force to move the moving frame in a second direction which is a direction orthogonal to the optical axis of the image receiving element and is also orthogonal to the first direction; and
an operation limit mechanism including a cylinder, the cylinder having at least a portion of its outer surface disposed within a portion of the inner surface of the moving frame, the outer surface of the cylinder limiting the moving frame from moving in the first direction and the second direction, and preventing the moving frame from rotating in a limited position.

* * * * *